US012592864B2

(12) United States Patent
Ford et al.

(10) Patent No.: US 12,592,864 B2
(45) **Date of Patent: \*Mar. 31, 2026**

(54) USER INTERFACES FOR CLOUD LIFECYCLE MANAGEMENT

(71) Applicant: Oracle International Corporation, Redwood Shores, CA (US)

(72) Inventors: Oana Ford, Paonia, CO (US); Marcy Lynn Davis, Westminster, CO (US); Andreas Lemos, Winter Garden, FL (US); James Walter Wichelman, Fort Collins, CO (US); Yegendran Govender, Cape Town (ZA)

(73) Assignee: Oracle International Corporation, Redwood Shores, CA (US)

( \* ) Notice: Subject to any disclaimer, the term of this patent is extended or adjusted under 35 U.S.C. 154(b) by 30 days.

This patent is subject to a terminal disclaimer.

(21) Appl. No.: 18/809,089

(22) Filed: Aug. 19, 2024

(65) Prior Publication Data

US 2024/0414069 A1 Dec. 12, 2024

Related U.S. Application Data

(63) Continuation of application No. 18/456,443, filed on Aug. 25, 2023, now Pat. No. 12,107,738.
(Continued)

(51) Int. Cl.
*G06F 15/16* (2006.01)
*H04L 41/0806* (2022.01)
(Continued)

(52) U.S. Cl.
CPC .......... *H04L 41/22* (2013.01); *H04L 41/0806* (2013.01); *H04L 67/1008* (2013.01); *H04L 67/53* (2022.05); *H04L 67/75* (2022.05)

(58) Field of Classification Search
CPC . H04L 41/22; H04L 41/0806; H04L 67/1008; H04L 67/53; H04L 67/75
(Continued)

(56) References Cited

U.S. PATENT DOCUMENTS 1,065,419 A 6/1913 Winslow
9,344,519 B2 * 5/2016 Perincherry ......... H04N 21/252
(Continued)

OTHER PUBLICATIONS

About Blue Medora, Google Cloud, Jan. 17, 2023, 4 pages.
(Continued)

*Primary Examiner* — Moustafa M Meky
(74) *Attorney, Agent, or Firm* — Kilpatrick Townsend & Stockton LLP

(57) ABSTRACT

Techniques are disclosed for managing aspects of identifying and/or deploying hardware of a dedicated cloud to be hosted at a customer location (a "DRCC"). A DRCC may comprise cloud infrastructure components provided by a cloud provider but hosted by computing devices located at the customer's (a "cloud owner's") location. Services of the central cloud-computing environment may be similarly executed at the DRCC. A number of user interfaces may be hosted within the central cloud-computing. These interfaces may be used to track deployment and region data of the DRCC. A deployment state may be transitioned from a first state to a second state based at least in part on the tracking and the deployment state may be presented at one or more user interfaces. Using the disclosed user interfaces, a user may manage the entire lifecycle of a DRCC and its corresponding hardware components.

20 Claims, 28 Drawing Sheets

Related U.S. Application Data

(60) Provisional application No. 63/379,427, filed on Oct. 13, 2022, provisional application No. 63/402,026, filed on Aug. 29, 2022.

(51) Int. Cl.

| | |
|---|---|
| *H04L 41/22* | (2022.01) |
| *H04L 67/1008* | (2022.01) |
| *H04L 67/53* | (2022.01) |
| *H04L 67/75* | (2022.01) |

(58) Field of Classification Search
USPC ................................................ 709/222, 200
See application file for complete search history.

(56) References Cited

U.S. PATENT DOCUMENTS

| | | | |
|---|---|---|---|
| 9,800,639 B2 * | 10/2017 | Gordon .............. | H04N 21/8456 |
| 9,824,390 B2 | 11/2017 | Adapalli et al. | |
| 9,832,205 B2 | 11/2017 | Santhi et al. | |
| 10,079,730 B2 | 9/2018 | Subramanian et al. | |
| 10,084,838 B2 * | 9/2018 | Gordon ................... | H04L 67/02 |
| 10,116,720 B2 * | 10/2018 | Gordon ................ | H04L 65/752 |
| 10,142,386 B2 * | 11/2018 | Gordon ................ | H04L 65/756 |
| 10,148,528 B2 * | 12/2018 | Cimprich .............. | G06F 9/5011 |
| 10,742,721 B1 * | 8/2020 | Wagner ................... | H04L 67/10 |
| 11,018,948 B2 | 5/2021 | Subramanian et al. | |
| 11,075,970 B2 * | 7/2021 | Gordon ................. | H04L 65/80 |
| 11,228,641 B1 * | 1/2022 | Wagner ............. | H04L 41/5054 |
| 11,303,539 B2 * | 4/2022 | Cimprich ........... | H04L 41/5048 |
| 11,431,563 B1 | 8/2022 | Holzman et al. | |
| 11,621,869 B2 * | 4/2023 | Motwani ............. | H04L 12/4645 |
| | | | 709/238 |
| 11,755,301 B2 | 9/2023 | Holzman et al. | |
| 11,757,964 B2 * | 9/2023 | Gordon ................... | H04L 65/80 |
| | | | 709/219 |
| 11,973,784 B1 | 4/2024 | Erlingsson et al. | |
| 12,107,738 B2 * | 10/2024 | Ford ....................... | H04L 67/53 |
| 12,430,222 B2 * | 9/2025 | Wichelman ......... | G06F 11/3442 |
| 2012/0054626 A1 * | 3/2012 | Odenheimer ......... | G06F 9/5072 |
| | | | 715/738 |
| 2012/0179802 A1 | 7/2012 | Narasimhan et al. | |
| 2013/0339445 A1 * | 12/2013 | Perincherry ....... | G06Q 30/0239 |
| | | | 709/204 |
| 2014/0365662 A1 | 12/2014 | Dave et al. | |
| 2015/0156065 A1 | 6/2015 | Grandhe et al. | |
| 2015/0188927 A1 | 7/2015 | Santhi et al. | |
| 2015/0206207 A1 | 7/2015 | Narasimhan et al. | |
| 2015/0222723 A1 | 8/2015 | Adapalli et al. | |
| 2015/0341230 A1 | 11/2015 | Dave et al. | |

| | | | |
|---|---|---|---|
| 2016/0011896 A1 * | 1/2016 | Khalid | |
| 2016/0127440 A1 * | 5/2016 | Gordon ................... | H04L 65/80 |
| | | | 709/219 |
| 2016/0164753 A1 * | 6/2016 | Cimprich .............. | G06F 9/5072 |
| | | | 709/222 |
| 2016/0277481 A1 | 9/2016 | Yang | |
| 2017/0078161 A1 * | 3/2017 | Cimprich ................ | H04L 67/51 |
| 2017/0093640 A1 | 3/2017 | Subramanian et al. | |
| 2017/0272485 A1 * | 9/2017 | Gordon .............. | H04N 21/8456 |
| 2017/0353516 A1 * | 12/2017 | Gordon ................... | H04L 65/80 |
| 2019/0028355 A1 | 1/2019 | Subramanian et al. | |
| 2020/0104377 A1 | 4/2020 | Earnesty, Jr. et al. | |
| 2021/0160299 A1 * | 5/2021 | Gordon .............. | H04N 21/2402 |
| 2022/0038308 A1 * | 2/2022 | Motwani ............... | H04L 45/745 |
| 2023/0035600 A1 | 2/2023 | Holzman et al. | |
| 2023/0037199 A1 | 2/2023 | Holzman et al. | |
| 2024/0054063 A1 * | 2/2024 | Wichelman ............. | H04L 41/22 |
| 2024/0187471 A1 * | 6/2024 | Gordon ................. | H04L 67/146 |
| 2024/0223637 A1 * | 7/2024 | Gordon .............. | H04N 21/8456 |

OTHER PUBLICATIONS

AWS Outposts Family, AWS, Accessed from Internet on Jan. 20, 2023, 8 pages.

AWS Outposts User Guide for racks, AWS, 2023, 97 pages.

Collecting Metrics from On-Premise and Hybrid Cloud, Google Cloud, Jan. 17, 2023, 1 page.

HPE Datacenter Care Flexible Capacity Delivering Investment Flexibility, Hewlett Packard Enterprise, Nov. 2016, 2 pages.

In-House Private Cloud, Serverbasket.com, Available Online at: https://www.serverbasket.com/shop/on-premise-cloud-india/, Accessed from Internet on Jan. 20, 2023, 13 pages.

Oracle Exadata, Wikipedia, Available Online at: https://en.wikipedia.org/w/index.php?.

Title=Oracle_Exadata&oldid=1033323235, Jul. 12, 2021, 4 pages.

Responsibilities with Satellite Infrastructure Service, IBM Cloud Docs, Dec. 13, 2022, 14 pages.

VMware vRealize® Cloud Universal™, Available Online at https://www.vmware.com/agreements, Aug. 30, 2022, 10 pages.

U.S. Appl. No. 18/456,443, Notice of Allowance mailed on Jul. 17, 2024, 9 pages.

Parker, IBM Cloud Satellite Infrastructure Service: Get the Best of Public and Private Cloud, IBM, Jul. 26, 2021, 2 pages.

International Application No. PCT/US2023/073000, International Search Report and Written Opinion mailed on Nov. 22, 2023, 17 pages.

Vemulapalli, New Option for IBM Cloud Satellite Offers Integrated Experience, IBM Newsroom—Latest News, Mar. 1, 2021, 2 pages.

* cited by examiner

Figure 21:
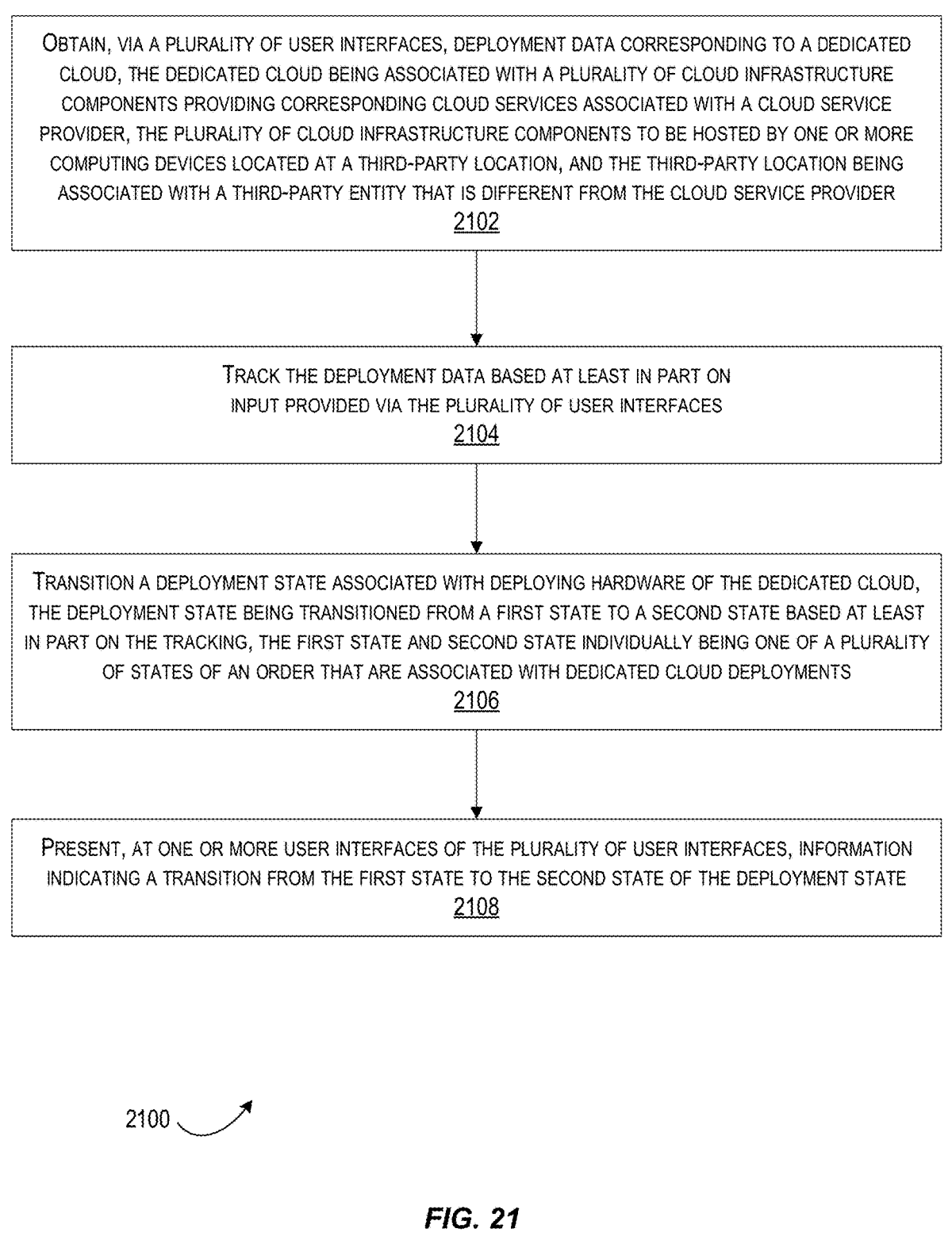

OBTAIN, VIA A PLURALITY OF USER INTERFACES, DEPLOYMENT DATA CORRESPONDING TO A DEDICATED CLOUD, THE DEDICATED CLOUD BEING ASSOCIATED WITH A PLURALITY OF CLOUD INFRASTRUCTURE COMPONENTS PROVIDING CORRESPONDING CLOUD SERVICES ASSOCIATED WITH A CLOUD SERVICE PROVIDER, THE PLURALITY OF CLOUD INFRASTRUCTURE COMPONENTS TO BE HOSTED BY ONE OR MORE COMPUTING DEVICES LOCATED AT A THIRD-PARTY LOCATION, AND THE THIRD-PARTY LOCATION BEING ASSOCIATED WITH A THIRD-PARTY ENTITY THAT IS DIFFERENT FROM THE CLOUD SERVICE PROVIDER
2102

TRACK THE DEPLOYMENT DATA BASED AT LEAST IN PART ON INPUT PROVIDED VIA THE PLURALITY OF USER INTERFACES
2104

TRANSITION A DEPLOYMENT STATE ASSOCIATED WITH DEPLOYING HARDWARE OF THE DEDICATED CLOUD, THE DEPLOYMENT STATE BEING TRANSITIONED FROM A FIRST STATE TO A SECOND STATE BASED AT LEAST IN PART ON THE TRACKING, THE FIRST STATE AND SECOND STATE INDIVIDUALLY BEING ONE OF A PLURALITY OF STATES OF AN ORDER THAT ARE ASSOCIATED WITH DEDICATED CLOUD DEPLOYMENTS
2106

PRESENT, AT ONE OR MORE USER INTERFACES OF THE PLURALITY OF USER INTERFACES, INFORMATION INDICATING A TRANSITION FROM THE FIRST STATE TO THE SECOND STATE OF THE DEPLOYMENT STATE
2108

USER INTERFACES FOR CLOUD LIFECYCLE MANAGEMENT

CROSS-REFERENCE TO RELATED APPLICATIONS

The present application is a continuation and claims the benefit of U.S. application Ser. No. 18/456,443, filed Aug. 25, 2023, entitled "USER INTERFACES FOR CLOUD LIFECYCLE MANAGEMENT," which claims the benefit and priority under 35 U.S.C. § 119(e) to U.S. Provisional Application No. 63/402,026, filed Aug. 29, 2022, entitled "DEDICATED CLOUD REGIONS AT CUSTOMER PREMISES," and U.S. Provisional Application No. 63/379,427, filed Oct. 13, 2022, entitled "DEDICATED CLOUD REGIONS AT CUSTOMER PREMISES," the contents of which are herein incorporated by reference in their entirety for all purposes.

BACKGROUND

In cloud computing, processing and storage is generally performed by one or more service providers implemented at a centralized location. Data can be received from customers at the centralized location, processed there, and then the processed (or other) data can be transmitted back to customers. However, having a centralized location for cloud infrastructure components may not be ideal for all users. Some users may wish to host cloud infrastructure components with hardware located on their premises. These users may generally be referred to as "cloud owners." Conventional systems lack the ability to manage the lifecycle of the hardware hosting these cloud infrastructure components. Techniques discussed herein are intended to address these aspects of cloud management.

BRIEF SUMMARY

In the following description, for the purposes of explanation, specific details are set forth in order to provide a thorough understanding of certain embodiments. However, it will be apparent that various embodiments may be practiced without these specific details. The figures and description are not intended to be restrictive.

Some embodiments may include a method. The method may include obtaining, by an application of a cloud-computing environment via a plurality of user interfaces, deployment data corresponding to a dedicated cloud. In some embodiments, the dedicated cloud may be associated with a plurality of cloud infrastructure components providing corresponding cloud services associated with a cloud service provider. In some embodiments, the plurality of cloud infrastructure components are to be hosted by one or more computing devices located at a third-party location. In some embodiments, the third-party location may be associated with a third-party entity that is different from the cloud service provider. The method may include tracking, by the application, the deployment data based at least in part on input provided via the plurality of user interfaces. The method may include transitioning, by the application, a deployment state associated with deploying hardware of the dedicated cloud. In some embodiments, the deployment state may be transitioned from a first state to a second state based at least in part on the tracking. The first state and second state may be, individually, one of a plurality of states of an order that are associated with dedicated cloud deployments. The method may include presenting, by the application at one or more user interfaces of the plurality of user interfaces, information indicating a transition from the first state to the second state of the deployment state.

The method may include validating, by the application, the deployment data based at least in part on executing one or more validation operations against the deployment data provided via the one or more user interfaces.

In some embodiments, at least one of the plurality of user interfaces is configured to obtain workload data identifying one or more workloads to be executed by the plurality of cloud infrastructure components of the dedicated cloud. The method may further comprise identifying, based at least in part on the one or more workloads identified, one or more hardware components for the dedicated cloud. In some embodiments, the one or more hardware components may be identified from a plurality of available hardware components.

The method may include presenting, by the application, one or more user interface elements presenting hardware data specifying the one or more hardware components. The method may further include 1) tracking, by the application, a plurality of deployment statuses corresponding to respective deployments of a plurality of dedicated host regions, 2) generating, by the application, one or more visual representations based at least in part on tracking the plurality of deployment statuses corresponding to the respective deployments, and 3) presenting the one or more visual representations within at least one user interface of the plurality of user interfaces.

The method may include transitioning, by the application, a region state associated with provisioning hardware for the dedicated cloud. In some embodiments, the region state may be transitioned from a third state to a fourth state based at least in part on the tracking. In some embodiments, the third state and fourth state may be, individually, one of a second plurality of states of a second predefined order that are associated with provisioning region cloud hardware. The method may include presenting, by the application at the one or more user interfaces, an indication that the region state has transitioned from the third state to the fourth state.

Systems, computing devices, and computer readable media are disclosed, each of which may comprise one or more memories on which instructions corresponding to the methods disclosed herein may be stored. The instructions may be executed by one or more processors of the disclosed systems and devices to execute the methods disclosed herein. One or more computer programs can be configured to perform operations corresponding to the described methods by virtue of including instructions that, when executed one or more processors, cause the one or more processors to perform the operations.

BRIEF DESCRIPTION OF THE DRAWINGS

To easily identify the discussion of any particular element or act, the most significant digit or digits in a reference number refer to the figure number in which that element is first introduced.

FIG. 21 is a block diagram illustrating an exemplary method for managing the lifecycle for a DRCC and its corresponding hardware components, according to at least one embodiment.

DETAILED DESCRIPTION

Figure 1:
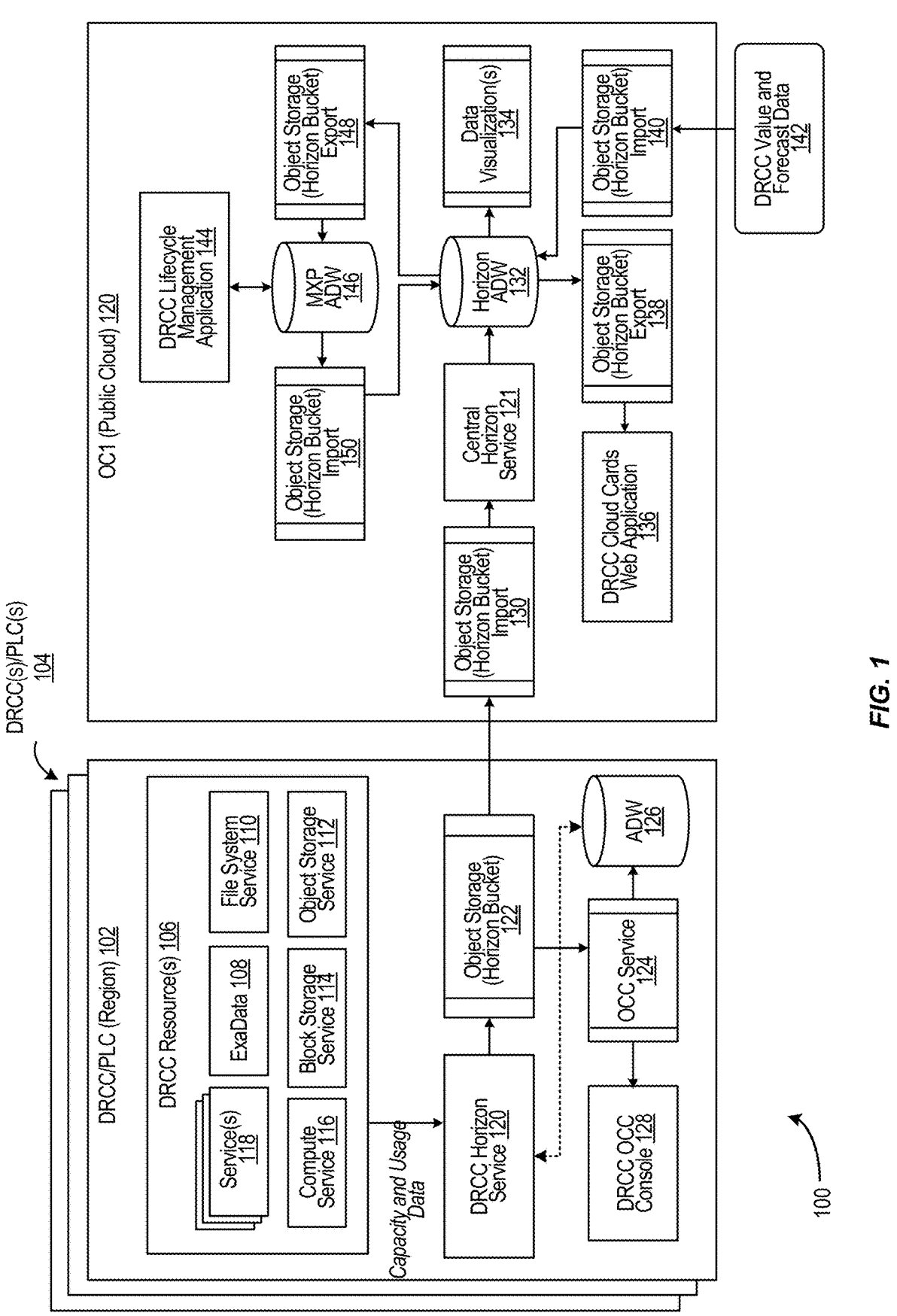
FIG. 1 is a block diagram of an environment in which a Dedicated Region Cloud (a "DRCC") is hosted at a customer, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

Infrastructure as a service (IaaS) is one type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. In some embodiments, an entity may deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like. IaaS provisioning may refer to acquiring computers or virtual hosts for use, and even installing needed libraries or services on them. In most cases, deployment does not include provisioning, and the provisioning may need to be performed first.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Dedicated Region Cloud at Customer Environments

The present disclosure relates to lifecycle management of components of a Dedicated Region Cloud at Customer (DRCC) (also referred to as a "dedicated cloud," for brevity). A DRCC hosts infrastructure and services provided by a cloud service provider (CSP) (also referred to as "cloud provider," for brevity) that are deployed and operate at computing devices that are physically located at a customer's (e.g., a "cloud owner's") own datacenter. With DRCC, enterprises can easily consolidate mission-critical database systems, with applications that were previously deployed on expensive hardware on the highly available and secure infrastructure of the CSP, thereby creating operational efficiencies and modernization opportunities.

The DRCC framework brings the full capabilities of the public cloud on-premises, so that enterprises can reduce infrastructure and operational costs, upgrade legacy applications on modern cloud services, and meet the most demanding regulatory, data residency, and latency requirements-all with the infrastructure of the CSP, which offers enhanced performance and highest levels of security. Customers get the choice and flexibility to run all the cloud services of the CSP in their data centers. Customers can choose from all public cloud services provided by the CSP, for example, including VMware Cloud, Autonomous Database, Container Engine for Kubernetes, Bare Metal Servers, Exadata Cloud Service, and only pay for services they consume. The DRCC framework is designed to keep data and customer operations completely isolated from the internet—where the control plane and data plane operations remain on-premises—to help customers meet their most demanding compliance and latency requirements. With a fully managed experience and access to new capabilities the moment they become available in the public cloud, the DRCC framework offers cloud-scale security, resiliency and scale, and support for mission-critical workloads with the tools to incrementally modernize legacy workloads.

A DRCC may provide similar services and functionality as would be available in a centralized cloud environment more traditionally managed by the cloud provider at the cloud-provider's premises. One example of a centralized cloud (referred to as a "central cloud," an "OCI cloud" or "a public cloud" herein) may be an IaaS environment that is publicly available to many customers and hosted with, for example, Oracle Cloud Infrastructure (OCI). Similar techniques discussed herein can be applied to a Private Label Cloud. A "Private Label Cloud" (PLC) refers to a cloud environment which is managed by a cloud provider (e.g., Oracle, etc.) but is branded as if it is being offered by a third-party (e.g., the customer). While examples herein are discussed in reference to a DRCC, any reference to functionality or features provided in a DRCC can be similarly provided in a PLC.

Hosting the cloud at the customer's location introduces unique needs for the cloud owner (e.g., the DRCC customer). The DRCC customer is unique from the standard public cloud customer due to the heightened responsibilities for the facility in which the DRCC runs. The DRCC customer may act more like a partner with the cloud provider than a typical public cloud consumer. While the cloud provider may manage most of the infrastructure of the DRCC, the customer has substantial responsibilities and stake in ensuring their DRCC functions effectively. These responsibilities require the customer to have a different level of insight into the physical infrastructure running in their data center than a public cloud customer.

Customers may be provided with the tools to effectively manage their DRCCs while keeping the same public cloud (e.g., OCI) experience. DRCC customers will require a rich set of tools to manage various aspects (e.g., operations and capacity) of their DRCC. The techniques disclosed herein diverge from the public cloud experience with respect to an increased visibility into the underpinnings of the DRCC and its operational activities enabling the user to access (via the user interfaces of FIGS. 4-22 discussed herein) data that was previously unavailable and/or inaccessible to customers.

The disclosed techniques are directed managing the lifecycle of a DRCC and its corresponding hardware components. The techniques described herein provide users (e.g., users associated with the CSP) to manage and track various aspects of a DRCC such as customer data, deployments, deployment state, regions, capacity, hardware, and various metrics and metadata associated with a DRCC and/or DRCC customer. User input may be provided via the interfaces discussed in connection with FIGS. 4-20. Utilizing various attributes of the user input, the system may track the deployment state of a DRCC as well as various additional metrics associated with the deployment of the DRCC.

As the hardware and deployment of a cloud was traditionally managed by the cloud provider (e.g., OCI), conventional systems lack the ability to perform this type of management. The user interfaces discussed herein enable both types of users to manage and monitor various aspects of DRCC deployment and/or individual hardware/networking components which is essential for managing the lifecycle of the DRCC and coordinating deployment efforts.

Moving on to the figures, FIG. 1 is a block diagram of an environment 100 in which a Dedicated Region Cloud (a "DRCC," or "dedicated cloud") is hosted at a customer premises and interacts with public cloud infrastructure of a cloud provider, according to at least one embodiment. Region 102 may be one of many DRCC(s) or private label cloud(s) (e.g., DRCC(s)/PLC(s) 104). In a DRCC, the customer may own the hardware which hosts region 102. The region 102 may be managed by a cloud service provider. In a PLC, the hardware owner (e.g., the cloud customer) may utilize region 102 to provide cloud services to its customers under its own label.

Region 1002 may include DRCC resource(s) 106 including, but not limited to Exadata 108, File System Service 110, Object Storage Service 112, Block Storage Service 114, Compute Service 116, and service(s) 118 which may include any suitable number of services configured to provide cloud services similar to those accessible within a public cloud. OC1 120 may be an example of a public cloud.

Region 102 may include DRCC Horizon Service 120 which may be configured to obtain capacity and usage data associated with the hardware hosting region 102. Capacity and usage data may include any suitable data related to compute, block storage, object storage, file storage, database resources, physical space, server resources, networking resources, power consumption, or the like. Specific examples of such data may be presented and discussed in further detail with respect to FIGS. 4-22 below. In some embodiments, DRCC Horizon Service 120 may be configured to communicate with any suitable combination of DRCC resource(s) 106 to obtain any suitable information corresponding to capacity management, expansion management, health and performance tracking, change management, and the like.

In some embodiments, DRCC Horizon Service 120 may be a lightweight version of the Central Horizon Service 121 of OC1 120 and may be configured to provide a subset of the functionality provided by Central Horizon Service 121. By way of example, in some embodiments, DRCC Horizon Service 120 may be configured to obtain only capacity management data, while the Central Horizon Service 121 may be configured to obtain any suitable combination of capacity management data, expansion management data, health and performance tracking data, and/or change management data.

The DRCC Horizon Service 120 may store any suitable combination of the obtained data in object storage 122 within a dedicated bucket (e.g., Horizon bucket) associated with that service. In some embodiments, as discussed in more detail in connection with FIG. 30, the DRCC Horizon Service 120 may operate in a separate tenancy than the DRCC resource(s) 106 and/or any suitable component of the region 102 as shown in FIG. 1.

Region 102 may host Oracle Control Center (OCC) Service 124. OCC Service 124 may be configured to obtain any suitable data collected by DRCC Horizon Service 120 from object storage 122 (e.g., from a bucket specific/dedicated to the DRCC Horizon Service 120) and may store the obtained data in an autonomous data warehouse (e.g., ADW 126). ADW 126 may be an example of any suitable data store (e.g., an object storage bucket accessible to and managed by the OCC Service 124). In some embodiments, the DRCC Horizon Service 120 may be configured to store the data it has collected directly to ADW 126 as shown in FIG. 1. The data obtainable by DRCC Horizon Service 120 may pertain to region 102 only. The DRCC Horizon Service 120 of a given region may not be communicatively connected with any other DRCC/PLC of DRCC(s)/PLC(s) 104.

OCC Service 124 may retrieve and provide any suitable portion the data stored in ADW 126 to DRCC OCC Console 128. In some embodiments, DRCC OCC Console 128 may be configured to present any suitable portion of that data via any suitable number of user interfaces. Examples of such user interfaces are discussed in more detail below with respect to FIGS. 4-22. Using these interfaces, an owner of the hardware hosting region 102 may view the data collected by DRCC Horizon Service 120. The data presented by DRCC OCC Console 128 may be specific to region 102. Data corresponding to other DRCCs and/or PLCs may be collected and presented via respective components of those environment and inaccessible to the DRCC OCC Console 128 of region 102.

At 130 (e.g., according to a predefined schedule or at any suitable time), any suitable portion of the data of object storage 122 may be imported to a corresponding object storage bucket associated with the Central Horizon Service 121. Central Horizon Service 121 may be configured to retrieve the data from this bucket and store the data at Horizon ADW 132, a data store within OC1 120. In some embodiments, Horizon ADW 132 may be a bucket of the object storage of a public cloud that is dedicated for storing data collected by the DRCC Horizon Service 120. The Central Horizon Service 121 may be configured to retrieve any suitable data from any suitable number of the DRCC(s)PLC(s) 104 for storage at Horizon ADW 132 in this manner. At 134, any suitable portion of the data stored within Horizon ADW 132 may be provided via one or more data visualizations. By way of example, the data visualization may be presented to the user (e.g., a public cloud operator) via any suitable user interface.

OC1 120 may execute a DRCC Cloud Cards Web Application 136. At 138, DRCC Cloud Cards Web Application may export any suitable data from Horizon ADW 132, from the object storage bucket associated with the Central Horizon Service 121. By way of example, this data may be presented using the user interfaces discussed in connection to FIGS. 4-22 below.

At 140, DRCC Value and Forecast Data 142 may be imported to the object storage bucket associated with the Central Horizon Service 121. The DRCC Value and Forecast Data 142 may include any suitable data provided by any external source including, but not limited to, forecasted values corresponding to capacity, usage, costs, orders, revenue, or the like associated with any suitable combination of the DRCC(s)/PLC(s) 104. In some embodiments, this information may be provided (e.g., by the DRCC Cloud Cards Web Application 136 and/or DRCC Lifecycle Management Apex Application 144) via any suitable interface.

In some embodiments, OC1 120 may include DRCC Lifecycle Management Apex Application 144 which may be configured to obtain and present data stored within MXP ADW 146. In some embodiments, the data presented by DRCC Lifecycle Management Apex Application 144 may pertain to any suitable component of DRCC(s)/PLC(s) 104.

At 148, data may be exported from Horizon ADW 132 (e.g., a bucket within object storage that is associated with the Central Horizon Service 121) and stored in MXP ADW 146. Such data may be viewable at DRCC Lifecycle Management Apex Application 144. In some embodiments, any suitable data (e.g., user input provided via user interfaces hosted by DRCC Lifecycle Management Apex Application 144) may be stored in MXP ADW 146. At 150, any suitable data stored in MXP ADW 146 may be imported to the object storage bucket associated with the Central Horizon Service 121 (e.g., Horizon ADW 132).

The operations of FIG. 1 may be performed any suitable number of times to enable data collected at the DRCC(s)/ PLC(s) 104 to be viewable by a user of the public cloud via the applications of OC1 120. The data collected by each DRCC Horizon Service (e.g., the DRCC Horizon Service 120 of region 102) may be viewable at any suitable time using DRCC OCC Console 128. In some embodiments, the DRCC OCC Console 128 may be configured to provide user interfaces and/or data visualizations (e.g., data visualization depicted at 134) that may be similar to those provided by the DRCC Cloud Cards Web Application 136 and/or the DRCC Lifecycle Management Apex Application 144 and/or the data visualization(s) 134. However, those user interfaces, data, and/or data visualization may be DRCC/PLC specific and may not pertain to other DRCC(s)/PLC(s) 104.

Figure 2:
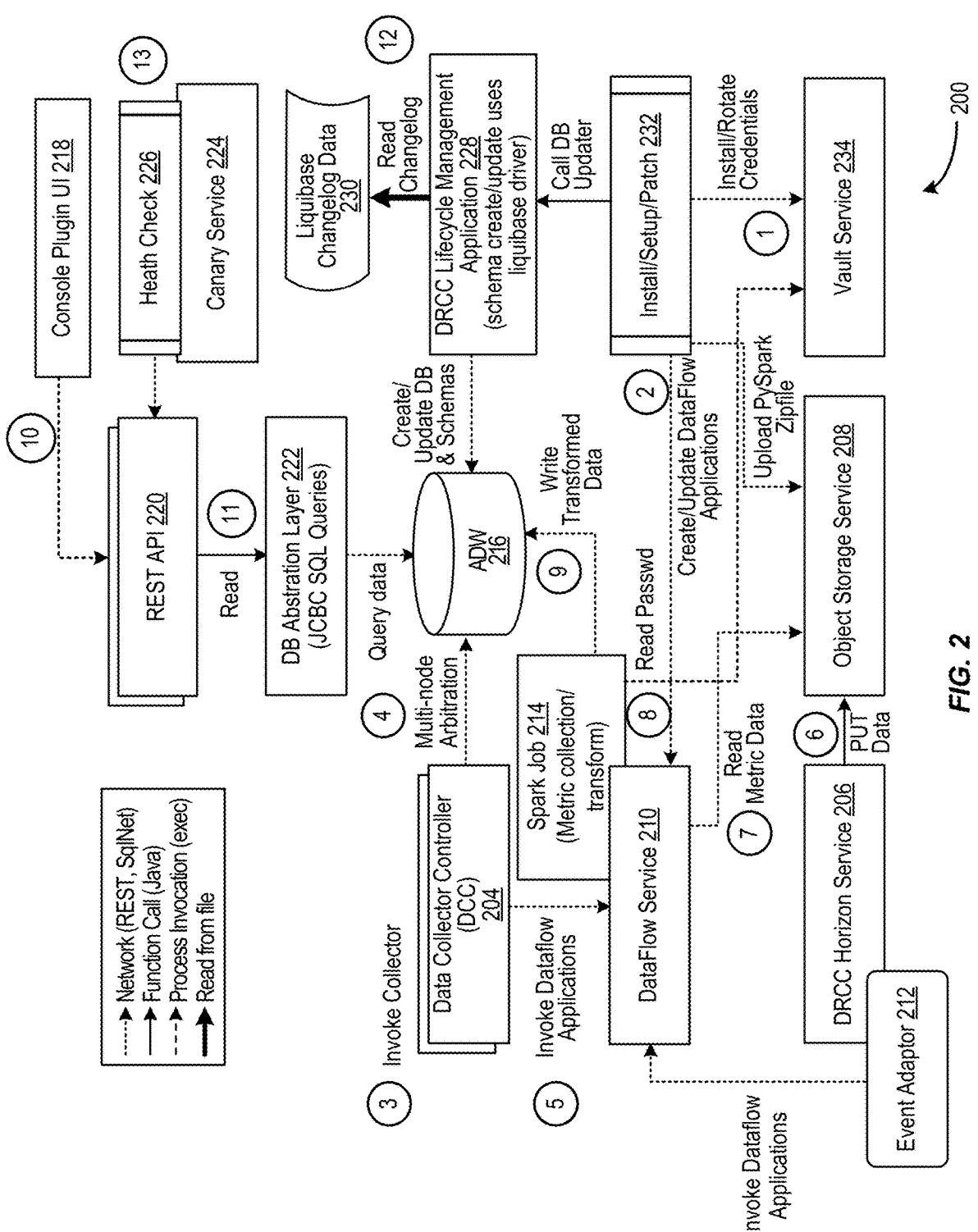
FIG. 2 is a block diagram for illustrating an example flow for obtaining operational data corresponding to a DRCC, according to at least one embodiment.

FIG. 2 is a block diagram for illustrating an example flow 200 for obtaining operational data corresponding to a DRCC, according to at least one embodiment. FIG. 2 depicts a number of components of a DRCC such as a DRCC corresponding to region 102 of FIG. 1. The following components and flow 200 may similarly applied to Private Label Clouds.

The DCC 204 may be a software component that is configured (e.g., by timer and/or via a predetermined schedule or frequency) to trigger the collection of metrics that were obtained by the DRCC Horizon Service 206. DRCC Horizon Service 206 may be an example of the DRCC Horizon Service 120 of FIG. 1. In some embodiments, DRCC Horizon Service 206 may collect capacity and/or usage data associated with the hosting region 102. Capacity and/or usage data may be associated with any suitable combination of compute resources, object storage, block storage, file storage, database resources, physical space, server devices, networking devices, and/or power consumption. DRCC Horizon Service 206 may be configured to communicate with any suitable combination of DRCC resource(s) 106 of FIG. 1 to obtain any suitable information corresponding to capacity management (e.g., capacity and usage data), expansion management, health and performance tracking, change management, and the like. This data may be collectively referred to as "metric data." The DRCC Horizon Service 206 may perform data collection operations according to its own internal schedule or predefined periodicity. The collected data may be stored (e.g., via a PUT command, or the like) by the DRCC Horizon Service 206 within an object storage bucket (e.g., a bucket ("Horizon Bucket," not depicted) of object storage that is dedicated to the Horizon Service, such as an object storage bucket). In some embodiments, storing and retrieving data may be performed by issuing requests to the object storage service

208 which may be configured to manage object storage (including the Horizon Bucket). DCC 204 may trigger DataFlow Service 210 to retrieve (e.g., read, using the object storage service 208) the metric data stored in the object storage bucket at any suitable time, or according to any suitable predetermined frequency and/or schedule.

In some embodiments, DRCC Horizon Service 206 may include an event adaptor 212 that may be configured to similarly invoke the DataFlow Service 210 to read the metric data from object storage bucket (e.g., utilizing a REST API corresponding to the object storage service 208). Some embodiments may utilize any suitable combination of the DCC 204 and/or event adaptor 212 to invoke the functionality of DataFlow Service 210.

In some embodiments, multiple instances of the DCC 204 (e.g., two, three, etc.) may be utilized for multi-node arbitration and redundancy. That is, each DCC 204 instance may attempt to perform a lock (e.g., a daily lock) of the ADW 216. If the lock is successful, the corresponding instance may proceed with invoking the data flow application. If not (because another instance of the DCC 204 has already locked the ADW 216), the instance may halt execution.

DataFlow Service 210 may execute any suitable number of jobs (e.g., spark job 214) to collect and/or transform data from the object storage bucket (utilizing the REST API associated with Object Storage Service 208). In some embodiments, the spark job 214 may perform any suitable predefined transform of the collected data and may be configured to write the transformed data to ADW 216 (and example of ADW 126 of FIG. 1).

Console Plugin User Interface (UI) 218 may be utilized at any suitable time to request and/or display any suitable portion of the metric data. In some embodiments, the Console Plugin UI 218 is an example of the DRCC OCC Console 128 of FIG. 1. The input provided via the Console Plugin UI 218 may be submitted (e.g., directly, or via the OCC Service 124 of FIG. 1), as a query via REST API 220. REST API 220 may be configured to provide access to the region-specific metric data within ADW 216. In some embodiments, the query may be passed through DB abstraction layer 222. DB abstraction layer 222 may be a read-only layer that shields the REST API 220 from details of how data is stored in the underlying database (e.g., ADW 216).

Canary Service 224 (an example of a health collection service) may be configured to perform a health check 226 of the various services and/or components (e.g., DCC 204, DataFlow Service 210, DRCC Horizon Service 206, Object Storage Service 208, etc.) Health check 226 (e.g., a collection of health-related metrics of the services mentioned above) may be performed at any suitable time, according to any suitable frequency and/or predetermined schedule.

ADW Lifecycle Management Application 228 may be a software component configured to manage the lifecycle of the ADW database including, but not limited to, managing changes to schemas, scheduling SQL jobs, etc. In some embodiments, the ADW Lifecycle Management Application 228 may utilize Liquibase to manage these aspects of the ADW 216. Lifecycle management operations of the ADW Lifecycle Management Application 228 may be identified based at least in part on reading Liquibase changelog data 230 corresponding to the ADW 216.

Another computing component of the DRCC may perform operations at 232 for installing/setting up/patching the DataFlow Service 210. For example, instructions for performing operations may be stored at the DataFlow Service 210 as part of an install performed at 232. In some embodiments, the operations performed at 232 may include installing and/or rotating a credential for the ADW 216 that is stored in Vault Service 234

Flow 200 may begin at step 1, where credentials are installed for the ADW 216 at Vault Service 234 At step 2, instructions for DataFlow Service 210 and the credentials for ADW 216 may be installed.

At step 3, the functionality of DCC 204 may be invoked (e.g., by a function call initiated at Event Adaptor 212 or otherwise, via a timer, according to a predetermined schedule or frequency, etc.). In some embodiments, the functionality of DCC 204 may be invoked using a REST API corresponding with the DCC 204.

At step 4, DCC 204 may attempt to perform a lock of ADW 216. If unsuccessful the DCC 204 may halt processing and the flow may cease. Otherwise, the DCC 204 may invoke DataFlow applications of the DataFlow Service 210 at step 5.

The DRCC Horizon Service 206 may have previously collected metric data and stored this data within a dedicated bucket associated with the service (not depicted) by executing a PUT data command with object storage service 208. These operations are depicted at step 6 and may have occurred at any suitable time.

At step 7, the DataFlow Service 210 may, according to the instructions installed at step 2, read (or otherwise obtain from the Object Storage Service 208) metric data collected by the DRCC Horizon Service 206 and previously stored in the Horizon Bucket by Object Storage Service 208. Spark Job 214 may be executed by the DataFlow Service 210 to collect and/or transform that data. At step 8, Spark Job 214 may be configured to read and/or obtain the password (or other credential) for ADW 216 from Vault Service 234. At step 9, Spark Job 214 may write the collect and/or transformed data to ADW 216 (e.g., using the previously credentials installed at the DataFlow Service 210, or the ones obtained at step 8).

At step 10 (or any suitable time), input may be received at the Console Plugin UI 218 to access the metric data stored at ADW 216. In some embodiments, this input may be obtained from one of the user interfaces of FIGS. 4-22 that are presented by the Console Plugin UI 218. At step 11, the user input may be passed through the REST API 220 and DB abstraction layer 222 to query the ADW 216 for the requested metric data.

At any suitable time the ADW Lifecycle Management Application 228 may read the Liquibase Changelog Data 230 at step 12 to identify and perform changes to the ADW 216. Canary Service 224 (an example of a service or application that performs health checks and/or collects health related data of one or more other components) can perform health check 226 at step 13 to collect health related data corresponding to the other components of FIG. 2. In some embodiments, the Canary Service 224 requests metric data (e.g., via the REST API 220 and DB abstraction layer 222 to identify health of the other components of FIG. 2 (e.g., The DRCC Horizon Service 206, the DataFlow Service 210, etc.) and/or the components of the DRCC (e.g., the DRCC resource(s) 106 of FIG. 1.

Figure 3:
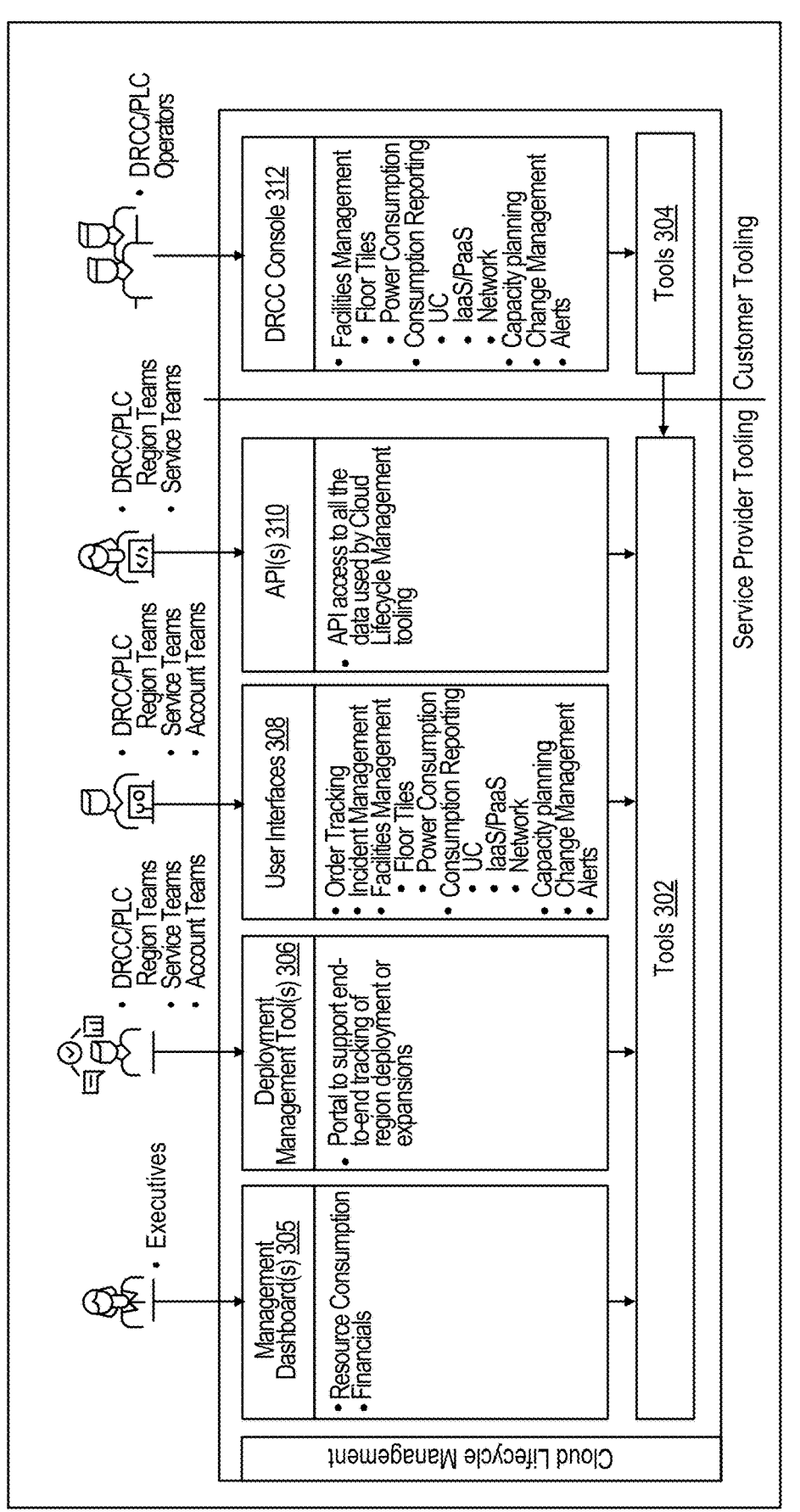
FIG. 3 is a block diagram for illustrating an overview of a number of software tools available to a variety of entities corresponding to a cloud provider and/or a customer, according to at least one embodiment.
Figure 8:
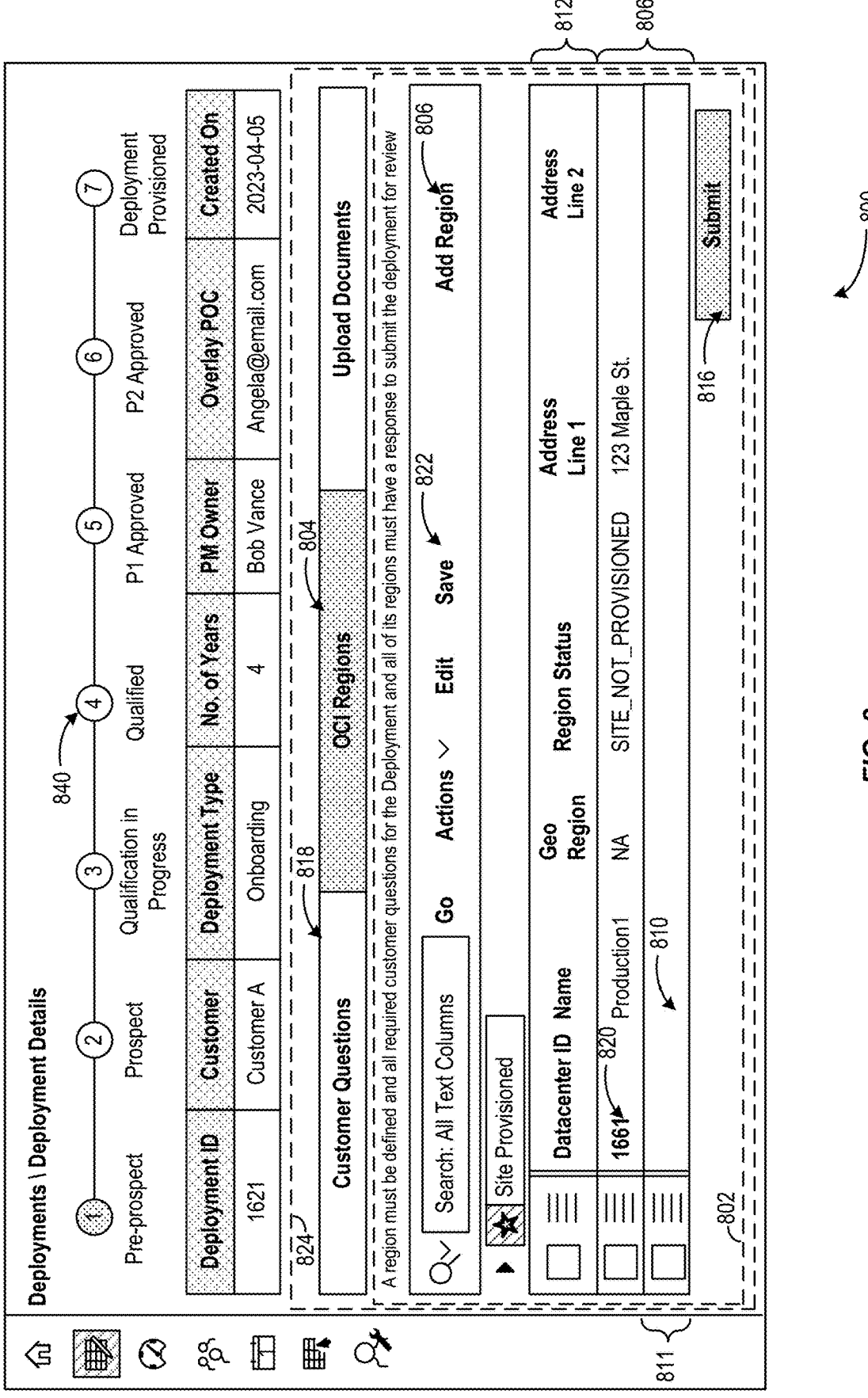
FIG. 8 is a block diagram for illustrating interface elements for managing regions via a deployment details page of a DRCC Deployment Management application, in accordance with at least one embodiment.

FIG. 8 depicts an example user interface (e.g., user interface 800, one of the user interface(s) 308 of FIG. 3). As depicted the user interface 800 presents data regarding live customers, signed customers, and pipeline customers corresponding to numerous DRCCs/PLCs (each an example of the DRCC(s)/PLC(s) 104 of FIG. 1). As depicted, user interface 800 depicts customer identifiers, status, regions, countries, quantities, and status details for the DRCCs/

PLCs. Although provided in tabular form, the data presented in user interface 800 may be differently formatted.

FIG. 3 is a block diagram 300 for illustrating an overview of a number of software tools available to a variety of entities corresponding to a cloud provider and/or a customer, according to at least one embodiment. Service provider tools (e.g., Tool(s) 302) may include management dashboard(s) 305. In some embodiments, management dashboard(s) 305 may be used to view lifecycle management data and financial information related to any suitable number of DRCCs (and/or PLCs) such as the DRCC(s)/PLC(s) 104 of FIG. 1.

Tool(s) 302 may include any suitable number of deployment management tools 306 (e.g., portals) to support end-to-end tracking of deployment or expansions of the DRCC/PLC (e.g., the DRCC(s)/PLC(s) 104 of FIG. 1). In some embodiments, deployment management tools 306 may be utilized by DRCC/PLC region teams, service teams, and account teams, among others.

Tool(s) 302 may include user interface(s) 308. User interface(s) 308 (e.g., FIGS. 5-24) may be utilized for any suitable combination of order tracking, incident management, facilities management, consumption reporting, capacity planning, change management, and alerts, to name a few. In some embodiments, user interface(s) 308 may be utilized by DRCC/PLC region teams, service teams, and account teams, among others.

Tool(s) 302 may include application programming interface(s) (API(s)) 310. API(s) 310 may be utilized to access metric data and/or data used by cloud lifecycle management tooling (e.g., ADW Lifecycle Management Application 228 of FIG. 2). In some embodiments, API(s) 310 may be utilized by DRCC/PLC region teams and service teams, among others.

Tool(s) 304 may include DRCC Console 312 (an example of DRCC OCC Console 128 of FIG. 1). DRCC Console 312 may be utilized to access metric data and/or data used for facilities management, consumption reporting, capacity planning, change management, and alerts, among other uses. In some embodiments, DRCC Console 312 may be utilized by DRCC/PLC region teams and service teams, among others. DRCC Console 312 may present any suitable combination of this data on any suitable combination of the user interfaces.

Figure 4:
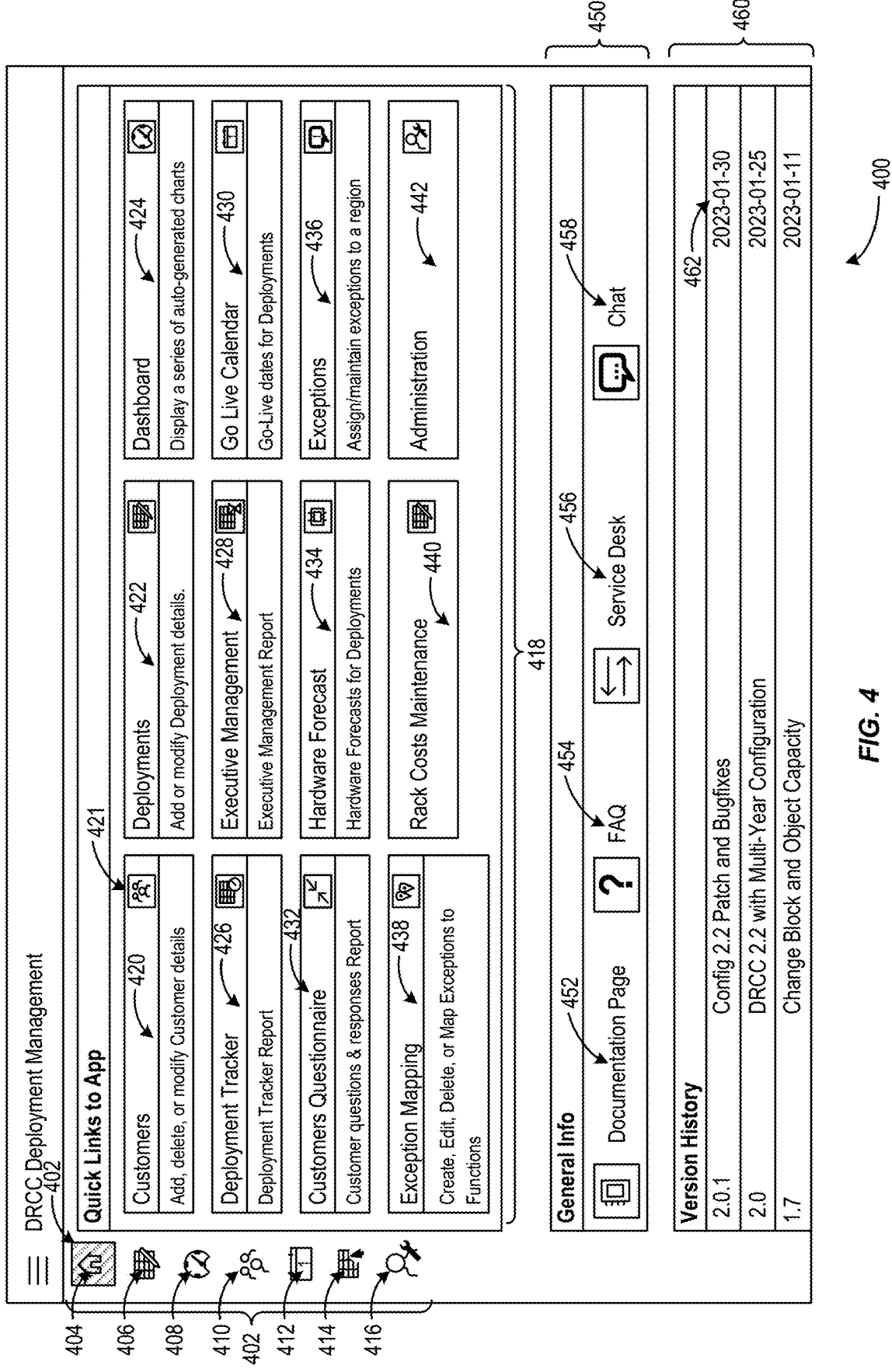
FIG. 4 is a block diagram for illustrating an exemplary user interface (e.g., a landing page) of a DRCC Deployment Management application, in accordance with at least one embodiment.

FIG. 4 is a block diagram for illustrating an exemplary user interface (UI) 400 (e.g., a landing page) of a DRCC Deployment Management application, in accordance with at least one embodiment. UI 400 may be a landing page of a DRCC Management Application (e.g., an example of the DRCC Lifecycle Management Application 144 of FIG. 1, the Lifecycle Management Application 228 of FIG. 2, etc.). UI 400 may include any suitable data associated with managing hardware, customers, deployments, administrative tasks, or any suitable aspect of a DRCC or DRCC component.

As depicted, UI 400 includes shortcuts 402 that may include any suitable number of links to any suitable number of user interfaces of the DRCC Management Application. By way of example, FIG. 4 includes home link 404, deployments link 406, dashboard link 408, customers link 410, go-live calendar link 412, reports link 414, and administrative link 416. In some embodiments, UI 400 may include quick links area 418. Quick links area 418 may include any suitable number of user interface elements such as UI elements 420-442. Each UI element may include any suitable combination of a page name, a description, and an icon, among other attributes not depicted. By way of example, UI element 420 may correspond to a customer page (e.g., UI 500 of FIG. 5). In some embodiments, UI 420 includes a page name "Customers," a description (e.g., add, delete, or modify Customer details), and icon 421. In some embodiments, UI 420 corresponds to customers link 410. Selection of either UI 420 or customers link 420 may cause the user to be navigated to UI 500 of FIG. 5.

As an illustrative example, UI 422 may correspond to deployments link 406. Selection of either UI 422 or deployments link 406 may cause the user to be navigated to UI 600 of FIG. 6. UI element 424 may correspond to dashboard link 408. Selection of either UI 424 or dashboard link 408 may cause the user to be navigated to UI 1500 of FIG. 15. Selection of UI 426 may cause the user to be navigated to UI 1700 of FIG. 17. Selection of UI 428 may cause the user to be navigated to an executive management page corresponding to link 1702 of FIG. 17. UI element 430 may correspond to go-live calendar link 412. Selection of either UI 430 or go-live calendar link 412 may cause the user to be navigated to UI 1600 of FIG. 16. Selection of UI 432 may cause the user to be navigated to customer questionnaire page corresponding to link 1704 of FIG. 17. Selection of UI 434 may cause the user to be navigated to UI 1800 of FIG. 18. Selection of UI 436 may cause the user to be navigated to an exceptions page corresponding to UI element 2002 of FIG. 20. Selection of UI 438 may cause the user to be navigated to an exceptions mapping page corresponding to UI element 2004 of FIG. 20. Selection of UI 440 may cause the user to be navigated to UI 1900 of FIG. 19. Selection of UI 442 may cause the user to be navigated to an administration page from which UI elements 2002-2008 of FIG. 20 may be accessed.

UI 400 may include area 450. Any suitable information may be presented in area 450. As depicted, area 450 may include link 452, link 454, link 456, and link 458. In some embodiments, selection of link 452 may cause the user to be navigated to an internal software documentation page. Selection of link 454 may navigate the user to a user interface on which a number of questions and answers associated with the Deployment Management Application may be presented. Selection of link 456 may navigate the user to a separate application and/or webpage with which the user may view service desk information (e.g., to open and/or view tickets related to software bugs). In some embodiments, selection of link 458 may navigate the user to a separate application or launch a separate application with which the user may engage in a chat session with one or more other users.

UI 400 may include area 460 which, as depicted, may display any suitable data related to DRCC management. In the example depicted in FIG. 4, area 460 presents version history data that indicates a number of versions and corresponding patches/bug fixes that have been implemented/applied. In some embodiments, the version history includes dates (as depicted at 462) on which the patch/bug fix was applied.

The data presented in user interface 400 may be differently formatted and may include additional data or may lack some of the data shown in FIG. 4.

Figure 5:
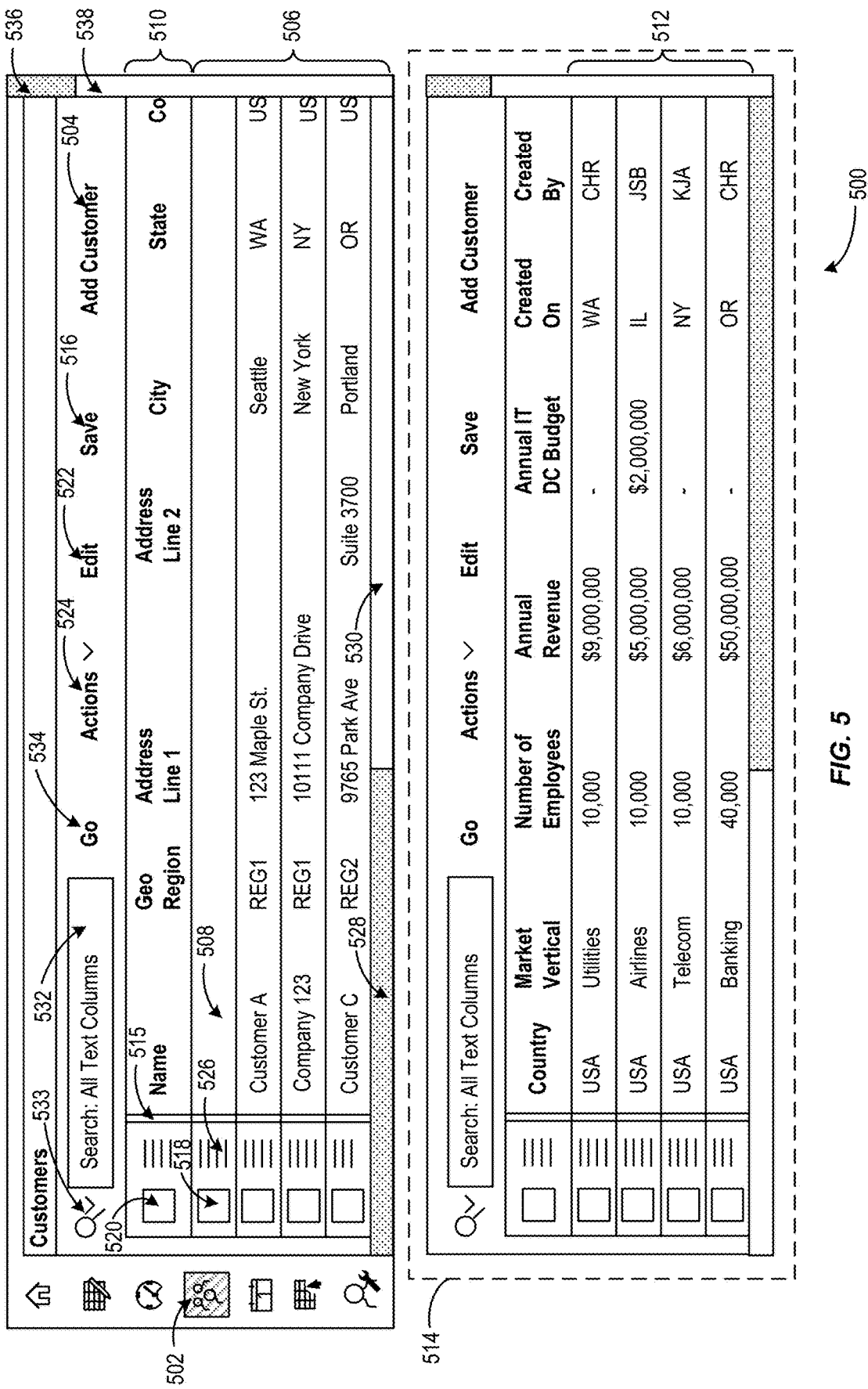
FIG. 5 is a block diagram for illustrating an exemplary user interface (e.g., a customer page) of a DRCC Deployment Management application, in accordance with at least one embodiment.

FIG. 5 is a block diagram for illustrating an exemplary user interface (UI) 500 (e.g., a customer page) of a DRCC Deployment Management application, in accordance with at least one embodiment. Selection of customers link 502 (e.g., customers link 410 of FIG. 4) may navigate the user to UI 500. UI 500 may include various UI elements and options for adding, deleting, and modifying customer data. By way of example, selection of UI element 504 may cause an additional entry within area 506 to appear, as depicted at 508. A new entry including any suitable customer data attribute value may be typed in within the new entry. By way of example, a user may select the point at 508 and enter a name of the customer represented by the newly added row. Row 510 may present any suitable customer data attribute names (e.g., name, geographical/geo region, address line 1, address line 2, city, state, country, market vertical, number of employees, annual revenue, annual information technology (IT) datacenter (DC) budget, created on (e.g., a date on which the entry was created), created by (e.g., an indication of the personnel that created the entry, or the like). Values corresponding to the customer data attribute names of row 510 may be provided in corresponding positions of the rows presented in area 506. Although a particular number and combination of customer data attributes names and attributes are provided in FIG. 5, any suitable number and combinations of customer data names and/or attributes may be utilized, not necessarily the ones presented in FIG. 5.

Area 506, and any suitable portion of the UIs of FIGS. 4-20 may be scrollable (e.g., horizontally and/or vertically). The UI elements within area 514 present a scrolled view of area 506. For example, the customer data may be presented within area as being at a left-most position of the area 506. Area 512 is intended to present additional customer data attributes/values of the same rows as scrolled to a right-most position of the scrollable area of the overlap of areas 506 and 512. In some embodiments, data and/or UI elements presented to the left of partition 516 may remain fixed as the content to the right of partition 516 is modified due to a scrolling action/input.

Any suitable changes to data within areas 506/512 may be saved/persisted based at least in part on selecting UI element 516. Similar UI elements in the FIGS. 5-20 may perform the same function (e.g., to save newly added and/or modified data within a corresponding data fields to which the UI element applied) and will not be specifically discussed again, for brevity. In some embodiments, an entry may be selected based at least in part on selecting UI element 518. Or each of the UI elements that are similar to UI element 518 within the rows of areas 506/512 may be selected based at least in part on selecting UI element 520. UI elements 518 and 520 are represented as a checkbox, however, any suitable UI element (e.g., radio button, edit box, etc.) may be similarly utilized to select an entry. In some embodiments, multiple entries may be selected simultaneously. Selection of UI element 522 may cause any suitable data field corresponding to selected entries within areas 506/512 to become editable. Actions menu 524 may be selected to provide a drop-down menu with additional actions (e.g., a delete action). The action selected via drop-down menu may be applied to any suitable selected entry. By way of example, upon selecting a deletion action via actions menu 524, any selected row within areas 506/512 may be deleted. The rows of areas 506/512 may be rearranged based at least in part on selecting UI element 526 and dragging the row to a desired position within areas 506/512. As the selected row is moved, other rows of the areas 506/512 may be repositioned depending on the current position of the selected row. To scroll horizontally within areas 506/512, UI element 528 may be selected and dragged (or otherwise moved) within area 530. To scroll vertically within areas 506/512, UI element 536 may be selected and dragged or otherwise moved within area 538. The UI elements 536 may additionally be manipulated based at least in part on keyboard inputs such as page up/page down to scroll vertically and left arrow/right arrow to scroll horizontally. The UI elements 528 and 536 may be positioned with areas 530 and 538, respectively, based on these keyboard inputs and position within the areas 506/512

UI 500 may include UI element 532 (e.g., a search bar). A search query may be entered within UI element 532. Upon selection of UI element 534, the search query entered via UI element 532 may be submitted and used to identify matching values of the customer data. Any matching attribute values may be highlighted to visually distinguish the values from other non-matching values. By default, the search scope may be set to search all columns of areas 506/512. UI element 533 may be selected to present a drop-down menu from which one or more options may be presented for various search scopes. By way of example, an option for searching only selected rows (e.g., rows selected via the UI element 518, or a similar UI element) may be provided within the drop-down menu corresponding to UI element 522. Any text provided via the UI 532 may be subsequently executed in light of the scope selected via UI element 533.

Any user interface discussed herein may include the UI elements 516-538 and these UI elements may be used within the corresponding user interfaces in a similar manner as described above in connection with FIG. 5. Such UI elements will not be discussed again, for brevity. The data presented in user interface 500 may be differently formatted and may include additional data or may lack some of the data shown in FIG. 5.

Figure 6:
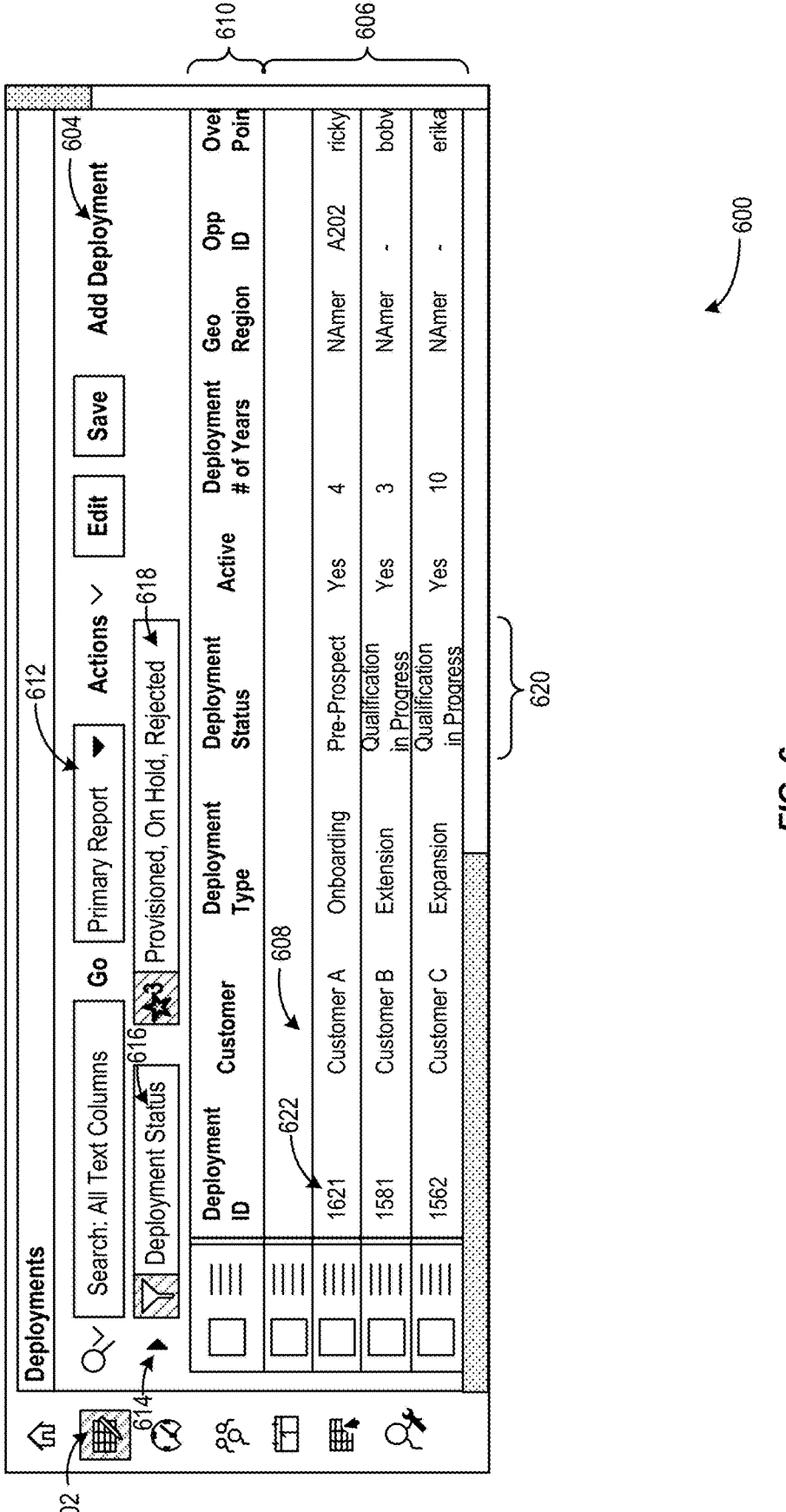
FIG. 6 is a block diagram for illustrating an exemplary user interface (e.g., a deployment page) of a DRCC Deployment Management application, in accordance with at least one embodiment.

FIG. 6 is a block diagram for illustrating an exemplary user interface (UI) 600 (e.g., a deployment page) of a DRCC Deployment Management application, in accordance with at least one embodiment. Selection of deployments link 602 (e.g., deployments link 406 of FIG. 4) or UI 422 of FIG. 4 may navigate the user to UI 600. UI 600 may include various UI elements and options for adding, deleting, and modifying deployment data. By way of example, selection of UI element 604 may cause an additional entry within area 606 to appear, as depicted at 608. A new entry including any suitable deployment data attribute value may be typed in within the new entry. By way of example, a user may select the point at 608 and enter a name of the customer within the newly added row. Row 610 may present any suitable deployment data attribute names (e.g., deployment identifier (ID), customer name, deployment type, deployment status, active, deployment number of years, geo/geographical region, opportunity (opp) ID, overlap point of contact, created on (e.g., a date on which the entry was created), created by (e.g., an indication of the personnel that created the entry), or the like). Values corresponding deployment data attribute names of row 610 may be provided in corresponding positions of the rows presented in area 606. Although a particular number and combination of deployment data attributes names and attributes are provided in FIG. 6, any suitable number and combinations of deployment data names and/or attributes may be utilized, not necessarily the ones presented in FIG. 6. Any suitable portion of the UI 600 (e.g., area 606) may be scrollable (e.g., horizontally and/or vertically).

In at least one embodiment, the system may automatically generate a deployment ID (e.g., deployment ID 622) for the newly added entry. Each entry within area 606 may be associated with a deployment type (e.g., onboarding, extension, expanding, etc.). In some embodiments, a deployment type of "onboarding" may refer to deployments that are not yet operational within a datacenter, but rather, are in the planning stages leading up to operational usage. "Extension" refers to a deployment type that extends an already existing DRCC to be operated at the customer's premises for an extended period of time (e.g., longer than originally agreed upon). "Expansion" refers to a deployment type that is associated with expanding the hardware components at the customer's premises to provide a greater amount of capacity to the customer's DRCC. A "deployment status" attribute may be any suitable value (e.g., pre-prospect, prospect, qualification in progress, qualified, approval 1, approval 2, deployed) to indicate the status of a deployment. The values corresponding to the data attribute "active" may be used to toggle, or otherwise hide from view, a row corresponding to the attribute. The deployment number of years attribute is intended to refer to an attribute that indicates a number of years the DRCC is expected to be operating at the customer's premises. The geographical region attribute can be used to indicate a geographical region in which the DRCC is (or will be) located.

In some embodiments, UI 600 may include UI element 612 which may include a drop-down menu from which one or more reports may be selected. Selections from UI element 612 may cause the data presented within area 606 to be updated to present any suitable data corresponding to the selected report.

In some embodiments, UI 600 may include UI element 614 which may be used to select one or more filters and/or sorting parameters from a set of predefined filters/sorting parameters. By way of example, UI element 614 may be selected to present a set of filters from which UI element 616 and UI element 618 may be selected. UI element 614 may be selected again to display only the selected filters/sorting parameters, in this case, corresponding to UI elements 616 and 618. In some embodiments, the selected filters/sorting parameters may be utilized separately or together. As a non-limiting example, UI element 616 may be presented to indicate that a filter is being applied to the attribute "deployment status" corresponding to column 620. UI element 618 may indicate particular values of the attribute indicated with UI 616, including "provisioned," "on hold," and "rejected." Selecting the UI elements 616 and 618 may cause filtering in which the rows of area 606 (and any currently non-visible portion of area 606) may be filtered such that no row with the values "provisioned," "on hold," or "rejected" in column 620 will be presented. Filtering is depicted in other figures below and in a similar manner as discussed above in connection with FIG. 6 above.

The data presented in user interface 600 may be differently formatted and may include additional data or may lack some of the data shown in FIG. 6. Selecting a deployment ID (e.g., deployment ID 622) may navigate the user to UI 700.

Figure 7:
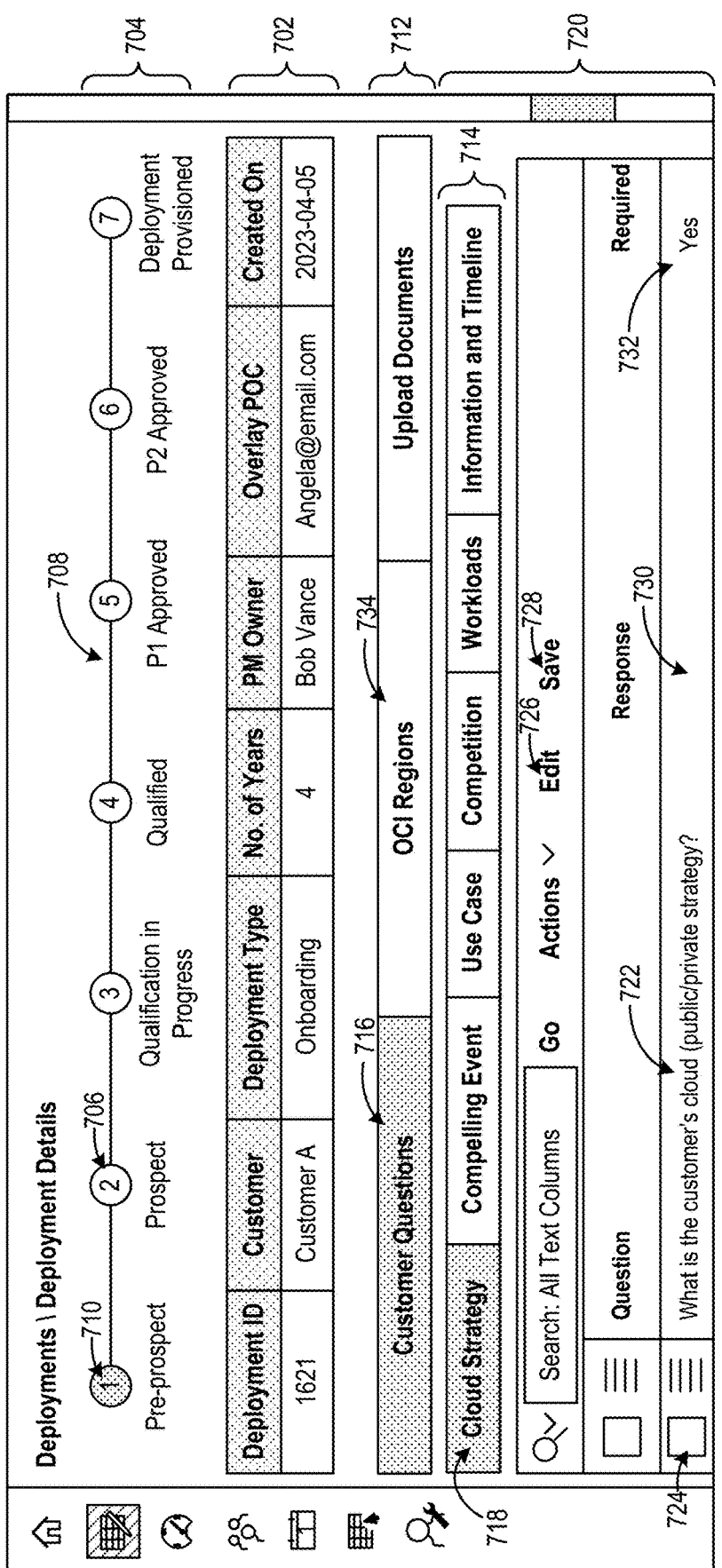
FIG. 7 is a block diagram for illustrating an exemplary user interface (e.g., a deployment details page) of a DRCC Deployment Management application, in accordance with at least one embodiment.

FIG. 7 is a block diagram for illustrating an exemplary user interface (UI) 700 (e.g., a deployment details page) of a DRCC Deployment Management application, in accordance with at least one embodiment. UI 700 may be presented in response to selecting link associated with a deployment ID (e.g., deployment ID 622). UI 700 may include various UI elements and options for adding, deleting, viewing, and modifying deployment details (e.g., attributes and corresponding values, documents, etc.) corresponding to a particular deployment (e.g., a deployment corresponding to deployment ID 1621, as depicted).

In some embodiments, UI 700 includes area 702. Area 702 may present any suitable deployment data corresponding to a particular deployment (e.g., a deployment for customer A that is associated with deployment ID 1621). In some embodiments, deployment data may include, but is not limited to, a deployment identifier, a customer identifier, a deployment type, a number of years, a deployment owner (PM owner), an overlay point-of-contact (POC), a created-on date, a created by date, and the like). Any suitable portion of the deployment data may be presented in area 702. In some embodiments, the deployment data of area 702 may remain fix as the user navigates and/or interacts with other UI elements of UI 700. In some embodiments, should the user scroll vertically within UI 700, the area 702 may remain fixed to persistently present the deployment data, or the area 702 may be scrolled (e.g., potentially off screen) based at least in part on any suitable scroll actions or input.

Area 704 may include additional deployment details and a sequence representation. As depicted in FIG. 7, area 704 includes a sequence representation that indicates all possible values and a sequential order of those values that represent progression of a deployment state from pre-prospect to deployment provisioned states. Area 704 may include graphical element 706 representing a second state (e.g., prospect) of the sequence representation 708, the second state corresponding to a "prospect" state. The DRCC Deployment Management Application may track deployment data (including any suitable updates to the deployment data provided via UIs 400-1900, or as a result of inputs provided via UIs 400-1900) to identify one or more conditions that, when met, indicate a state transition is warranted. The DRCC Deployment Management Application may, based on this indication, transition the deployment from one state to another based on tracking the deployment state and the indication that the transition is warranted. In some embodiments, a graphical element (e.g., graphical element 710) representing the current state of the deployment (e.g., pre-prospect) may be colorized, or otherwise visually distinguished from the graphical elements corresponding to the other possible deployment states. The colorization (or other visual distinction) may provide the user an indicate of the current state of the deployment at a glance.

Area 712, as depicted, may include any suitable number of tabs corresponding to respective sections of the UI 700. Area 714 may present any suitable number of options corresponding to the selection provided in area 712. By way of example, selecting tab 716 corresponding to "customer questions," may cause a number of options to be provided within area 714. The options provided in area 714 may include "cloud strategy" (corresponding to option 716), compelling event, use case, competition, workloads, and information and timeline. The data provided within area 720 may be updated to correspond to the selection made within areas 712 and 714. By default, tab 716 ("customer questions") and option 718 may be selected and a number of customer questions corresponding to a cloud strategy may be accessible. By way of example, a first question (e.g., question 722, "what is the customer's cloud public/private strategy?"), among other questions, may be presented in area 720. Selecting other options within area 714 may cause additional customer questions corresponding to each option to be presented in area 720, replacing any previous question displayed which corresponds to a different option. The user may select the UI element 724, followed by UI element 726, to make the attribute values of the row corresponding to UI element 724 editable. The user may select 728 to save the changes made at 726 and 728. Attribute value 732 may be used to indicate whether a particular question is required for a deployment request to be submitted. In some embodiments, the DRCC Deployment Management Application may be configured to perform a number of predefined validation operations to validate and verify that all required responses corresponding to the questions of any of the options provided within area 714 (e.g., before enabling a DRCC deployment request (e.g., a DRCC hardware order) to be submitted for review and approval).

Customer questions corresponding to a compelling event may include any suitable question (e.g., questions selected from a predefined set of questions associated with a compelling event question category) including, but not limited to:

Is the customer deploying a new application (e.g., AI applications)?

Is the customer deploying a brand, new datacenter?

Is there a datacenter/app modernization initiative?

Is there a private cloud refresh?

Is there an Exadata/OCC1 refresh?

Is this driven by a compliance/security mandate?

Does the customer have existing workloads in OCI?

A number of compelling event questions may be selected from a predefined set of questions (e.g., selected based at least in part on being associated with the compelling event question category) and presented upon selection of the compelling event question option.

Use case questions (e.g., questions associated with a use case question category) may pose any suitable question related to how the customer intends to use the DRCC (e.g., "Is the user going to use the DRCC for low latency applications?", "Is OCI public region an option for the customer's workloads?", what is the customer's disaster recovery strategy?", and the like). A number of use case questions may be selected from a predefined set of questions (e.g., selected based at least in part on being associated with the use case question category) and presented upon selection of the user case question option.

Customer questions that are associated with a competition question category may be ones that ask any suitable question regarding the customers public and/or private cloud competitors (e.g., "Who are the customer's Public Cloud competitors?", "Who are the customer's Private Cloud competitors?", and the like). A number of competition questions may be selected from a predefined set of questions (e.g., selected based at least in part on being associated with the competition question category) and presented upon selection of the competition question option.

In some embodiments, customer questions that are associated with a workload question category may include any suitable question that is directed to ascertaining any suitable aspect of the customer's workloads. For example, a workload question may include "what are the customer's main workloads for DRCC?" (e.g., name of the workload, a mapping of the customer's workloads to corresponding OCI services, and the like). A number of workload questions may be selected from a predefined set of questions (e.g., selected based at least in part on being associated with the workload question category) and presented upon selection of the workload question option.

In some embodiments, an information and technology question category may include any suitable question selected from a predefined set of questions corresponding to the information and technology question category. Some example questions include "Who are the key decision makers on the customer side?", "What is the customer's budget for the DRCC?", "Describe the customer's sales cycle.", "What is the timeline for application migration?", "Does the customer need migration services?", and the like. A number of information and technology questions may be selected from a predefined set of questions (e.g., selected based at least in part on being associated with the information and technology question category) and presented upon selection of the information and technology question option.

The data presented in user interface 700 may be differently formatted and may include additional data or may lack some of the data shown in FIG. 7. Selecting tab 734 may navigate the user to UI 800.

FIG. 8 is a block diagram for illustrating user interface elements for managing regions via a deployment details page (e.g., user interface (UI) 800) of a DRCC Deployment Management Application, in accordance with at least one embodiment. UI 800 may be an example of the UI 700 of FIG. 7. The area 802 may correspond to area 720 of FIG. 7 and may be updated based at least in part on the selection of tab 804 (e.g., the tab 734 of FIG. 7). UI 800 may include various UI elements and options for adding, deleting, and modifying region data corresponding to one or more regions. By way of example, selection of UI element 806 may cause an additional entry within area 808 to appear, as depicted at 810 with row 811. Although a new entry was inserted at the top position of the entries within area 512 of FIG. 5, it should be appreciated that a new entry may be inserted at any suitable position such as bottom-most position of the entries as depicted in FIG. 8.

Any suitable region data attribute value may be provided within the new entry (e.g., via text input) or may be selected from user interface elements, menus, and options provided within the attribute area. In one example, a user may select the point at 810 and enter a name of the region represented by the newly added row. Row 812 may present any suitable customer data attribute names of the region data (e.g., datacenter ID, name, geographical/geo region, address line 1, address line 2, or the like). Values corresponding to the region data attribute names of row 812 may be provided in corresponding positions of the rows presented in area 806. Although a particular number and combination of region data attributes names and attributes are provided in FIG. 8, any suitable number and combinations of customer data names and/or attributes may be utilized, not necessarily the ones presented in FIG. 5. The system and/or DRCC Deployment Management Application may generate a datacenter ID for the newly entered data upon selection of UI element 822. Generating the datacenter ID may be dependent on performing a number of predefined validation operations to validate the attribute values provided within row 811 against a predefined protocol set associated with validating attribute values corresponding to region data.

UI element 816 may be provided for submitting a deployment request. In some embodiments, the UI element 816 may be disabled until a number of predefined conditions have been met. By way of example, UI element 816 may remain disabled until at least one region is defined, and responses have been provided (e.g., via the UI elements presented upon selection of tab 818, an example of tab 716 of FIG. 7) for every required customer question.

The data presented in user interface 800 may be differently formatted and may include additional data or may lack some of the data shown in FIG. 8. Selecting datacenter ID 820 may navigate the user to UI 900.

Figure 9:
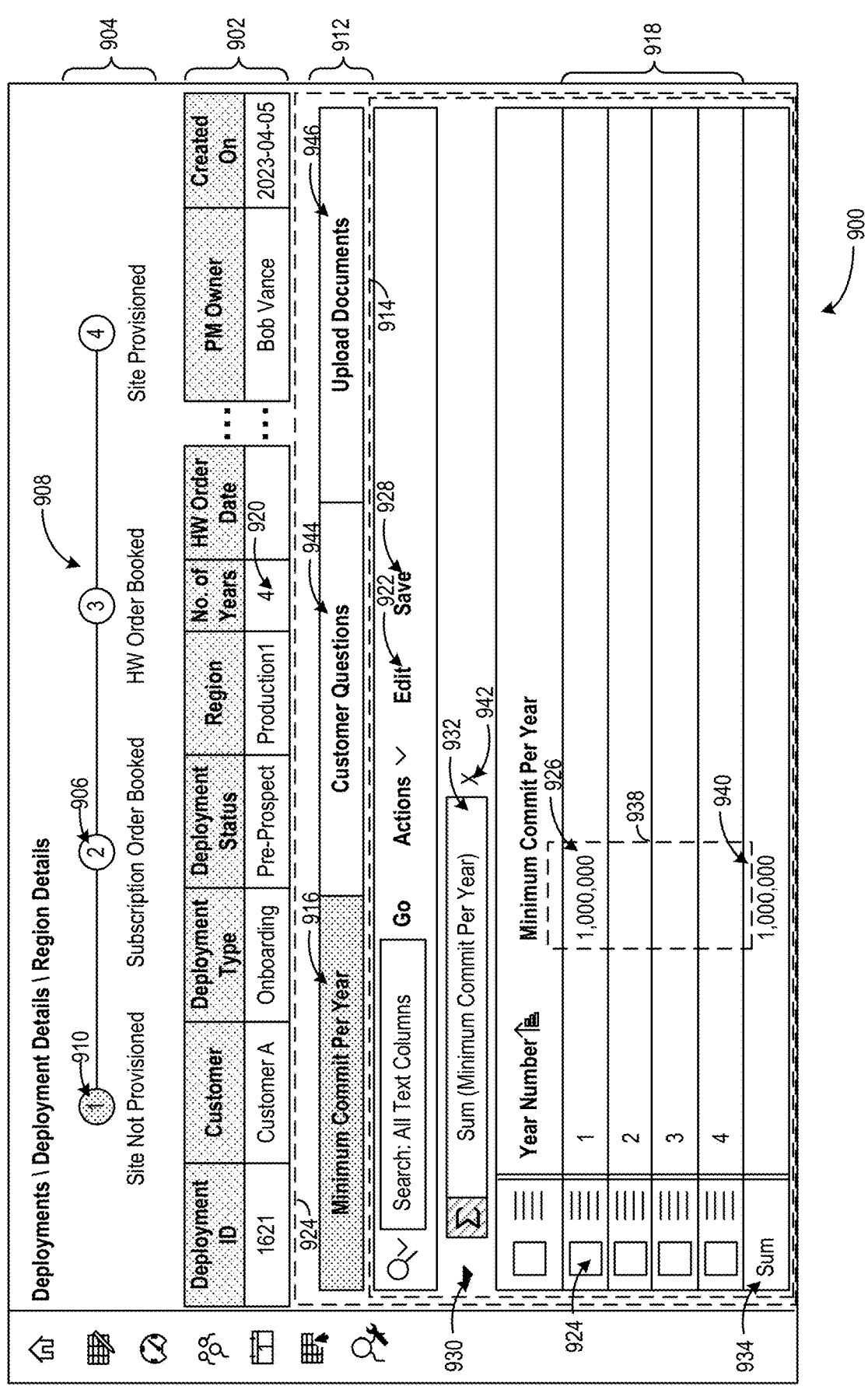
FIG. 9 is a block diagram for illustrating an exemplary user interface (e.g., a region details page) of a DRCC Deployment Management application, in accordance with at least one embodiment.

FIG. 9 is a block diagram for illustrating an exemplary user interface (UI) 900 (e.g., a region details page) of a DRCC Deployment Management application, in accordance with at least one embodiment. UI 900 may be presented upon selection of the datacenter ID 820 of FIG. 8.

In some embodiments, UI 900 includes area 902. Area 902 may present any suitable region data corresponding to a particular region (e.g., the region associated with datacenter ID 1661) and/or deployment data that is associated with that region. In some embodiments, the data presented within area 902 may include, but is not limited to, a deployment identifier, a customer identifier, a deployment type, a deployment status, a number of years, a hardware order date, a PM owner and/or contact information regarding the same, a created-on date, a created by date, or the like). Any suitable combination of deployment data and/or region data may be presented in area 902. In some embodiments, the deployment data of area 902 may remain fix as the user navigates and/or interacts with other UI elements of UI 900. In some embodiments, should the user scroll vertically within UI 900, the area 902 may remain fixed to persistently present the deployment data, or the area 902 may be scrolled (e.g., potentially off screen) based at least in part on any suitable scroll actions or input.

Area 904 may include additional region details and a sequence representation. As depicted in FIG. 9, area 904 includes a sequence representation that visually indicates all possible values and a sequential order of those values that represent progression of a region state from a first state (e.g., a site-not-provisioned state) to a last state (e.g., a site-provisioned state) through any suitable number of intermediate states (e.g., through a subscription-order-booked state and a hardware-booked state, as depicted). The number and particular states presented are not intended to limit this disclosure, a different number and/or combination of states may be similarly utilized. Area 904 may include graphical element 906 representing a second state (e.g., subscription order booked) of the sequence representation 908, the second state corresponding to a "subscription order booked" state. The DRCC Deployment Management Application may track the region data (including any suitable updates to the region data provided via UIs 900-1400) to identify one or more conditions that, when met, indicate a state transition is warranted. The DRCC Deployment Management Application may, based on this indication, transition the region from one state to another based on tracking the region state and the indication that the transition is warranted. In some embodiments, a graphical element (e.g., graphical element 910) representing the region's current state (e.g., pre-prospect) may be colorized, or otherwise visually distinguished from the graphical elements corresponding to the other possible region states. The colorization (or other visual distinction) may provide the user an indicate of the current state of the region at a glance.

Area 912, as depicted, may include any suitable number of tabs corresponding to respective sections of the UI 900. Area 914 may present any suitable data and/or UI elements corresponding to the selection provided in area 912. By way of example, selecting tab 916 corresponding to "minimum commit per year," the data and/or UI elements depicted within area 914 may be presented. The number of entries presented within area 918 may be fixed and determined based at least in part on one or more attribute values of the region data. By way of example, four entries may be presented within area 918 based at least in part on the attribute value (e.g., "4") associated with the number of year attribute of the deployment data that is associated with the region as depicted at 920. The data provided within area 914 may be updated to correspond to the selection made within areas 912. By default, tab 916 ("minimum commit per year") may be selected and a number of entries (e.g., 4) may be presented via area 918. Attribute values for some of the attributes presented within area 918 (e.g., year number, 1, 2, 3, and 4) may be prepopulated and immutable, regardless of the selections made with UI element 922

To edit data attributes of the entries within area 918, the user may select UI element 924, followed by UI element 922, to make the attribute values of the row corresponding to UI element 924 editable. In the example provided, an attribute value corresponding to the minimum commit per year may be editable while the attribute value "1" corresponding to the year value is not editable. The user may provide a value at 926 (e.g., 1,000,000) and select 928 to save the change.

In some embodiments, the user may select UI element 930 from which any suitable filter, sort parameter, and/or function may be selected. A selected function (e.g., a summation of the values of a column associated with the attribute "minimum commit per year") may be selected as depicted with UI element 932. Selection of this function may cause an additional UI element (e.g., UI element 934) to be presented (e.g., adjacent to the area 916 as depicted). UI element 934 may indicate the function (e.g., Sum) to be applied. As the user enters input within area 938 corresponding to the attribute values of the attribute to which the function is to be applied, the value 940 may be updated to reflect the resultant value of applying the function to the attribute values of the area 938. UI element 942 may be selected to remove UI element 934, if desired.

Selecting tab 944 may navigate the user to a similar UI as UI 700 of FIG. 7, however, this UI may be configured to present customer questions that are directed to the region, rather than being directed to the deployment as discussed above in connection with FIG. 7. Selecting tab 946 may navigate the user to UI 1000 of FIG. 10.

The data presented in user interface 900 may be differently formatted and may include additional data or may lack some of the data shown in FIG. 9.

Figure 10:
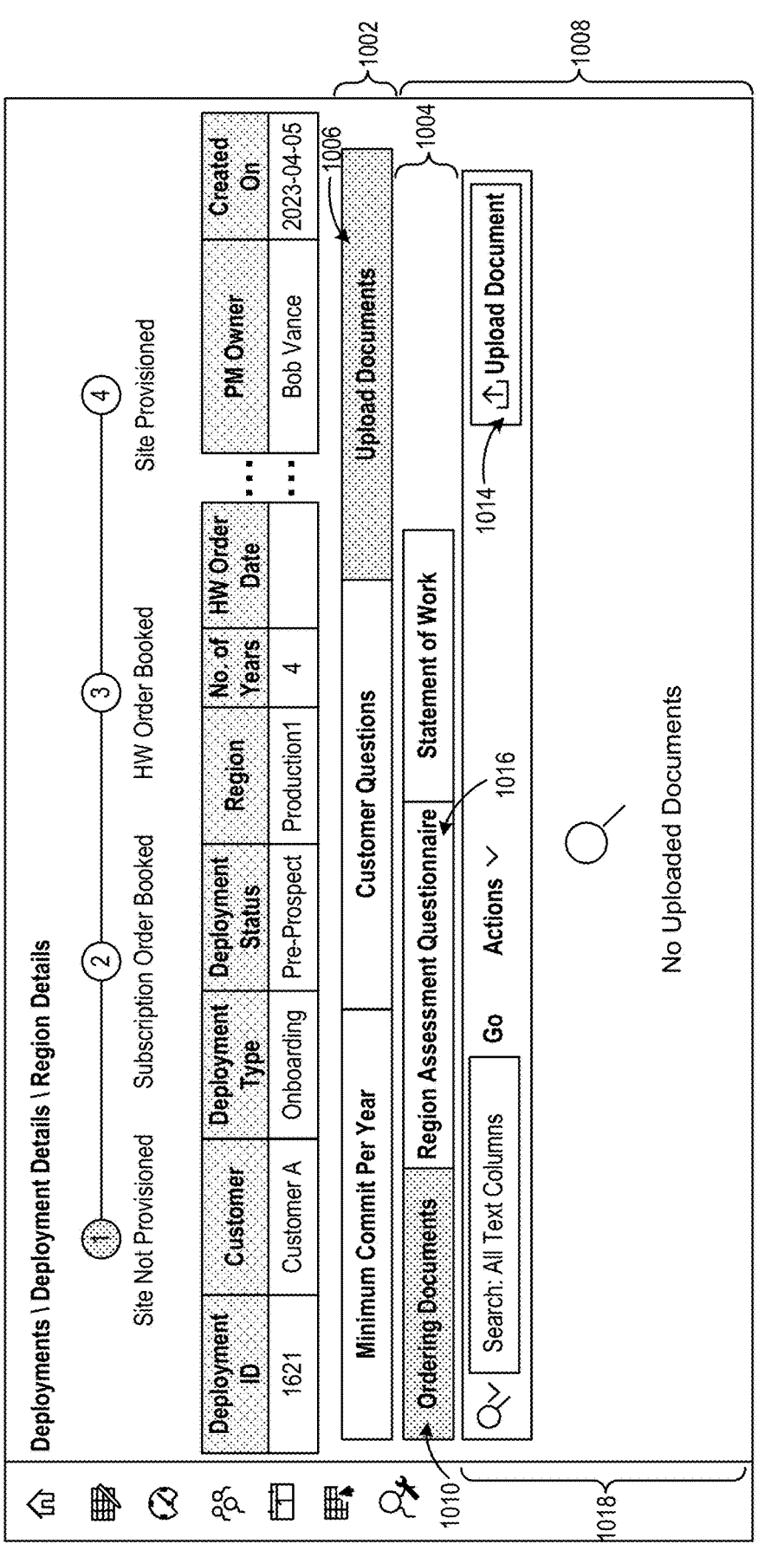
FIG. 10 is a block diagram for illustrating exemplary user interface elements of a region details page of a DRCC Deployment Management application, in accordance with at least one embodiment.

FIG. 10 is a block diagram for illustrating exemplary user interface (UI) elements of a region details page (e.g., user interface (UI) 1000) of a DRCC Deployment Management application, in accordance with at least one embodiment. UI 1000 may be an example of the UI 900 of FIG. 9.

Area 1002 may correspond to area 912 of FIG. 9 and, as depicted, may include any suitable number of tabs corresponding to respective sections of the UI 900. Area 1004 may present any suitable number of options corresponding to the selection provided in area 1002. By way of example, selecting tab 1006 corresponding to "upload documents" may cause options corresponding to "ordering documents," "region assessment questionnaire," and "statement of work" to be presented within 1004. The data provided within area 1008 may be updated to correspond to the selection made within areas 1002 and/or 1004. By default, upon selection of tab 1006, option 1010, corresponding to an "ordering documents" option, may be selected. Selecting other options within area 1004 may cause data and/or UI elements corresponding to each option to be presented, replacing presentation of any previous data and/or UI elements corresponding to a different option. The user may select the UI element 1014 to bring up additional UI elements (e.g., a popup window and/or buttons, text fields, edit boxes, or the like) with which the user may initiate an upload of one or more documents. In some embodiments, each of the options of area 1004 may be associated with a predefined storage location, naming convention, or the like, or the documents uploaded with the UI element 1014 of a given option (e.g., option 1010) may be associated with one another and/or differentiable from the documents uploaded in association with a different option. As a non-limiting example, documents uploaded in connection with option 1010 (e.g., an "ordering documents" option) may be stored in a separate location than the documents uploaded in connection with option 1016 (e.g., a "region assessment questionnaire" option). The documents uploaded in connection with option

1010 may be presented within area 1018 when option 1010 is selected, while the documents uploaded in connection with option 1016 may be presented in area 1018 when option 1016 is selected.

The data presented in user interface 1000 may be differently formatted and may include additional data or may lack some of the data shown in FIG. 10.

Figure 11:
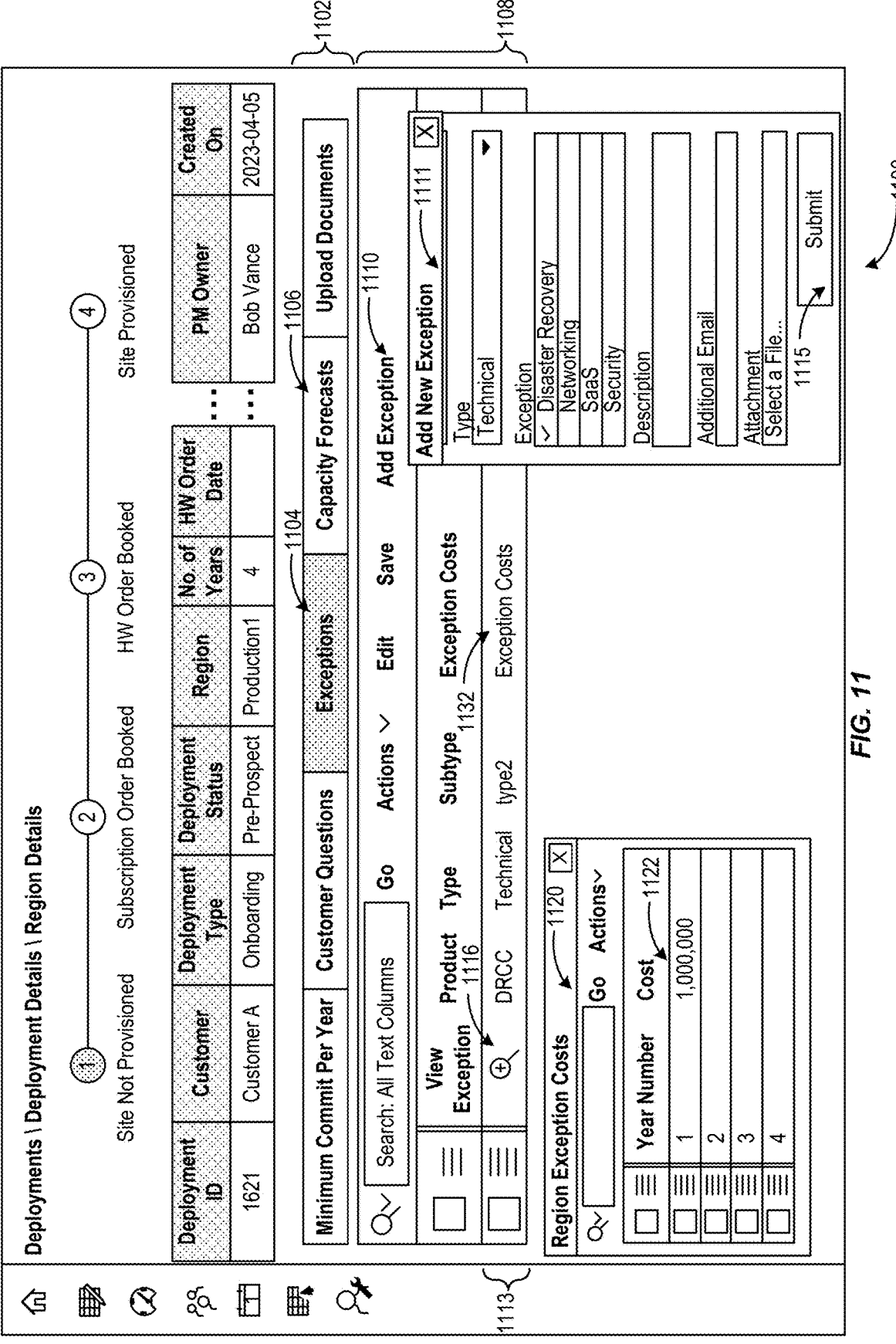
FIG. 11 is a block diagram for illustrating exemplary user interface elements corresponding to an exceptions tab of a region details page, in accordance with at least one embodiment.

FIG. 11 is a block diagram for illustrating exemplary user interface (UI) elements corresponding to an exceptions tab of a region details page (e.g., user interface (UI) 1100), in accordance with at least one embodiment. UI 1100 may be an example of the UI 900 of FIG. 9. In some embodiments, at least some of the options provided within area 1102 (corresponding to area 912 of FIG. 9) may be unavailable/unpresented until the deployment has been transitioned to a particular state (e.g., a qualified state corresponding to UI element 830 of FIG. 8) after the user has submitted a deployment request via UI element 816 of FIG. 8. In some embodiments, the system may be configured to execute one or more validation procedures and/or operations on any suitable combination of the deployment data and/or region data presented and/or discussed above in connection with FIGS. 6-10. In some embodiments, submitting a deployment request may cause the system to transmit an electronic communication to the PM owner (e.g., Bob Vance). Upon the PM owner's review and approval of the deployment request (which may be provided via a user interface hosted by the DRCC Deployment Management Application), the deployment status associated with this deployment can be transitioned to a "qualified" state. The DRCC Deployment Management Application may track the deployment data (including any suitable updates to the deployment data provided via UIs 400-1900) to identify one or more conditions that, when met, indicate a state transition is warranted. The DRCC Deployment Management Application may, based on this indication, transition the deployment from one state to another based on the indication that the transition is warranted.

Tabs 1104 and 1106 may be presented after the deployment has been transitioned to a particular state (e.g., the "qualified" state). The content presented within area may be updated based at least in part on the selections made within area 1102. As presented, area 1108 includes data and/or UI elements corresponding to the tab 1104. UI elements 1111 and 1112 may initially be hidden from view. In some embodiments, the user may desire to request a hardware exception (e.g., a hardware request that deviates from a standard hardware configuration of a DRCC). To do so, the user may select UI element 1110. In some embodiments, this selection may update area 1108 to include row 1113 where any suitable attribute value of the exception may be provided. Alternatively, in some embodiments, selecting UI element 1110 may cause UI element 1111 (e.g., a pop-up window overlaid atop the UI 1100) to be presented. UI element 1111 may include any suitable number of additional UI elements (e.g., checkboxes, edit boxes, radio button, drop-down menus, etc.) with which any suitable number of attributes corresponding to an exception may be provided. The UI element 1111 may be horizontally and/or vertically scrollable. Upon selection of UI element 1115, the system may perform a number of validation procedures and/or operations to validate the input provided with UI element 1111 (e.g., to verify that the input provided within UI element 1111 matches a set of allowed attribute values, to verify that attribute values were provided for each of a set of required attributes, etc.). In some embodiments, presentation of UI element 1111 may persist if at least one validation procedure/operation fails. Alternatively, if all validation procedures/operations pass, an entry corresponding to row 1113 may be presented within area 1108. In some embodiments, the user may select UI element 1116 to view the attribute values within another UI element similar to the UI element 1111 (e.g., a pop-up entitle "View Exception," not depicted).

An exception may be associated with a cost. In some embodiments, the user may select UI element 1118 (or a corresponding UI element within UI element 1111) to present UI element 1120. UI element 1120 may be a pop-up window or the data and/or UI elements of UI element 1120 may be presented within area 1108. In some embodiments, the corresponding cost associated with one or more exceptions may be ascertainable from UI element 1120. UI element 1120 may include any suitable number of entries (e.g., one entry per year of the number of years associated with the deployment). Each entry may include a value quantifying a total cost for all exceptions corresponding to that entry. As an example, $1,000,000 is presented at 1122 and may be used to indicate that the total cost for all exceptions corresponding to year 1 of this deployment (e.g., the deployment associated with deployment ID 1621). Any suitable number and types of exceptions may be defined within UI 1100. Each modification/addition may cause the associated total cost for the year and/or overall costs to be updated, regardless of whether the yearly/overall cost is currently displayed.

The data presented in user interface 1100 may be differently formatted and may include additional data or may lack some of the data shown in FIG. 11.

Figure 12:
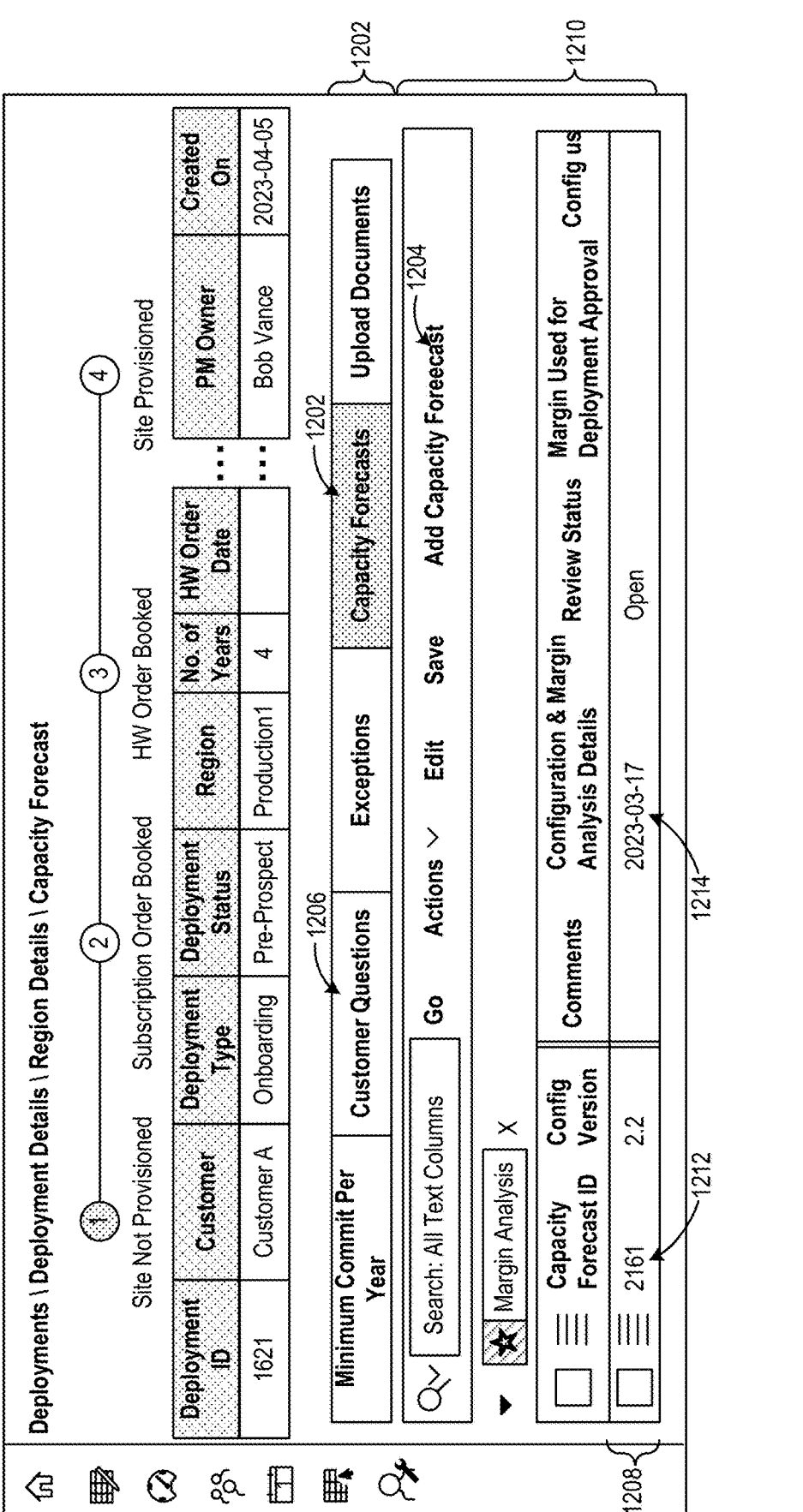
FIG. 12 is a block diagram for illustrating exemplary user interface elements corresponding to a capacity forecast tab of a region details page of a DRCC Deployment Management application, in accordance with at least one embodiment.

FIG. 12 is a block diagram for illustrating exemplary user interface (UI) elements corresponding to a capacity forecast tab of a region details page (e.g., user interface (UI) 1200) of a DRCC Deployment Management application, in accordance with at least one embodiment. UI 1200 may be an example of the UI 900 of FIG. 9. In some embodiments, UI 1200 may be presented in response to receiving selection of the tab 1202 (e.g., the tab 1106 of FIG. 11). In some embodiments, the user may select UI element 1204 to add a capacity forecast. In response to this selection, the system may be configured to generate a capacity forecast based at least in part on any suitable response provided with respect to any suitable number/combination of questions presented via tab 1206. In some embodiments, selecting UI element 1204 may present the user with additional UI elements (e.g., a pop-up window) with which parameters of the generation of the capacity forecast may be identified. In some embodiments, selection of the UI element 1204 alone generates the capacity forecast according to a predefined set of parameters. The capacity forecast may be associated with a capacity forecast ID (e.g., presented in UI element 1212).

Once generated, the capacity forecast may be accessible via row 1208 of area 1210. By way of example, the capacity forecast may be presented in response to receiving an indication that UI element 1210 was selected. Selecting UI 1212 may navigate the user to UI 1300 of FIG. 13.

The data presented in user interface 1200 may be differently formatted and may include additional data or may lack some of the data shown in FIG. 12.

Figure 13:
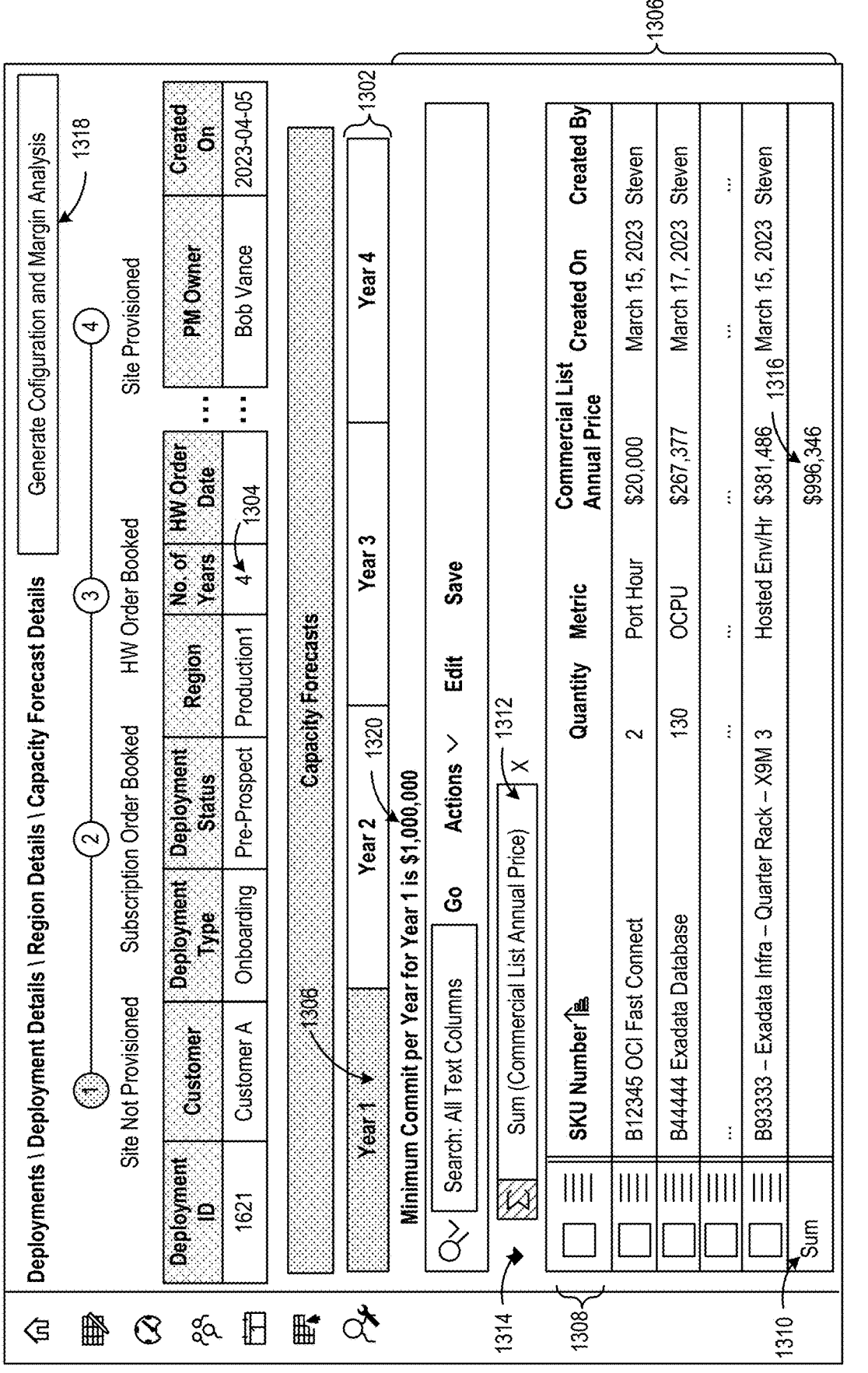
FIG. 13 is a block diagram for illustrating an exemplary user interface (e.g., a capacity forecast details page) of a DRCC Deployment Management application, in accordance with at least one embodiment.

FIG. 13 is a block diagram for illustrating an exemplary user interface (UI) 1300 (e.g., a capacity forecast details page) of a DRCC Deployment Management application, in accordance with at least one embodiment. UI 1300 may be presented in response to receiving an indication that UI element 1212 of FIG. 12 has been selected. UI 1300 may include area 1302 with which a number of options (e.g., options corresponding to the number of years specified at 1304 in the deployment data that corresponds to this capacity forecast). Each option may correspond to a particular year of the number of years presented at 1304. As depicted, area 1306 presents the capacity forecast details for year 1 as option 1308 is selected by default. Selecting any of the options within area 1302 may transition the area 1306 to present capacity forecast details corresponding to the selected option. Capacity forecast details may include any suitable number of entries of a capacity forecast. A capacity forecast may indicate one or more entries that correspond to a component (e.g., a hardware, software, or networking component) needed (or at least predicted as being needed) for the deployment based at least in part on the responses provided via the UI 700 and/or based on any suitable data provided via UIs 4-12. In some embodiments, row 1308 may indicate any suitable attribute of a capacity forecast including, but not limited to, a SKU number (e.g., any suitable identifier that uniquely identifies a hardware, networking, or software component), a quantity needed, a metric associated with the component, a commercial list annual price (or any suitable cost associated with the component), created on and/or created by identifiers (e.g., indicating an entity that created the data corresponding to each entry).

The area 1306 may further include entry 1310 which may correspond to a function (e.g., a summation of the attribute values corresponding to the attribute "commercial list annual price") as depicted at 1312. The summation function may be selected and applied by default, or the summation function may be selected via UI element 1314. A total of the attribute values for the "commercial list annual price" attribute may be provided at 1316. The user may reposition the entries within area 1306 and/or edit as desired until the capacity forecast is accurate/as desired.

In some embodiments, UI element 1318 may be used to generate a configuration and margin analysis. In some embodiments, UI element 1318 may be disabled by default and enabled only when the sum of a given year (e.g., presented at 1316) equals or exceeds a minimum commit amount identified via area 918 of FIG. 9. Informational text 1320 may be presented for as long as the sum presented at 1316 is less than the minimum commit identified for year 1. If and when the sum is equal to or greater than the minimum commit for that year, the information text 1320 may be removed from UI 1300 and UI element 1318 may be enabled. When disabled, selection of UI element 1318 may result in no action. When enabled, selecting UI element 1318 may cause the system to generate a configuration and margin analysis according to predefined protocol set. Once generated, a link may be generated by the system and presented via UI 1200 at 1214. Selecting the UI element at 1214 may navigate the user to UI 1400 of FIG. 14.

The data presented in user interface 1300 may be differently formatted and may include additional data or may lack some of the data shown in FIG. 13.

Figure 14:
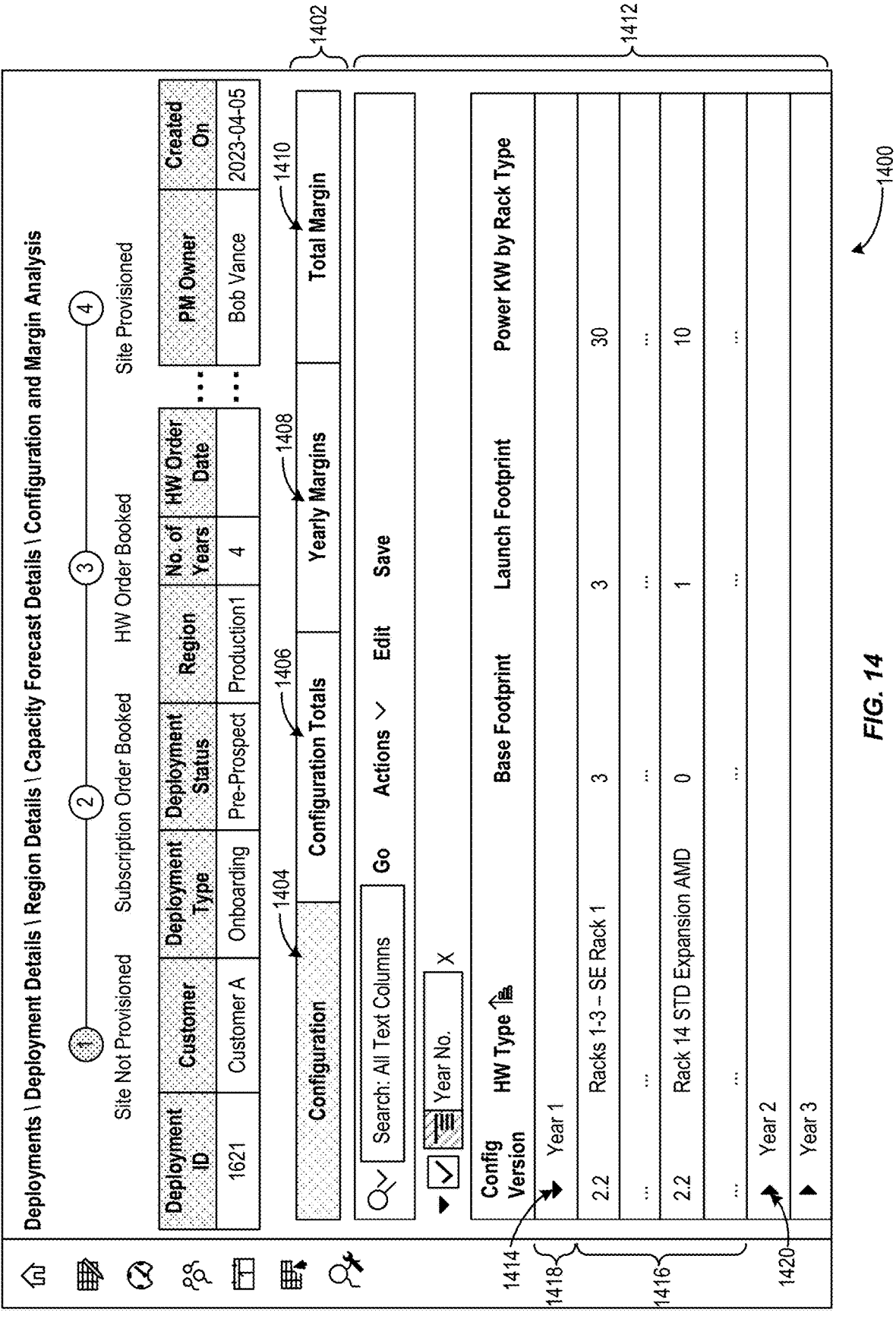
FIG. 14 is a block diagram for illustrating an exemplary user interface (e.g., a configuration and margin analysis page) of a DRCC Deployment Management application, in accordance with at least one embodiment.

FIG. 14 is a block diagram for illustrating an exemplary user interface (UI) 1400 (e.g., a configuration and margin analysis page) of a DRCC Deployment Management application, in accordance with at least one embodiment. UI 1400 may be presented in response to receiving an indication that UI element at 1214 of FIG. 12 has been selected. UI 1400 may include area 1402 with which a number of tabs. As depicted, area 1402 presents a configuration tab 1404, a configuration totals tab 1406, a yearly margins tab 1408, and a total margin tab 1410. The data and UI elements presented in area 1412 may correspond to the selected tab. By default, configuration tab 1404 may be selected and area 1412 may present the data and UI elements depicted in FIG. 14.

When configuration tab 1404 is selected, area 1412 may include configuration data. Configuration data may include, but is not limited to, a configuration version, a hardware type, a base footprint (e.g., a default number of components included in a predefined based DRCC footprint), a launch footprint (e.g., a number of components required for the currently configured DRCC/region based on the workloads specified with UI 700 of FIG. 7), and a power (in kilowatts) by rack type.

Area 1412 may include UI element 1414 that, when selected, provides an expanded view of a number of entries corresponding to the number of different types of racks that are to be provided at the DRCC/region. When providing an expanded view, the entries may appear in area 1416. When provided in a collapsed view, the entries presented within area 1416 may be hidden and only row 1418 may be visible. As depicted, the entries may be grouped (e.g., by year, category, etc.). UI element 1420 may be similarly selected to expand the area 1412 to include a corresponding area in which the entries corresponding to year 2 may be presented.

Although not depicted, when configuration totals tab 1406 is selected, area 1412 may include configuration totals data. Configuration totals data may include, but is not limited to, a configuration version, a year number, a total number of base racks (e.g., a total of the number of racks in the base footprint from the collective entries of the configuration data), a total number of launch racks (e.g., a total of the number of racks in the launch footprint from the collective entries of the configuration data), a square footage (e.g., a square footage needed for the racks plus 30% additional square footage), an amount of square meters (e.g., a space in square meters needed for the racks plus 30% additional square meters), and a total power (in kilowatts) (e.g., a total of the power from the collective entries of the configuration data).

Although not depicted, when yearly margins tab 1408 is selected, area 1412 may include yearly margins data. Yearly margins data may include, but is not limited to a configuration version, a year number, a minimum commit per year (e.g., the minimum commit numbers from FIG. 9, a margin for each year (e.g., −23.06, 25.1, etc.), yearly exception costs (e.g., a total of the cost of all exceptions of FIG. 11 for each year), a total yearly cost, a margin percentage excluding a write off amount, and a total yearly cost excluding the write off amount.

Although not depicted, when total margin tab 1410 is selected, area 1412 may include total margin data. Total margin data may include, but is not limited to a configuration version, a total cost for the DRCC/region (e.g., $8,160,334), a total exception cost (e.g., the collective amount of all of the yearly exception costs), a total revenue (e.g., 11,000,000), an overall margin (e.g., a percentage such as 25.80), an overall margin percentage excluding a write off amount (e.g., 39), and a total cost excluding the write off amount (e.g., $6,709,214)

The data presented in user interface 1400 may be differently formatted and may include additional data or may lack some of the data shown in FIG. 14.

Figure 15:
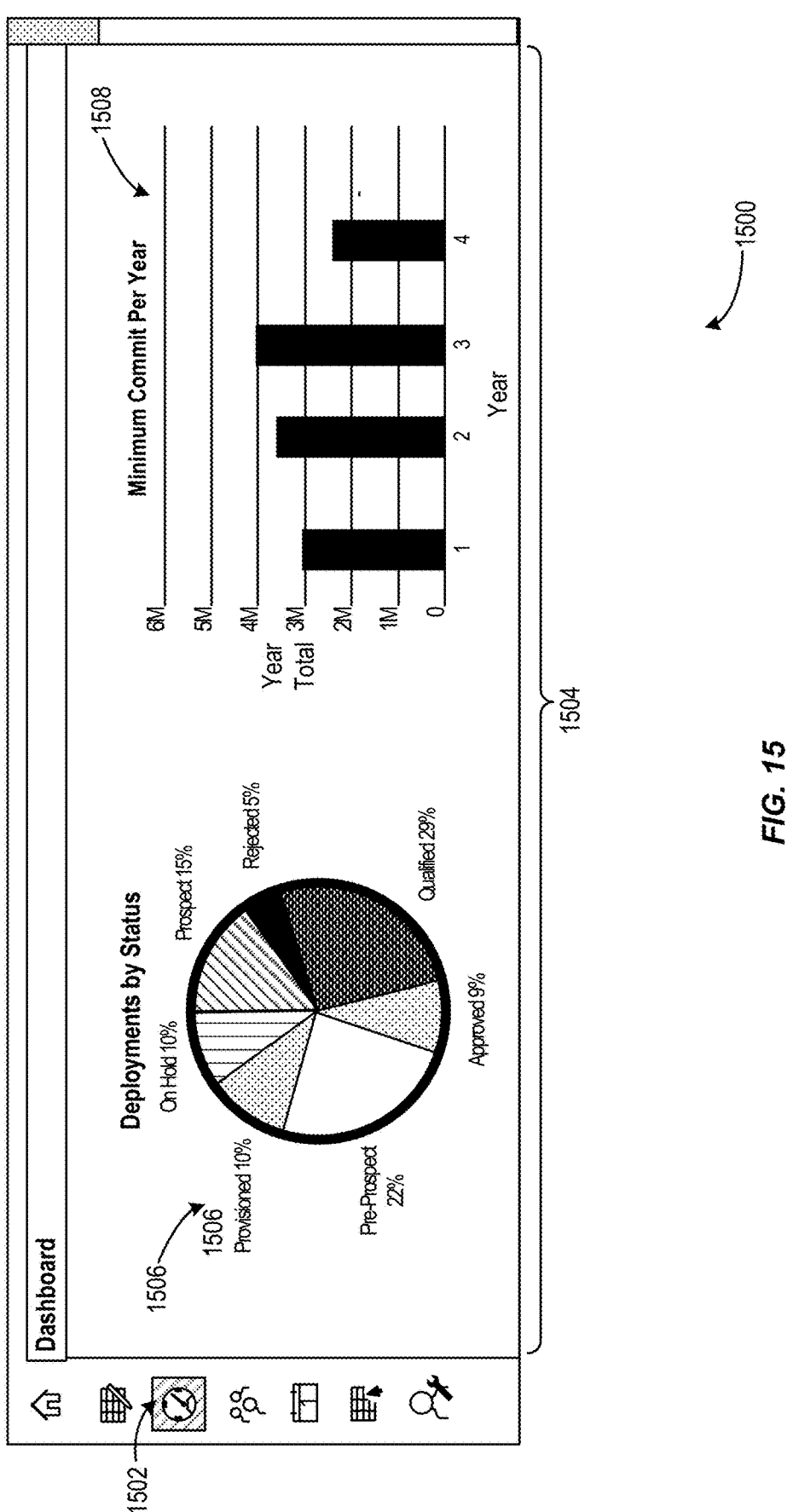
FIG. 15 is a block diagram for illustrating an exemplary user interface (e.g., a dashboard) of a DRCC Deployment Management application, in accordance with at least one embodiment.

FIG. 15 is a block diagram for illustrating an exemplary user interface (UI) 1500 (e.g., a dashboard) of a DRCC Deployment Management application, in accordance with at least one embodiment. UI 1500 may be presented in response to receiving an indication that UI element 1502 (an example of UI element 408 of FIG. 4) was selected. UI 1500 may include area 1504. Area 1504 may present any suitable number of graphs, bar charts, or the like corresponding to one or more deployments (e.g., all, a subset of the deployments, etc.). As depicted, UI 1500 includes pie chart 1506. Pie chart 1506 indicates corresponding portions of a pie that are attributable to a deployment of a particular status. Pie chart 1506 indicates 10% of the deployments submitted are in an "on hold" state, 15% are in a "prospect" state, 5% are in a "rejected" state, 29% are in a "qualified" state, 9% are in an "approved" state, 22% are in a "pre-prospect" state, and 10% are in a "provisioned" state.

Any suitable deployment data may be summarized and/or depicted using one or more graphs, charts, counts, or any suitable visual data representation. Area 1504 may be horizontally and/or vertically scrollable.

The data presented in user interface 1500 may be differently formatted and may include additional data or may lack some of the data shown in FIG. 15.

Figure 16:
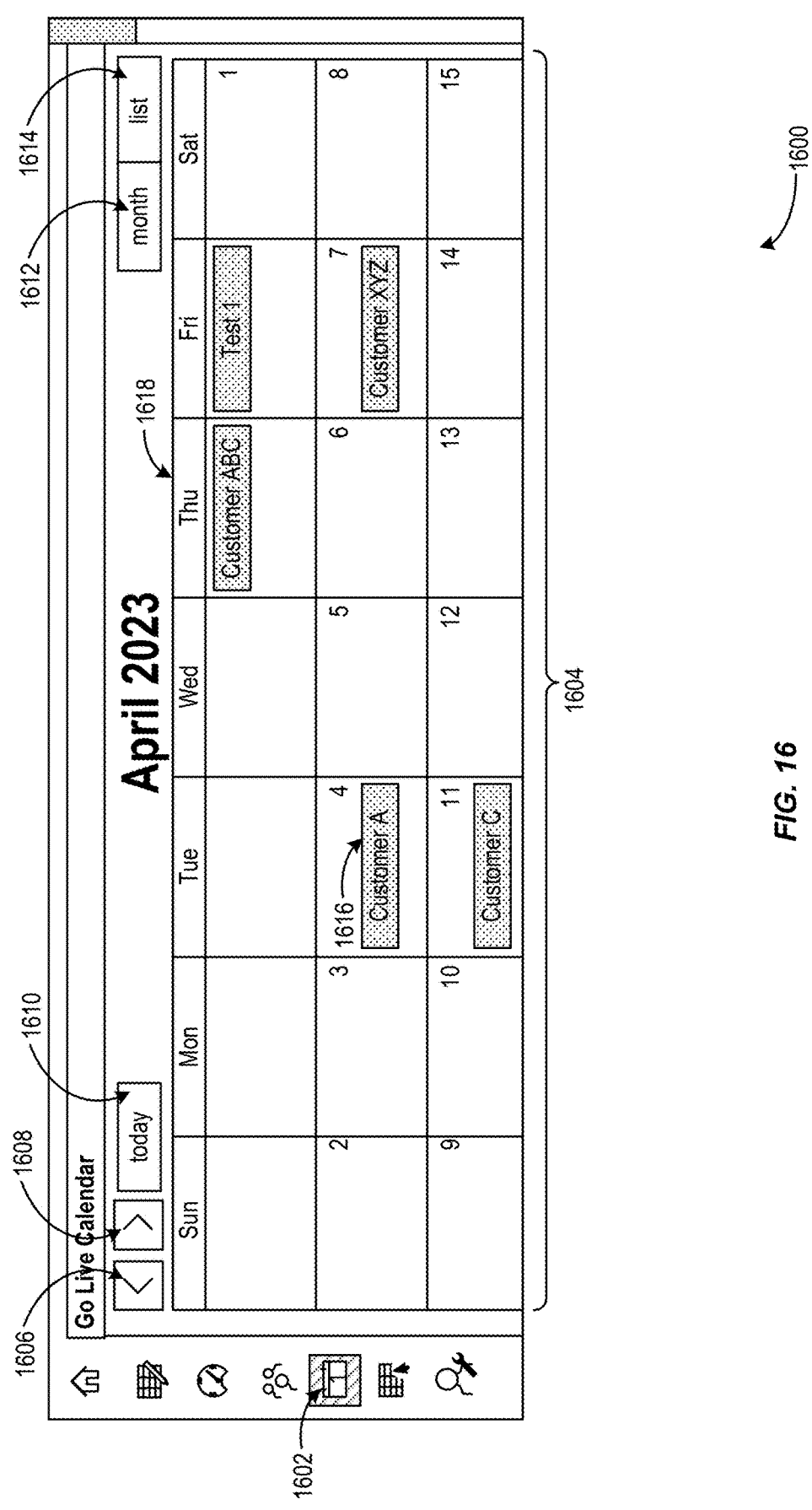
FIG. 16 is a block diagram for illustrating an exemplary user interface (e.g., a go-live calendar page) of a DRCC Deployment Management application, in accordance with at least one embodiment.

FIG. 16 is a block diagram for illustrating an exemplary user interface 1600 (e.g., a go-live calendar page) of a DRCC Deployment Management application, in accordance with at least one embodiment. UI 1600 may be presented in response to receiving an indication that UI element 1602 (an example of UI element 412 of FIG. 4) was selected. UI 1600 may include area 1604 which may be configured to present a calendar (e.g., a yearly, monthly, daily calendar. In some embodiments, options 1606 and 1608 are provided to navigate forward and backward (e.g., by month) within the calendar. Area 1604 may be updated to present data corresponding to the navigation action provided via options 1606 and 1608. Option 1610, when selected, may cause the month corresponding to the current data to be displayed and the current day to be highlighted or otherwise visually distinguished.

UI 1600 may include option 1612. Receiving a selection indicating the option 1612 was selected may cause a month list to be presented. Selecting a month from this list may cause area 1604 to be updated to present the data corresponding to the selected month. Selecting option 1614 may cause the area 1604 to be updated to present a list of events (e.g., event 1616) in order (e.g., chronological order) within area 1604, replacing grid 1618 in the process. Selecting option 1612 again may replace the list with the grid 1618 within area 1604.

The data presented in user interface 1600 may be differently formatted and may include additional data or may lack some of the data shown in FIG. 16.

Figure 17:
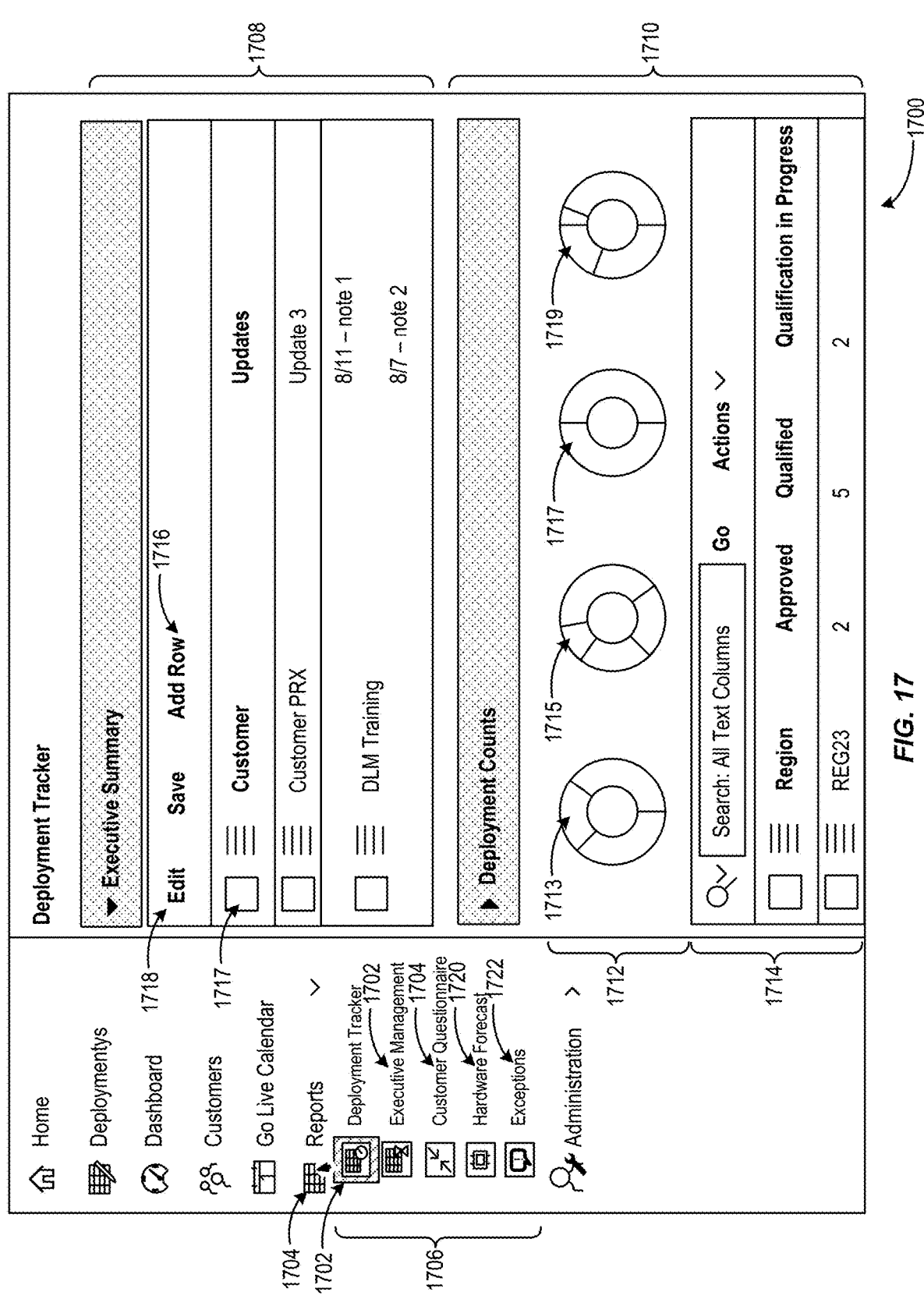
FIG. 17 is a block diagram for illustrating an exemplary user interface (e.g., a deployment tracker page) of a DRCC Deployment Management application, in accordance with at least one embodiment.

FIG. 17 is a block diagram for illustrating an exemplary user interface 1700 (e.g., a deployment tracker page) of a DRCC Deployment Management application, in accordance with at least one embodiment. UI 1700 may be presented in response to receiving an indication that UI element 1702 was selected. To select UI element 1702, the user may select UI element 1704 (e.g., an example of the UI element 414 of FIG. 4). In some embodiments, selecting UI element 1704 may cause an expanded view of a number of additional UI elements (e.g., UI elements 1706) to be presented. Upon selecting UI 1702 of UI elements 1706, data corresponding to a deployment tracker page may be presented.

The UI 1700 may include areas 1708 and 1710. Area 1708 may be configured to present any suitable data such as executive summary data. The entries corresponding to area 1708 may be added through selection of the UI element 1716. An empty entry may be added to the area 1708 and attribute values (e.g., corresponding to attributes "customer" and "updates") may be added based on selecting a corresponding area within the newly added entry. Previously provided entries may be edited based at least in part on selecting the UI element 1717, and subsequently, the UI element 1718 and providing modified attribute values within the row(s) being edited. Area 1708 may be expanded as entries are added. The area 1708 may expand to any suitable size in order to encapsulate any suitable number of entries.

Area 1710 may include any suitable deployment data. By way of example and as depicted, area 1710 may include area 1712 within which any suitable number of visual representations (e.g., graphs, charts, pie chart, bar graphs, or the like) may be displayed. By way of example, visual representation 1713 may be utilized to present data indicating a percentage of deployments that are currently in an "approved" state, by geographic region. Visual representation 1715 may present data indicating a percentage of deployments that are currently in a "qualified" state, by geographic region. Visual representation 1717 may present data indicating a percentage of deployments that are currently in a "qualification in progress" state, by geographic region. Visual representation 1719 may present data indicating a total number of deployments by geographic region.

Area 1714 may include any suitable number of entries corresponding to any suitable number of regions. By way of example, the presented data corresponding to geographical region "REG23" may indicate that there are two deployments in an "approved" state, five deployments in a "qualified" state, and two deployments in a "qualification in progress" state. The count values provided in area 1714 may be provided in relation to any suitable state (e.g., pre-prospect, prospect, qualification in progress, qualified, P1 approved, P2 approved, deployment provisioned, or the like).

The data presented in user interface 1700 may be differently formatted and may include additional data or may lack some of the data shown in FIG. 17. Selecting UI element 1720 may navigate the user to UI 1800 of FIG. 18. Selecting UI element 1722 may navigate the user to UI 1900 of FIG. 19.

Figure 18:
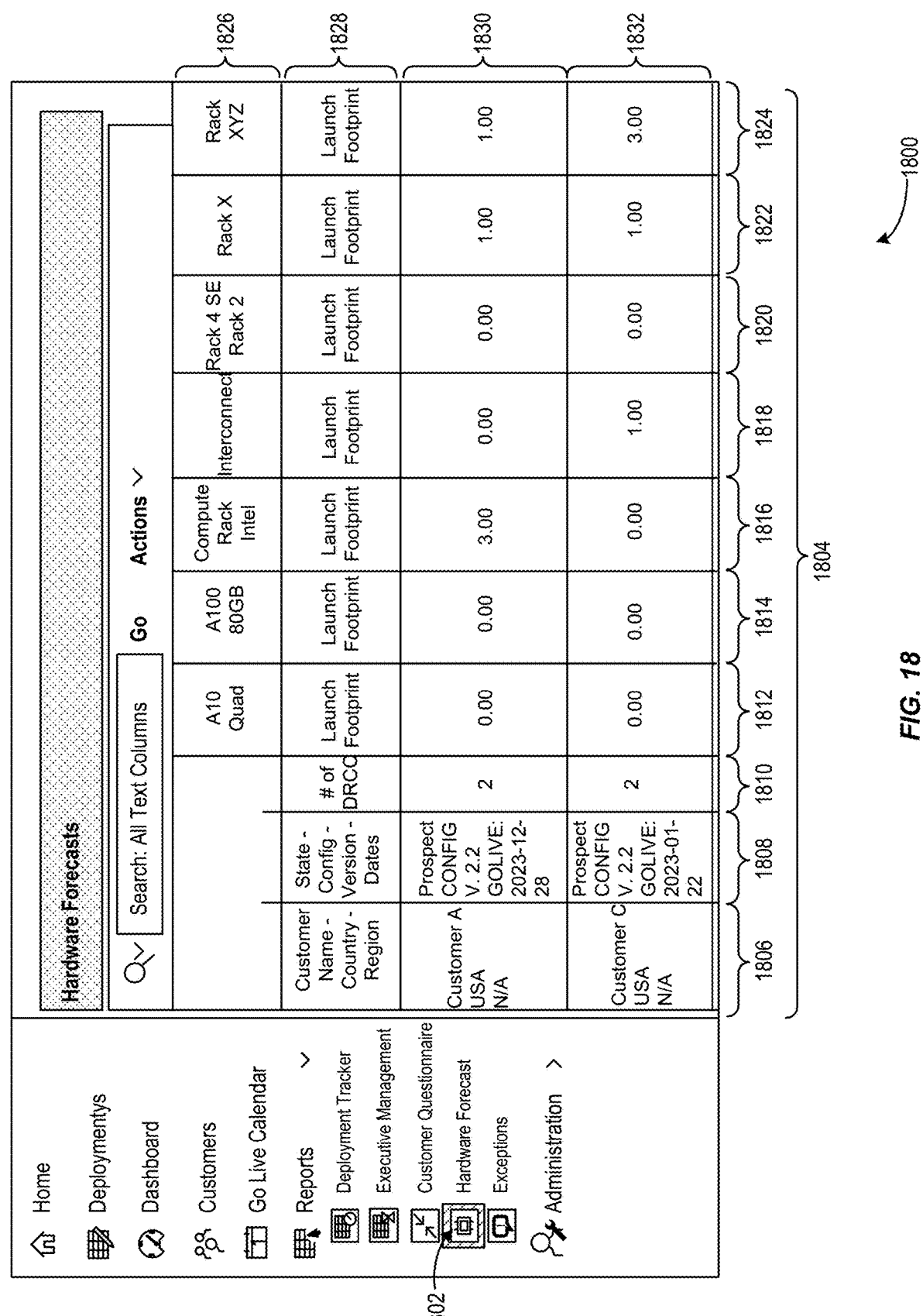
FIG. 18 is a block diagram for illustrating an exemplary user interface (e.g., a hardware forecasts page) of a DRCC Deployment Management application, in accordance with at least one embodiment.

FIG. 18 is a block diagram for illustrating an exemplary user interface 1800 (e.g., a hardware forecasts page) of a DRCC Deployment Management application, in accordance with at least one embodiment. UI 1800 may be presented in response to receiving an indication that UI element 1802 (e.g., an example of UI element 1720 of FIG. 17) has been selected. UI 1800 may be configured to present hardware forecast data within area 1804. Column 1806 may present customer data (e.g., customer name, country, region, etc.). Column 1808 may present deployment data (e.g., state, configuration version, go-live date, etc.). Column may present data indicating a number of DRCCs for a customer. Each of columns 1812-1824 may present a corresponding number of racks for a hardware component indicated in row 1826. Columns 1812-1824 within row 1828 may corresponding to a hardware parameter such as the launch footprint (a number of racks needed for the launch footprint). Although not depicted, row 1828 may include other hardware parameters such as base footprint (e.g., a number indicating a number of the corresponding hardware component that is included in the base footprint of the DRCC). Row 1830 may include attribute values for each of the columns 1806-1824 for a customer (e.g., customer A), while row 1832 may include attribute values for each of the columns 1806-1824 with respect to a different customer (e.g., customer C).

Any suitable number of rows and columns may be utilized in area 1804 depending on the number of customers known (e.g., customers provided via UI 500 of FIG. 5) and/or the number of hardware components needed to launch. In some embodiments, the area 1804 may be horizontally and/or vertically scrollable. Although not depicted, UI elements similar to the UI elements 528, 530, 536, and 538 of FIG. 5 may be utilized in FIG. 18, and any suitable combination of the FIGS. 4-20 to allow the corresponding UI to be horizontally and/or vertically scrolled.

The data presented in user interface 1800 may be differently formatted and may include additional data or may lack some of the data shown in FIG. 18.

Figure 19:
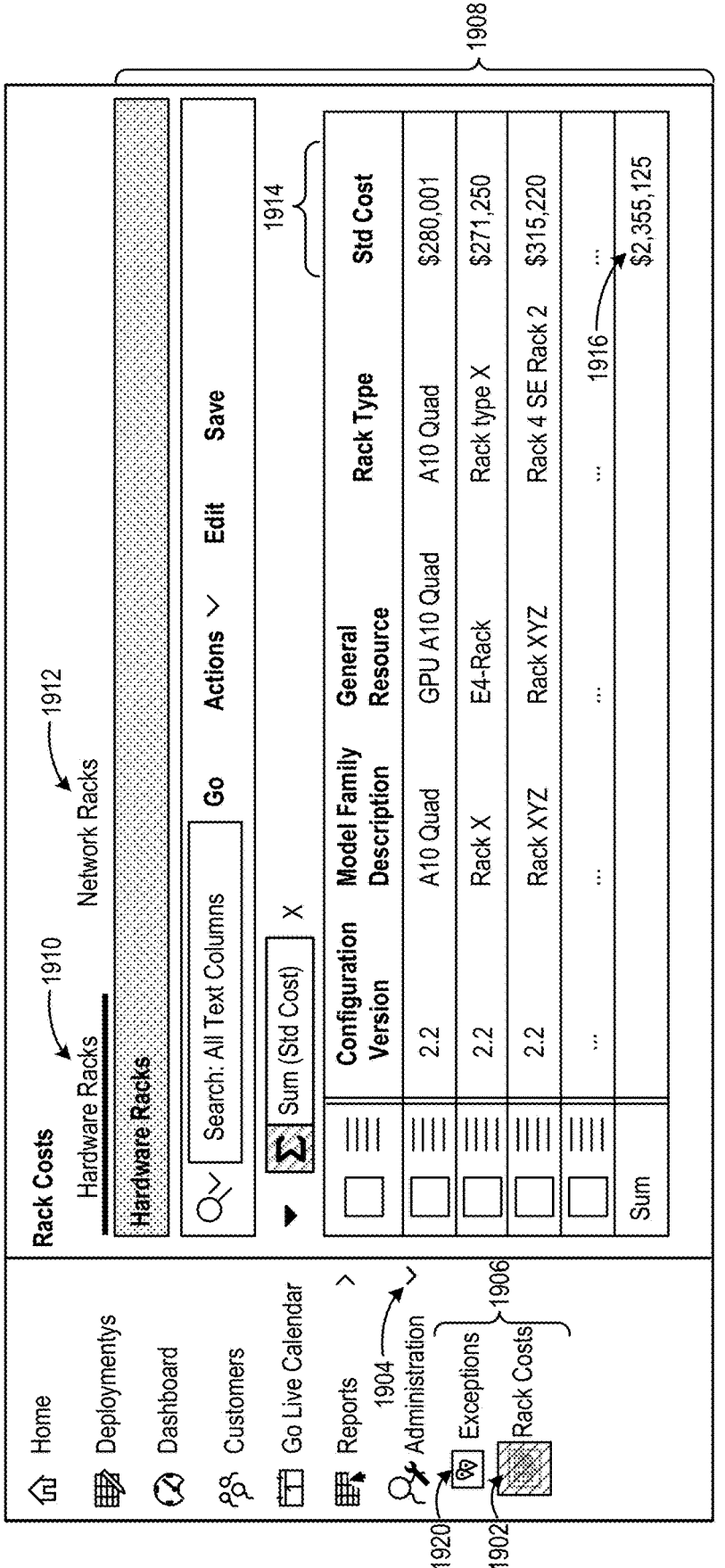
FIG. 19 is a block diagram for illustrating an exemplary user interface (e.g., a hardware and networking information page) of a DRCC Deployment Management application, in accordance with at least one embodiment.

FIG. 19 is a block diagram for illustrating an exemplary user interface 1900 (e.g., a hardware and networking information page) of a DRCC Deployment Management application, in accordance with at least one embodiment. UI 1900 may be presented based at least in part on selecting UI element 1902. UI element 1904 may be selected to present UI elements 1906. UI 1900 may include area 1908 which may present hardware rack data or network rack data corresponding to the tabs 1910 or 1912, depending on which tab is selected. As depicted in FIG. 19, when tab 1910 is selected, area 1908 may present hardware rack data. Hardware rack data may include, but is not limited to a configuration version, a model family description, a general resource type, a rack type, a standard cost, or the like. Each of the entries within area 1908 may be associated with a cost as depicted at column 1914. In some embodiments, a total cost for the hardware racks may be depicted at 1916. Similar data may be presented with respect to one or more network racks when tab 1912 is selected.

The data presented in user interface 1900 may be differently formatted and may include additional data or may lack some of the data shown in FIG. 19. Selecting UI element 1920 may navigate the user to an exception approval mapping page at which UI element 2008 of FIG. 20 is presented.

Figure 20:
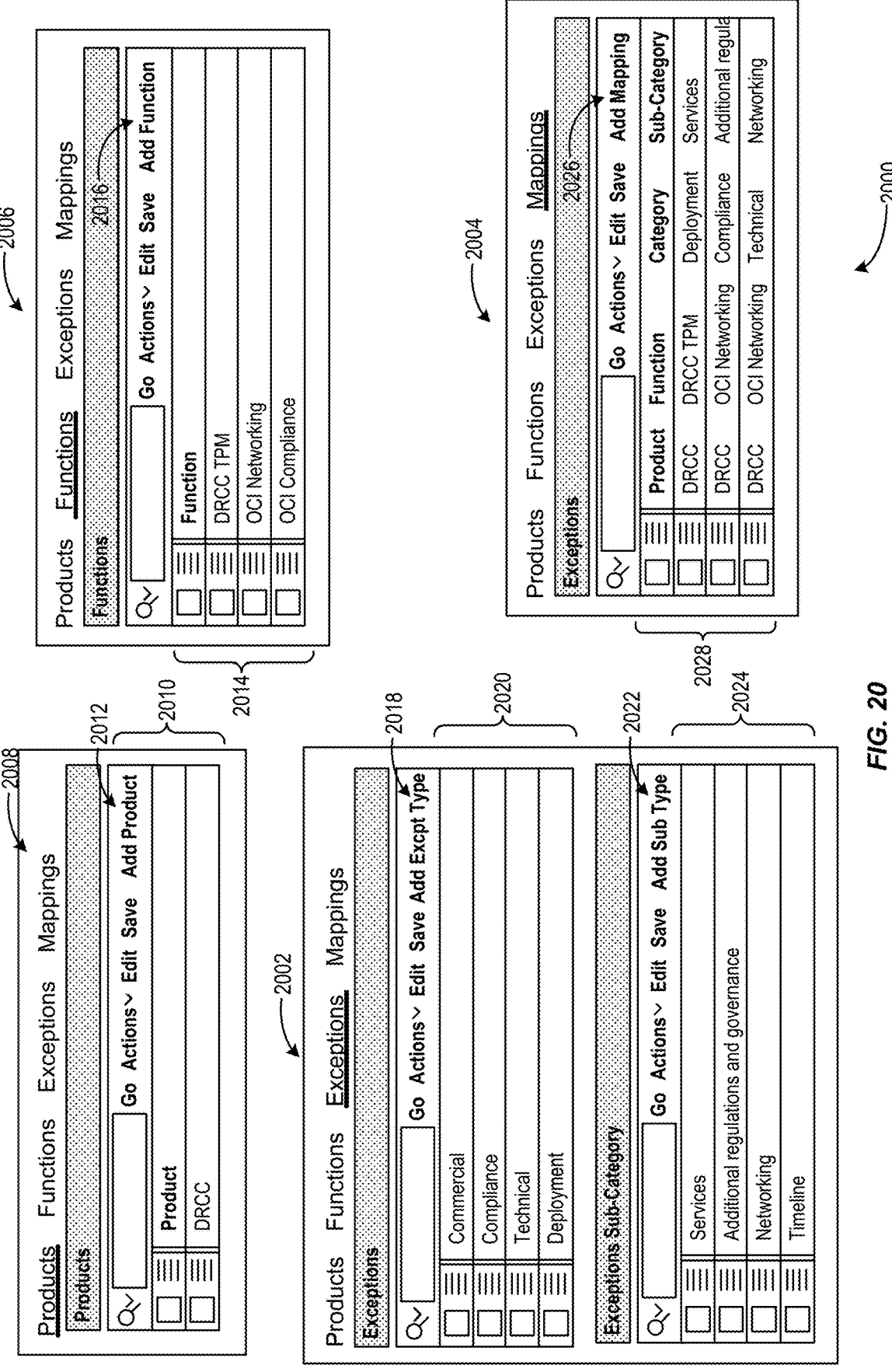
FIG. 20 is a block diagram for illustrating a number of user interface elements presented at a user interface (e.g., an exception approval mappings page) of a DRCC Deployment Management application, in accordance with at least one embodiment.

FIG. 20 include block diagrams for illustrating a number of user interface elements (e.g., UI elements 2002-2008) presented at a user interface (e.g., an exception approval mappings page) of a DRCC Deployment Management Application (e.g., DRCC Lifecycle Management Application 144 of FIG. 1 or 228 of FIG. 2), in accordance with at least one embodiment. An exception approval mapping page may general look similar to the rack cost page of FIG. 19 but may be configured to present different data.

By way of example, by default the exception approval mapping page may present UI element 2008 by default. UI element 2008 may correspond to a "products" tab. UI element 2008 may provide any suitable UI elements for searching, editing, saving, and adding entries corresponding to products within area 2010. In some embodiments, the UI element 2012 may be selected to add an entry to area 2010 and the entry may be edited in a similar manner as described above in FIGS. 4-19 to update the attribute value of the entry.

UI element 2006 may correspond to a "functions" tab. UI element 2006 may provide any suitable UI elements for searching, editing, saving, and adding entries corresponding to functions within area 2014. In some embodiments, the UI element 2016 may be selected to add an entry to area 2014 and the entry may be edited in a similar manner as described above in FIGS. 4-19 to update the attribute value of the entry.

UI element 2002 may correspond to an "exceptions" tab. UI element 2002 may provide any suitable UI elements for searching, editing, saving, and adding entries corresponding to exceptions within area 2014. In some embodiments, the UI element 2018 may be selected to add an entry to area 2020 and the entry may be edited in a similar manner as described above in FIGS. 4-19 to update the attribute value of the entry. UI element 2002 may include area 2024 within which a number of entries corresponding to an exception sub-category may be searched, edited, added, saved, etc. In some embodiments, the UI element 2022 may be selected to add an entry to area 2024 and the entry may be edited in a similar manner as described above in FIGS. 4-19 to update the attribute value of the entry.

UI element 2002 may correspond to a "mappings" tab. UI element 2002 may provide any suitable UI elements for searching, editing, adding, saving, mappings between any suitable combination of products (e.g., specified with UI element 2008), functions (e.g., specified with UI element 2006), exceptions (e.g., specified with UI element 2002), and/or sub-categories (e.g., specified with UI element 2002). In some embodiments, the UI element 2026 may be selected to add an entry to area 2028. Once added, a value corresponding to any suitable combination of a product, function, category, and/or sub-category may be selected from the values provided via UI elements 2008, 2006, and 2002.

In some embodiments, the mappings of area 2028 may be utilized to identify one or more entities for which approval and/or review of the deployment data and/or region data corresponding to a DRCC is necessary (e.g., for determining whether to transition the deployment and/or region from one state to another).

The data presented in UI elements 2002-2008 may be differently formatted and may include additional data or may lack some of the data shown in FIG. 20.

FIG. 21 is a block diagram illustrating an exemplary method 2100 for managing a lifecycle of a DRCC, according to at least one embodiment. The method 2100 may be performed by one or more components of the DRCC Lifecycle Management Application 114 and/or 228 of FIGS. 1 and 2, respectively. The operations discussed in connection with method 2100 may be performed in any suitable order. Method 2100 may include more or fewer operations than the operations discussed in connection with FIG. 21.

The method 2100 may begin at 2102, where deployment data (e.g., deployment data obtained within area 606 of FIG. 6) corresponding to a dedicated cloud may be obtained via a plurality of user interfaces (e.g., any suitable combination of UIs 400-1900. In some embodiments, the dedicated cloud (an example of DRCC/PLC region 102 of FIG. 1) may be associated with a plurality of cloud infrastructure components providing corresponding cloud services associated with a cloud service provider. In some embodiments, the plurality of cloud infrastructure components may be hosted by one or more computing devices located at a third-party location. By way of example, the third-party location may be associated with a third-party entity (e.g., a DRCC owner) that is different from the cloud service provider (e.g., OCI).

At 2104, the deployment data may be tracked (e.g., by the DRCC Deployment Management Application) based at least in part on input provided via the plurality user interfaces. In some embodiments, at least one of the plurality of user interfaces is configured to obtain workload data (e.g., the workload data obtained via the workload tab of area 714 of FIG. 7). In some embodiments, the workload data identifies one or more workloads to be executed by the plurality of cloud infrastructure components of the dedicated region cloud. In some embodiments, the one or more hardware components may be identified from a plurality of available hardware components based at least in part on the workload data.

At 2106, a deployment state associated with deploying the dedicated cloud may be transitioned from a first state to a second state based at least in part on the tracking. In some embodiments, the region data may be validated based at least in part on executing one or more validation operations against the region data provided via the one or more user interfaces. In some embodiments, the first state (e.g., a "prospect" state) and second state (e.g., a "qualification in progress" state) individually being one of a plurality of states of a predefined order that are associated with dedicated cloud deployments. A transition may be based at least in part on identifying that the validation operations were executed successfully. In some embodiments, region data may be alternatively or additionally tracked and a region state associated with provisioning hardware for the dedicated cloud may additionally or alternatively be transitioned. In some embodiments, the region state may be transitioned from a third state to a fourth state based at least in part on the tracking. The third state and fourth state may individually be one of a second plurality of states of a second predefined order that are associated with provisioning region cloud hardware.

At 2108, information indicating a transition from the first state to the second state of the deployment state may be presented at one or more user interfaces (e.g., within area 704 of FIG. 7, area 902 of FIG. 9, etc.) of the plurality of user interfaces. One or more visual representations (e.g., the visual representation presented within area 704 of FIG. 7) may be presented based at least in part on tracking the plurality of deployment statuses corresponding to the respective deployments. In some embodiments, separate visual representations (e.g., the sequence representation 908 of FIG. 9) of the region state may be generated and presented (e.g., via the UI 900 within area 904, for example). In some embodiments, the one or more user interfaces (e.g., UI 1800 of FIG. 18) may additional, or alternatively present hardware data specifying the one or more hardware components.

Figure 22:
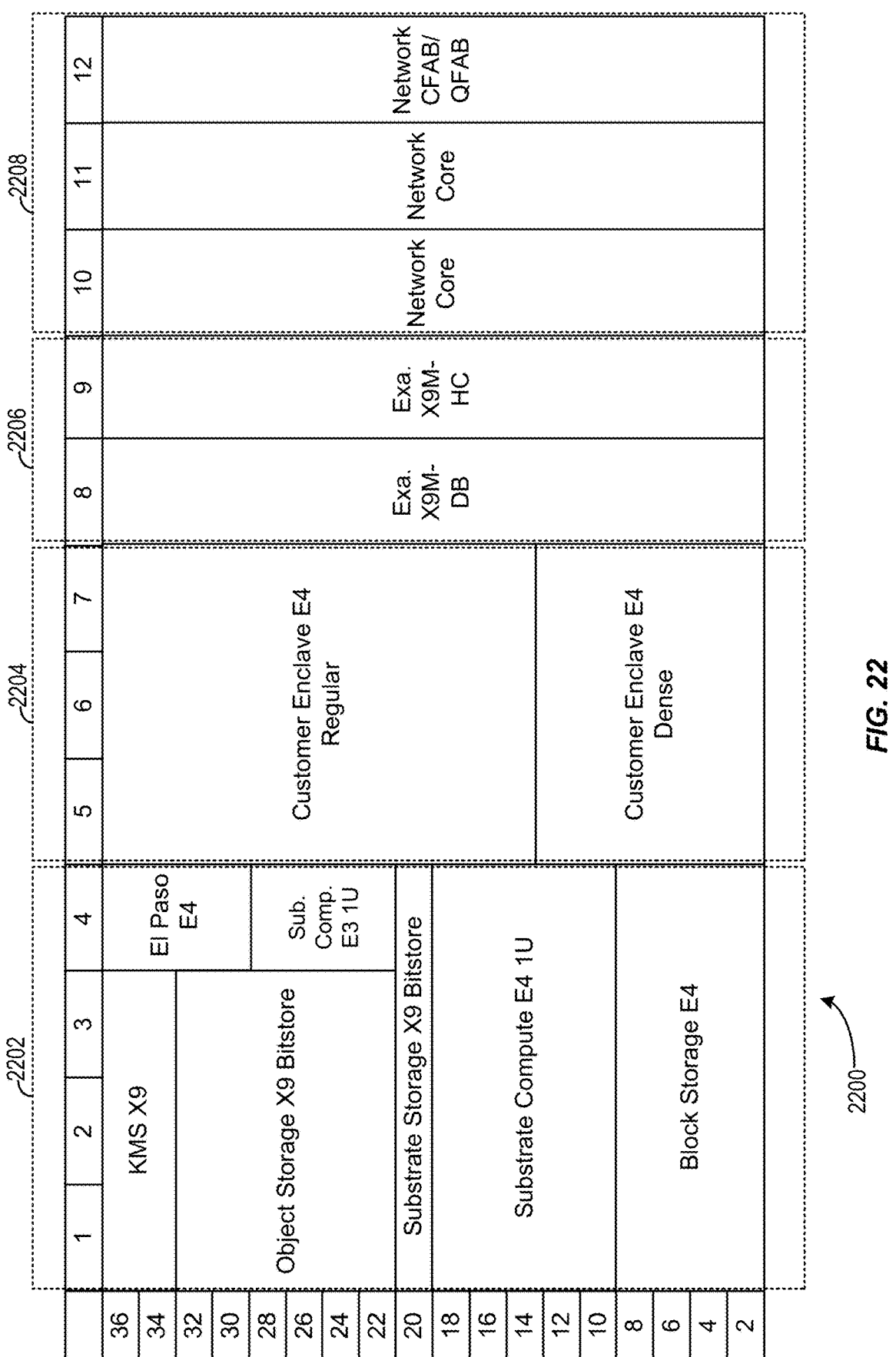
FIG. 22 illustrates a high-level structure of an exemplary 12 rack base footprint on which an IaaS/DRCC architecture is hosted.

FIG. 22 illustrates a high-level structure of an exemplary 12 rack base footprint on which an IaaS/DRCC architecture (e.g., the IaaS/DRCC architecture of FIG. 22) is hosted. Each of the 12 racks may configured to hold 18 servers. 6 servers may be utilized to provide key management service and configured according to a predefined X9 configuration. These 6 servers may be spread over three racks (e.g., racks 1-3) for fault tolerance. 18 servers may be utilized to provide object storage resources according to a X9 bit store configuration. These 18 servers may be spread over three racks (e.g., racks 1-3) for fault tolerance as depicted in FIG. 22 and may be utilized to provide 1818 TiB of capacity. 4 servers, over four racks (e.g., racks 1-4) may be utilized to provide substrate storage according to a X9 bit store configuration and may be utilized to provide 288 virtual CPU and 864 TiB of capacity. 45 servers, spread over four racks (e.g., racks 1-4) may be utilized to provide substrate compute resources according to an E4 platform, using 1U servers. These 45 servers may be used to provide 11520 virtual CPU and 1080 TiB of non-volatile memory express (NVMe) capacity. 4 servers of a single racks (e.g., rack 4) may be utilized to provide substrate compute resources according to an E3 platform, using 1U servers. 8 servers of a single racks (e.g., rack 4) may be utilized to provide additional substrate compute resources according to an E1 Paso, E4 platform. 16 servers, spread over four racks (e.g., racks 1-4) may be utilized to provide block storage resources according to an E4 platform. These servers may be utilized to provide 1280 TiB of capacity. 36 servers, spread over 3 racks (e.g., racks 5-7) may be utilized to provide a customer enclave according to a E4, regular platform (e.g., using standard AMD processors) to provide 4608 OCPU of compute capacity. 18 servers, spread over 3 racks (e.g., racks 5-7) may be utilized to provide a customer enclave according to a E4, dense platform (e.g., using E4 AMD dense processors), to provide 2304 OCPU of compute capacity. 18 servers of a single rack (e.g., rack 8) may be utilized to host Exadata X9M database (DB) nodes (e.g., 18 nodes). Another 18 servers of another rack (e.g., rack 9) may be utilized to hose Exadata X9M high capacity (HC) nodes (e.g., 15 HC nodes). Racks 10 and 11 and the corresponding 36 servers may be utilized for network core resources (e.g., to provide 32-128 standard racks).

As depicted, a service enclave 2202 may be implemented using the servers of racks 1-4, a customer service enclave 2204 may be implemented using the servers of racks 5-7, Exadata resources may be implemented using the servers of racks 8 and 9, and networking resources may be implemented using the servers of racks 10-12.

Figure 23:
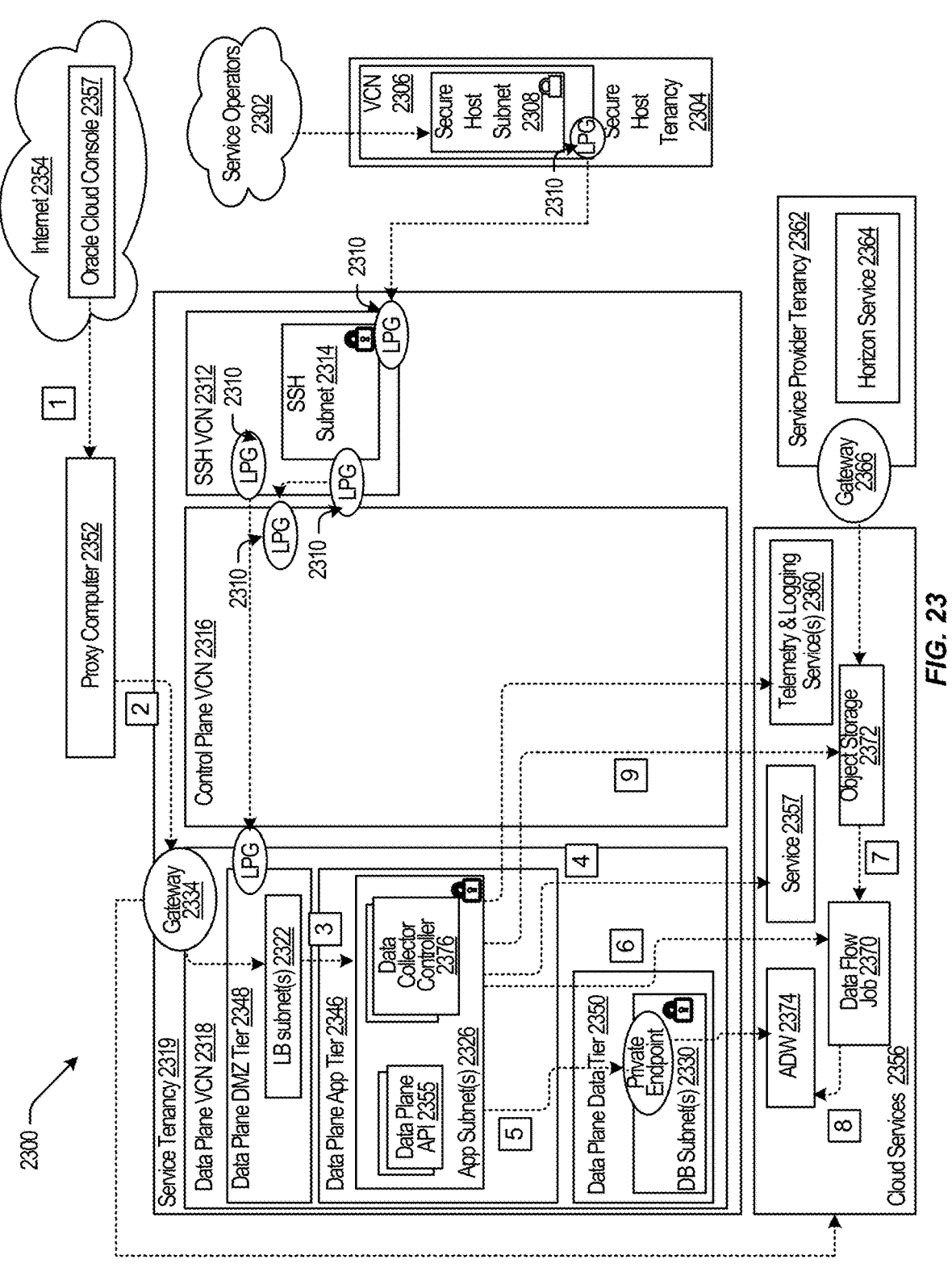
FIG. 23 is a block diagram illustrating a pattern for implementing a cloud infrastructure as a service system including a dedicated region operating as part of a DRCC, according to at least one embodiment.

FIG. 23 is a block diagram 2300 illustrating an example pattern of an IaaS architecture (e.g., a DRCC architecture), according to at least one embodiment. Service operators 2302 can be communicatively coupled to a secure host tenancy 2304 that can include a virtual cloud network (VCN) 2306 and a secure host subnet 2308. In some examples, the service operators 2302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 2306 and/or the Internet.

The VCN 2306 can include a local peering gateway (LPG) 2310 that can be communicatively coupled to a secure shell (SSH) VCN 2312 via an LPG 2310 contained in the SSH VCN 2312. The SSH VCN 2312 can include an SSH subnet 2314, and the SSH VCN 2312 can be communicatively coupled to a control plane VCN 2316 via the LPG 2310 contained in the control plane VCN 2316. Also, the SSH VCN 2312 can be communicatively coupled to a data plane VCN 2318 via an LPG 2310. The control plane VCN 2316 and the data plane VCN 2318 can be contained in a service tenancy 2319 that can be owned and/or operated by the IaaS provider.

The data plane VCN 2318 can include the data plane app tier 2346, a data plane DMZ tier 2348, and a data plane data tier 2350. The data plane DMZ tier 2348 can include LB subnet(s) 2322 that can be communicatively coupled to the app subnet(s) 2326 of the data plane app tier 2346 and the gateway 2334 of the data plane VCN 2318. The gateway 2334 may be an example of an Internet gateway, a service gateway, a NAT gateway, or the like. The data plane data tier 2350 can also include the DB subnet(s) 2330 that can be communicatively coupled to the app subnet(s) 2326 of the data plane app tier 2346.

The gateway 2334 of the data plane VCN 2318 can be communicatively coupled to a proxy computer 2352 (e.g., a Splat proxy) that can be communicatively coupled to public Internet 2354. Public Internet 2354 can be communicatively coupled to the gateway 2334 of the of the data plane VCN 2318. The gateway 2336 (e.g., a service gateway of gateway 2336) of the of the data plane VCN 2318 can be communicatively couple to cloud service(s) 2356. In some embodiments, cloud service(s) 2356 may operate within a DRCC on hardware provided by the customer. Cloud service(s) 2356 may include any suitable service such as ADW 2374 (an example of ADW 126 of FIG. 1), Service 2357 (an example of one of the service(s) 118 of FIG. 1), object storage 2372 (an example of object storage managed by object storage service 112 of FIG. 1), telemetry and logging service(s) 2360 (an example of the service(s) 118 of FIG. 1), although any suitable service, including those discussed in connection with FIG. 1 may be included in cloud service(s) 2356. Data flow job (e.g., an example of spark job 214 of FIG. 2) may be configured to pull collected data from object storage (e.g., from Object Storage Bucket (Horizon Bucket) 122 of FIG. 2) and transform and/or write the data to ADW (e.g., ADW 126 of FIGS. 1 and 2).

A service provider tenancy 2362 may contain Horizon Service 2364 (an example of Horizon Service of FIGS. 1 and 2) that may be communicatively connected via gateway 2366 with cloud service(s) 2356. As discussed above, Horizon Service 2364 may be configured to perform data collection operations to obtain any suitable operational data of the DRCC such as any suitable data related to capacity management, expansion management, health and performance tracking, change management, and the like. As a non-limiting example, the Horizon Service 2364 may be configured to obtain capacity and usage data such as a number of CPUs, a total amount and used amount of block storage, a total amount and used amount of object storage, a total amount and used amount of file storage, and the like, or any suitable data presented in FIGS. 4-22. In some embodiments, this may include interacting with one or more of cloud service(s) 2356. Horizon Service 2364 may be configured to store any suitable data discussed above within a dedicated bucket (e.g., a Horizon bucket) within object storage 2372 (e.g., object storage bucket (horizon bucket) 122 of FIG. 1).

In some examples, the gateway 2334 (e.g., a service gateway) of the data plane VCN 2318 can make application programming interface (API) calls (e.g., using data plane API 2355) to cloud service(s) 2356 without going through public Internet 2354. The API calls to cloud service(s) 2356 from the gateway 2334 can be one-way: the gateway 2334 can make API calls (e.g., using data plane API 2355) to cloud service(s) 2356, and cloud service(s) 2356 can send requested data to the gateway 2334. But cloud service(s) 2356 may not initiate API calls to the service gateway 2336.

In some examples, the secure host tenancy 2304 can be directly connected to the service tenancy 2319, which may be otherwise isolated. The secure host subnet 2308 can communicate with the SSH subnet 2314 through an LPG 2310 that may enable two-way communication over an otherwise isolated system. Connecting the secure host subnet 2308 to the SSH subnet 2314 may give the secure host subnet 2308 access to other entities within the service tenancy 2319.

In some examples, users of the system, or customers, can make requests, for example create, read, update, or delete (CRUD) operations, through public Internet 2354 (e.g., using a user interface provided by Oracle Cloud Console 2357) that can communicate the requests to the proxy computer 2352. The proxy computer 2352 can communicate the request to the data plane VCN 2318 through the gateway 2334. The request can be received by the LB subnet(s) 2322 contained in the data plane DMZ tier 2348. The LB subnet(s) 2322 may determine that the request is valid, and in response to this determination, the LB subnet(s) 2322 can transmit the request to app subnet(s) 2326 contained in the data plane app tier 2324. If the request is validated and requires a call to Internet 2354, the call to Internet 2354 may be transmitted to the gateway 2334 (e.g., a NAT gateway of gateway 2334) that can make the call to Internet 2354. Memory that may be desired to be stored by the request can be stored in the DB subnet(s) 2330.

In some embodiments, the control plane VCN 2316 and the data plane VCN 2318 can be contained in the service tenancy 2319. In this case, the user, or the customer, of the system may not own or operate either the control plane VCN 2316 or the data plane VCN 2318. Instead, the IaaS provider may own or operate the control plane VCN 2316 and the data plane VCN 2318, both of which may be contained in the service tenancy 2319. In some embodiments, the hardware that implements the service tenancy 2319 may be owned by the customer but managed by the IaaS provider. In some embodiments, the isolation of these networks (VCNs) may enable allow users or customers of the system to store databases privately without needing to rely on Internet 2354, which may not have a desired level of threat prevention, for storage.

In other embodiments, the LB subnet(s) 2322 contained in the control plane VCN 2316 can be configured to receive a signal from the gateway 1034. In this embodiment, the data plane VCN 1018 may be configured to be called by a customer of the IaaS provider without calling Internet 2354. Customers of the IaaS provider may desire this embodiment since database(s) that the customers use may be controlled by the IaaS provider and may be stored on the service tenancy 2319, which may be isolated from Internet 2354.

In some embodiments, the following operations may be performed. At step 1, Oracle Cloud Console 2357 sends an HTTPS request to proxy computer 2352. Proxy computer 2352 may be configured to perform authentication and/or authorization operations. At step 2, Proxy computer 2352 may forward the request to LB subnet(s) 2322 via HTTPS. At step 3, a load balancer of LB subnet(s) 2322 forward the request to one of the OCC data plane via HTTPS/mTLS. At step 4, the proxy computer 2352 may perform authentication handled via mTLS with certificates loaded from service 2357. At step 5, data from ADW 2374 is read and returned to the caller.

In some embodiments, a timer (e.g., a daily timer) may elapse to start data flow job 2370 (an example of spark job 214 of FIG. 2). At step 7, the data flow job 2370 may pull data from object storage 2372 from a bucket owned and operated by the service provider associated with service provider tenancy 2362. At step 8, the data flow job may process and store the retrieved data in ADW 2374 (an example of the ADW 216 of FIG. 1). At step 9, a zip file with spark jobs may be loaded to object storage 2372. Data collector controller 2376 may load a file (e.g., a zip file) with spark jobs to object storage 2372. Data flow job 2370 may be configured to consume code from there.

While not depicted, the IaaS/DRCC architecture may be hosted by a number of racks. By way of example, the architecture may utilize a 12-rack base footprint, or at least fewer racks than the number utilized in a typical public cloud. In some embodiments, the cloud service(s) 2356 may be hosted on a fewer number of racks as utilized for cloud service(s) within a public cloud. In some embodiments, the public cloud may utilize 21 racks for a service enclave, while the IaaS/DRCC of FIG. 23 may utilize four. While the public cloud may utilize 12 racks for a customer enclave, the IaaS/DRCC of FIG. 23 may utilize five racks. As another example, while the public cloud may utilize 12 racks for networking, the IaaS/DRCC of FIG. 23 may utilize three racks. The IaaS/DRCC architecture may, like the public cloud, maintain separation between service enclave, customer enclave and network racks. This may allow for the highest density of cores in both substrate and overlay networks. In some embodiments, the hardware utilize to host the IaaS/DRCC may be configured by the service provider and placed on-premises at the customer's location.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

In some embodiments, OC1 120 of FIG. 1 (including DRCC Lifecycle Management Application 144) is provided according to one of the patterns of FIGS. 24-27.

Figure 24:
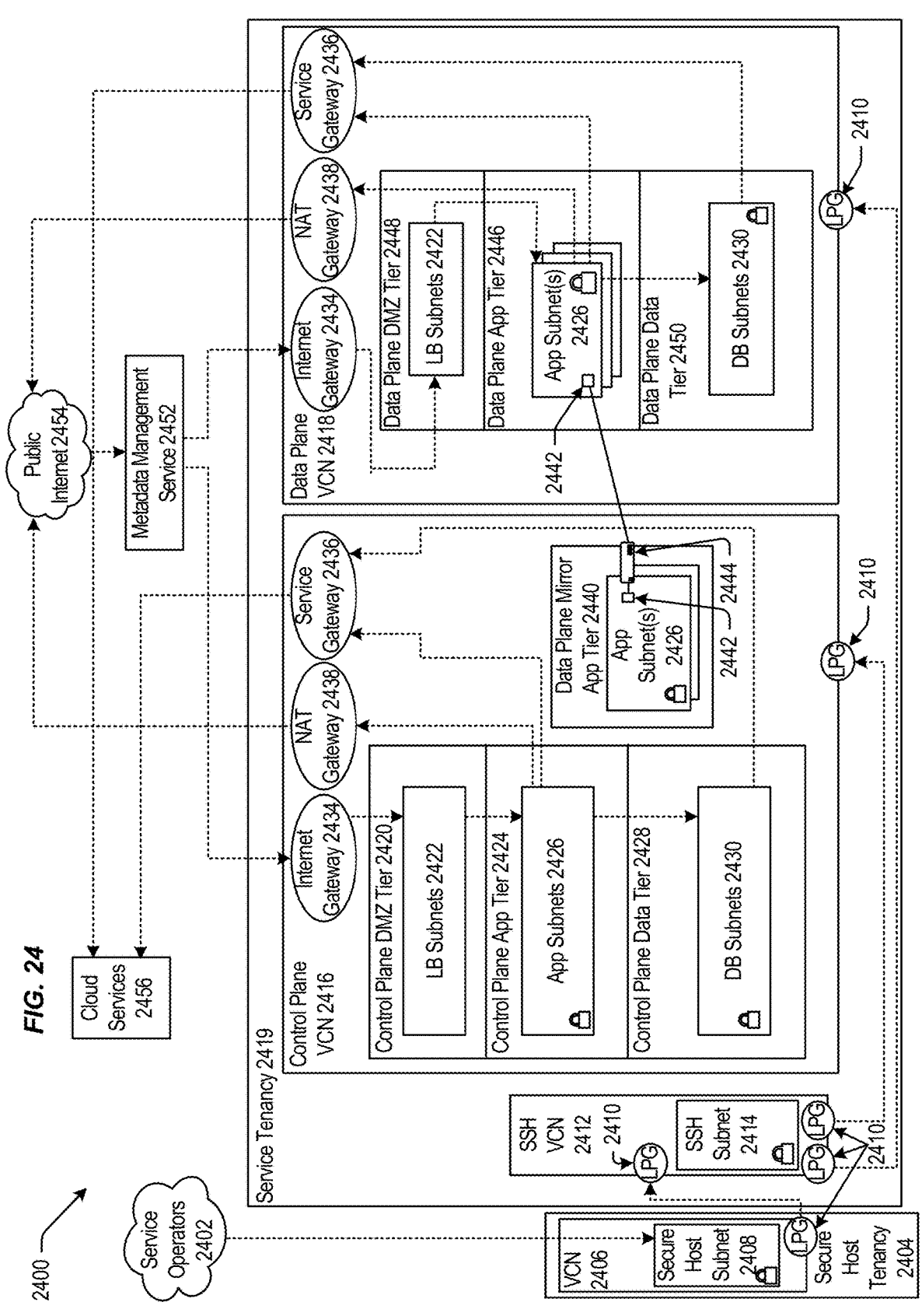
FIG. 24 is a block diagram illustrating one pattern for implementing a cloud infrastructure as a service system, according to at least one embodiment.

FIG. 24 is a block diagram 2400 illustrating an example pattern of an IaaS architecture, according to at least one embodiment. Service operators 2402 can be communicatively coupled to a secure host tenancy 2404 that can include a virtual cloud network (VCN) 2406 and a secure host subnet 2408. In some examples, the service operators 2402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 2406 and/or the Internet.

The VCN 2406 can include a local peering gateway (LPG) 2410 that can be communicatively coupled to a secure shell (SSH) VCN 2412 via an LPG 2410 contained in the SSH VCN 2412. The SSH VCN 2412 can include an SSH subnet 2414, and the SSH VCN 2412 can be communicatively coupled to a control plane VCN 2416 via the LPG 2410 contained in the control plane VCN 2416. Also, the SSH VCN 2412 can be communicatively coupled to a data plane VCN 2418 via an LPG 2410. The control plane VCN 2416 and the data plane VCN 2418 can be contained in a service tenancy 2419 that can be owned and/or operated by the IaaS provider.

The control plane VCN 2416 can include a control plane demilitarized zone (DMZ) tier 2420 that acts as a perimeter network (e.g., portions of a corporate network between the corporate intranet and external networks). The DMZ-based servers may have restricted responsibilities and help keep breaches contained. Additionally, the DMZ tier 2420 can include one or more load balancer (LB) subnet(s) 2422, a control plane app tier 2424 that can include app subnet(s) 2426, a control plane data tier 2428 that can include database (DB) subnet(s) 2430 (e.g., frontend DB subnet(s) and/or backend DB subnet(s)). The LB subnet(s) 2422 contained in the control plane DMZ tier 2420 can be communicatively coupled to the app subnet(s) 2426 contained in the control plane app tier 2424 and an Internet gateway 2434 that can be contained in the control plane VCN 2416, and the app subnet(s) 2426 can be communicatively coupled to the DB subnet(s) 2430 contained in the control plane data tier 2428 and a service gateway 2436 and a network address translation (NAT) gateway 2438. The control plane VCN 2416 can include the service gateway 2436 and the NAT gateway 2438.

The control plane VCN 2416 can include a data plane mirror app tier 2440 that can include app subnet(s) 2426. The app subnet(s) 2426 contained in the data plane mirror app tier 2440 can include a virtual network interface controller (VNIC) 2442 that can execute a compute instance 2444. The compute instance 2444 can communicatively couple the app subnet(s) 2426 of the data plane mirror app tier 2440 to app subnet(s) 2426 that can be contained in a data plane app tier 2446.

The data plane VCN 2418 can include the data plane app tier 2446, a data plane DMZ tier 2448, and a data plane data tier 2450. The data plane DMZ tier 2448 can include LB subnet(s) 2422 that can be communicatively coupled to the app subnet(s) 2426 of the data plane app tier 2446 and the Internet gateway 2434 of the data plane VCN 2418. The app subnet(s) 2426 can be communicatively coupled to the service gateway 2436 of the data plane VCN 2418 and the NAT gateway 2438 of the data plane VCN 2418. The data plane data tier 2450 can also include the DB subnet(s) 2430 that can be communicatively coupled to the app subnet(s) 2426 of the data plane app tier 2446.

The Internet gateway 2434 of the control plane VCN 2416 and of the data plane VCN 2418 can be communicatively coupled to a metadata management service 2452 that can be communicatively coupled to public Internet 2454. Public Internet 2454 can be communicatively coupled to the NAT gateway 2438 of the control plane VCN 2416 and of the data plane VCN 2418. The service gateway 2436 of the control plane VCN 2416 and of the data plane VCN 2418 can be communicatively couple to cloud services 2456.

In some examples, the service gateway 2436 of the control plane VCN 2416 or of the data plane VCN 2418 can make application programming interface (API) calls to cloud services 2456 without going through public Internet 2454. The API calls to cloud services 2456 from the service gateway 2436 can be one-way: the service gateway 2436 can make API calls to cloud services 2456, and cloud services 2456 can send requested data to the service gateway 2436. But, cloud services 2456 may not initiate API calls to the service gateway 2436.

In some examples, the secure host tenancy 2404 can be directly connected to the service tenancy 2419, which may be otherwise isolated. The secure host subnet 2408 can communicate with the SSH subnet 2414 through an LPG 2410 that may enable two-way communication over an otherwise isolated system. Connecting the secure host subnet 2408 to the SSH subnet 2414 may give the secure host subnet 2408 access to other entities within the service tenancy 2419.

The control plane VCN 2416 may allow users of the service tenancy 2419 to set up or otherwise provision desired resources. Desired resources provisioned in the control plane VCN 2416 may be deployed or otherwise used in the data plane VCN 2418. In some examples, the control plane VCN 2416 can be isolated from the data plane VCN 2418, and the data plane mirror app tier 2440 of the control plane VCN 2416 can communicate with the data plane app tier 2446 of the data plane VCN 2418 via VNICs 2442 that can be contained in the data plane mirror app tier 2440 and the data plane app tier 2446.

In some examples, users of the system, or customers, can make requests, for example create, read, update, or delete (CRUD) operations, through public Internet 2454 that can communicate the requests to the metadata management service 2452. The metadata management service 2452 can communicate the request to the control plane VCN 2416 through the Internet gateway 2434. The request can be received by the LB subnet(s) 2422 contained in the control plane DMZ tier 2420. The LB subnet(s) 2422 may determine that the request is valid, and in response to this determination, the LB subnet(s) 2422 can transmit the request to app subnet(s) 2426 contained in the control plane app tier 2424. If the request is validated and requires a call to public Internet 2454, the call to public Internet 2454 may be transmitted to the NAT gateway 2438 that can make the call to public Internet 2454. Metadata that may be desired to be stored by the request can be stored in the DB subnet(s) 2430.

In some examples, the data plane mirror app tier 2440 can facilitate direct communication between the control plane VCN 2416 and the data plane VCN 2418. For example, changes, updates, or other suitable modifications to configuration may be desired to be applied to the resources contained in the data plane VCN 2418. Via a VNIC 2442, the control plane VCN 2416 can directly communicate with, and can thereby execute the changes, updates, or other suitable modifications to configuration to, resources contained in the data plane VCN 2418.

In some embodiments, the control plane VCN 2416 and the data plane VCN 2418 can be contained in the service tenancy 2419. In this case, the user, or the customer, of the system may not own or operate either the control plane VCN 2416 or the data plane VCN 2418. Instead, the IaaS provider may own or operate the control plane VCN 2416 and the data plane VCN 2418, both of which may be contained in the service tenancy 2419. This embodiment can enable isolation of networks that may prevent users or customers from interacting with other users', or other customers', resources. Also, this embodiment may allow users or customers of the system to store databases privately without needing to rely on public Internet 2454, which may not have a desired level of threat prevention, for storage.

In other embodiments, the LB subnet(s) 2422 contained in the control plane VCN 2416 can be configured to receive a signal from the service gateway 2436. In this embodiment, the control plane VCN 2416 and the data plane VCN 2418 may be configured to be called by a customer of the IaaS provider without calling public Internet 2454. Customers of the IaaS provider may desire this embodiment since data-base(s) that the customers use may be controlled by the IaaS provider and may be stored on the service tenancy 2419, which may be isolated from public Internet 2454.

Figure 25:
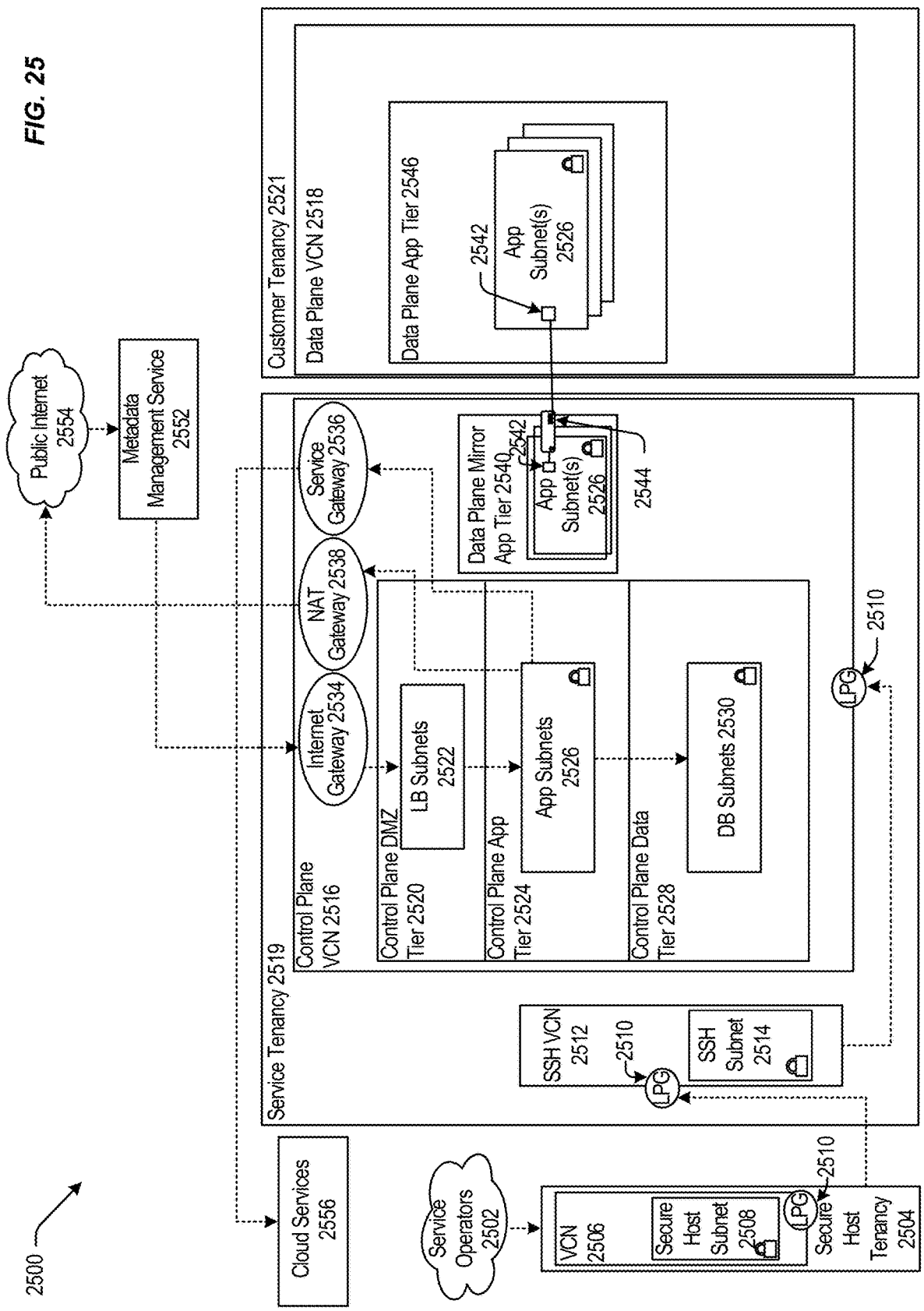
FIG. 25 is a block diagram illustrating another pattern for implementing a cloud infrastructure as a service system, according to at least one embodiment.

FIG. 25 is a block diagram 2500 illustrating another example pattern of an IaaS architecture, according to at least one embodiment. Service operators 2502 (e.g., service operators 2402 of FIG. 24) can be communicatively coupled to a secure host tenancy 2504 (e.g., the secure host tenancy 2404 of FIG. 24) that can include a virtual cloud network (VCN) 2506 (e.g., the VCN 2406 of FIG. 24) and a secure host subnet 2508 (e.g., the secure host subnet 2408 of FIG. 24). The VCN 2506 can include a local peering gateway (LPG) 2510 (e.g., the LPG 2410 of FIG. 24) that can be communicatively coupled to a secure shell (SSH) VCN 2512 (e.g., the SSH VCN 2412 of FIG. 24) via an LPG 2410 contained in the SSH VCN 2512. The SSH VCN 2512 can include an SSH subnet 2514 (e.g., the SSH subnet 2414 of FIG. 24), and the SSH VCN 2512 can be communicatively coupled to a control plane VCN 2516 (e.g., the control plane VCN 2416 of FIG. 24) via an LPG 2510 contained in the control plane VCN 2516. The control plane VCN 2516 can be contained in a service tenancy 2519 (e.g., the service tenancy 2419 of FIG. 24), and the data plane VCN 2518 (e.g., the data plane VCN 2418 of FIG. 24) can be contained in a customer tenancy 2521 that may be owned or operated by users, or customers, of the system.

The control plane VCN 2516 can include a control plane DMZ tier 2520 (e.g., the control plane DMZ tier 2420 of FIG. 24) that can include LB subnet(s) 2522 (e.g., LB subnet(s) 2422 of FIG. 24), a control plane app tier 2524 (e.g., the control plane app tier 2424 of FIG. 24) that can include app subnet(s) 2526 (e.g., app subnet(s) 2426 of FIG. 24), a control plane data tier 2528 (e.g., the control plane data tier 2428 of FIG. 24) that can include database (DB) subnet(s) 2530 (e.g., similar to DB subnet(s) 2430 of FIG. 24). The LB subnet(s) 2522 contained in the control plane DMZ tier 2520 can be communicatively coupled to the app subnet(s) 2526 contained in the control plane app tier 2524 and an Internet gateway 2534 (e.g., the Internet gateway 2434 of FIG. 24) that can be contained in the control plane VCN 2516, and the app subnet(s) 2526 can be communicatively coupled to the DB subnet(s) 2530 contained in the control plane data tier 2528 and a service gateway 2536

(e.g., the service gateway 2436 of FIG. 24) and a network address translation (NAT) gateway 2538 (e.g., the NAT gateway 2438 of FIG. 24). The control plane VCN 2516 can include the service gateway 2536 and the NAT gateway 2538.

The control plane VCN 2516 can include a data plane mirror app tier 2540 (e.g., the data plane mirror app tier 2440 of FIG. 24) that can include app subnet(s) 2526. The app subnet(s) 2526 contained in the data plane mirror app tier 2540 can include a virtual network interface controller (VNIC) 2542 (e.g., the VNIC of 2442) that can execute a compute instance 2544 (e.g., similar to the compute instance 2444 of FIG. 24). The compute instance 2544 can facilitate communication between the app subnet(s) 2526 of the data plane mirror app tier 2540 and the app subnet(s) 2526 that can be contained in a data plane app tier 2546 (e.g., the data plane app tier 2446 of FIG. 24) via the VNIC 2542 contained in the data plane mirror app tier 2540 and the VNIC 2542 contained in the data plane app tier 2546.

The Internet gateway 2534 contained in the control plane VCN 2516 can be communicatively coupled to a metadata management service 2552 (e.g., the metadata management service 2452 of FIG. 24) that can be communicatively coupled to public Internet 2554 (e.g., public Internet 2454 of FIG. 24). Public Internet 2554 can be communicatively coupled to the NAT gateway 2538 contained in the control plane VCN 2516. The service gateway 2536 contained in the control plane VCN 2516 can be communicatively couple to cloud services 2556 (e.g., cloud services 2456 of FIG. 24).

In some examples, the data plane VCN 2518 can be contained in the customer tenancy 2521. In this case, the IaaS provider may provide the control plane VCN 2516 for each customer, and the IaaS provider may, for each customer, set up a unique compute instance 2544 that is contained in the service tenancy 2519. Each compute instance 2544 may allow communication between the control plane VCN 2516, contained in the service tenancy 2519, and the data plane VCN 2518 that is contained in the customer tenancy 2521. The compute instance 2544 may allow resources, that are provisioned in the control plane VCN 2516 that is contained in the service tenancy 2519, to be deployed or otherwise used in the data plane VCN 2518 that is contained in the customer tenancy 2521.

In other examples, the customer of the IaaS provider may have databases that live in the customer tenancy 2521. In this example, the control plane VCN 2516 can include the data plane mirror app tier 2540 that can include app subnet(s) 2526. The data plane mirror app tier 2540 can reside in the data plane VCN 2518, but the data plane mirror app tier 2540 may not live in the data plane VCN 2518. That is, the data plane mirror app tier 2540 may have access to the customer tenancy 2521, but the data plane mirror app tier 2540 may not exist in the data plane VCN 2518 or be owned or operated by the customer of the IaaS provider. The data plane mirror app tier 2540 may be configured to make calls to the data plane VCN 2518 but may not be configured to make calls to any entity contained in the control plane VCN 2516. The customer may desire to deploy or otherwise use resources in the data plane VCN 2518 that are provisioned in the control plane VCN 2516, and the data plane mirror app tier 2540 can facilitate the desired deployment, or other usage of resources, of the customer.

In some embodiments, the customer of the IaaS provider can apply filters to the data plane VCN 2518. In this embodiment, the customer can determine what the data plane VCN 2518 can access, and the customer may restrict access to public Internet 2554 from the data plane VCN

2518. The IaaS provider may not be able to apply filters or otherwise control access of the data plane VCN 2518 to any outside networks or databases. Applying filters and controls by the customer onto the data plane VCN 2518, contained in the customer tenancy 2521, can help isolate the data plane VCN 2518 from other customers and from public Internet 2554.

In some embodiments, cloud services 2556 can be called by the service gateway 2536 to access services that may not exist on public Internet 2554, on the control plane VCN 2516, or on the data plane VCN 2518. The connection between cloud services 2556 and the control plane VCN 2516 or the data plane VCN 2518 may not be live or continuous. Cloud services 2556 may exist on a different network owned or operated by the IaaS provider. Cloud services 2556 may be configured to receive calls from the service gateway 2536 and may be configured to not receive calls from public Internet 2554. Some cloud services 2556 may be isolated from other cloud services 2556, and the control plane VCN 2516 may be isolated from cloud services 2556 that may not be in the same region as the control plane VCN 2516. For example, the control plane VCN 2516 may be located in "Region 1," and cloud service "Deployment 24," may be located in Region 1 and in "Region 2." If a call to Deployment 24 is made by the service gateway 2536 contained in the control plane VCN 2516 located in Region 1, the call may be transmitted to Deployment 24 in Region 1. In this example, the control plane VCN 2516, or Deployment 24 in Region 1, may not be communicatively coupled to, or otherwise in communication with, Deployment 24 in Region 2.

Figure 26:
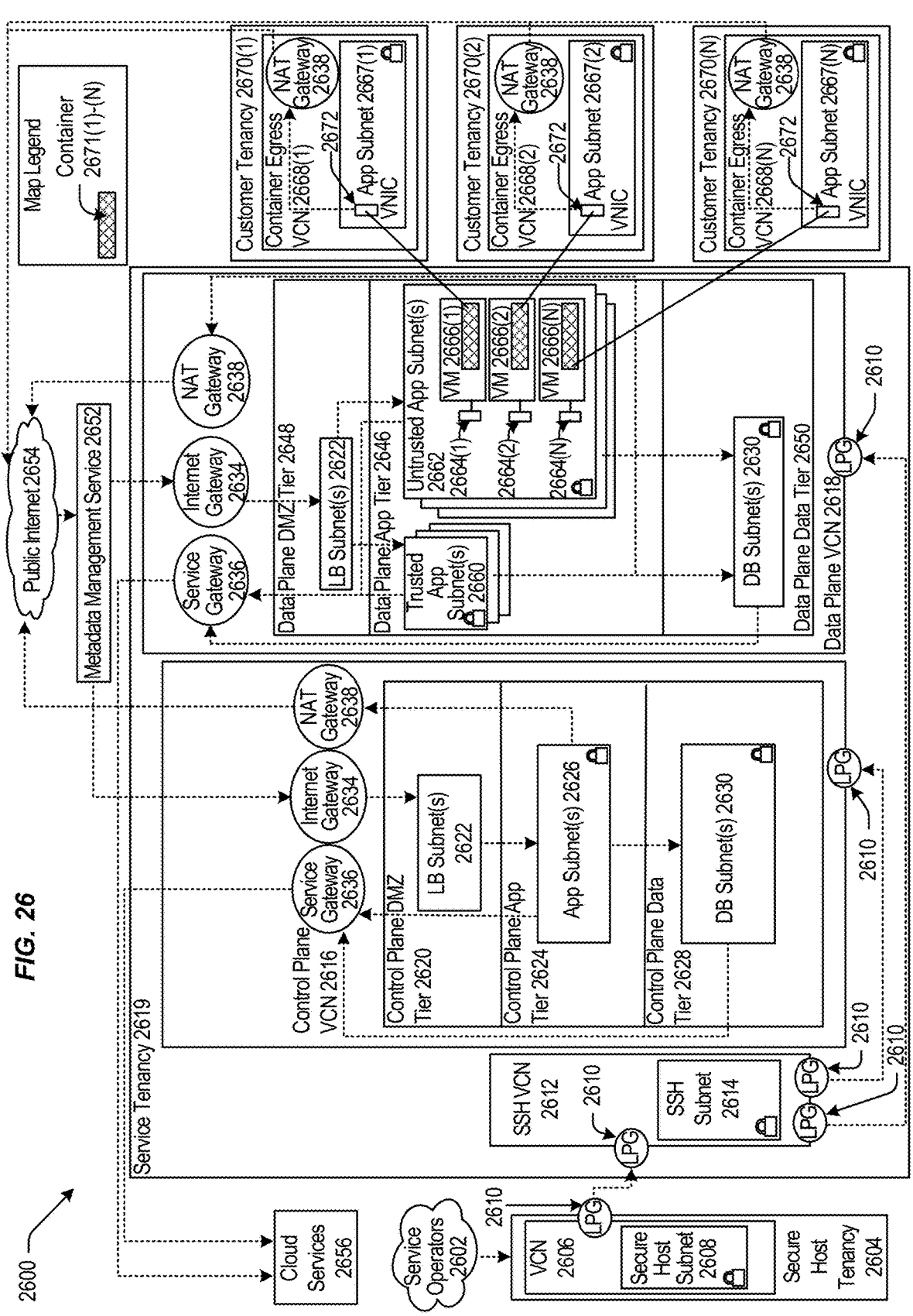
FIG. 26 is a block diagram illustrating another pattern for implementing a cloud infrastructure as a service system, according to at least one embodiment.

FIG. 26 is a block diagram 2600 illustrating another example pattern of an IaaS architecture, according to at least one embodiment. Service operators 2602 (e.g., service operators 2402 of FIG. 24) can be communicatively coupled to a secure host tenancy 2604 (e.g., the secure host tenancy 2404 of FIG. 24) that can include a virtual cloud network (VCN) 2606 (e.g., the VCN 2406 of FIG. 24) and a secure host subnet 2608 (e.g., the secure host subnet 2408 of FIG. 24). The VCN 2606 can include an LPG 2610 (e.g., the LPG 2410 of FIG. 24) that can be communicatively coupled to an SSH VCN 2612 (e.g., the SSH VCN 2412 of FIG. 24) via an LPG 2610 contained in the SSH VCN 2612. The SSH VCN 2612 can include an SSH subnet 2614 (e.g., the SSH subnet 2414 of FIG. 24), and the SSH VCN 2612 can be communicatively coupled to a control plane VCN 2616 (e.g., the control plane VCN 2416 of FIG. 24) via an LPG 2610 contained in the control plane VCN 2616 and to a data plane VCN 2618 (e.g., the data plane 2418 of FIG. 24) via an LPG 2610 contained in the data plane VCN 2618. The control plane VCN 2616 and the data plane VCN 2618 can be contained in a service tenancy 2619 (e.g., the service tenancy 2419 of FIG. 24).

The control plane VCN 2616 can include a control plane DMZ tier 2620 (e.g., the control plane DMZ tier 2420 of FIG. 24) that can include load balancer (LB) subnet(s) 2622 (e.g., LB subnet(s) 2422 of FIG. 24), a control plane app tier 2624 (e.g., the control plane app tier 2424 of FIG. 24) that can include app subnet(s) 2626 (e.g., similar to app subnet(s) 2426 of FIG. 24), a control plane data tier 2628 (e.g., the control plane data tier 2428 of FIG. 24) that can include DB subnet(s) 2630. The LB subnet(s) 2622 contained in the control plane DMZ tier 2620 can be communicatively coupled to the app subnet(s) 2626 contained in the control plane app tier 2624 and to an Internet gateway 2634 (e.g., the Internet gateway 2434 of FIG. 24) that can be contained in the control plane VCN 2616, and the app subnet(s) 2626 can be communicatively coupled to the DB subnet(s) 2630 contained in the control plane data tier 2628 and to a service gateway 2636 (e.g., the service gateway of FIG. 24) and a network address translation (NAT) gateway 2638 (e.g., the NAT gateway 2438 of FIG. 24). The control plane VCN 2616 can include the service gateway 2636 and the NAT gateway 2638.

The data plane VCN 2618 can include a data plane app tier 2646 (e.g., the data plane app tier 2446 of FIG. 24), a data plane DMZ tier 2648 (e.g., the data plane DMZ tier 2448 of FIG. 24), and a data plane data tier 2650 (e.g., the data plane data tier 2450 of FIG. 24). The data plane DMZ tier 2648 can include LB subnet(s) 2622 that can be communicatively coupled to trusted app subnet(s) 2660 and untrusted app subnet(s) 2662 of the data plane app tier 2646 and the Internet gateway 2634 contained in the data plane VCN 2618. The trusted app subnet(s) 2660 can be communicatively coupled to the service gateway 2636 contained in the data plane VCN 2618, the NAT gateway 2638 contained in the data plane VCN 2618, and DB subnet(s) 2630 contained in the data plane data tier 2650. The untrusted app subnet(s) 2662 can be communicatively coupled to the service gateway 2636 contained in the data plane VCN 2618 and DB subnet(s) 2630 contained in the data plane data tier 2650. The data plane data tier 2650 can include DB subnet(s) 2630 that can be communicatively coupled to the service gateway 2636 contained in the data plane VCN 2618.

The untrusted app subnet(s) 2662 can include one or more primary VNICs 2664(1)-(N) that can be communicatively coupled to tenant virtual machines (VMs) 2666(1)-(N). Each tenant VM 2666(1)-(N) can be communicatively coupled to a respective app subnet 2667(1)-(N) that can be contained in respective container egress VCNs 2668(1)-(N) that can be contained in respective customer tenancies 2670(1)-(N). Respective secondary VNICs 2672(1)-(N) can facilitate communication between the untrusted app subnet(s) 2662 contained in the data plane VCN 2618 and the app subnet contained in the container egress VCNs 2668(1)-(N). Each container egress VCNs 2668(1)-(N) can include a NAT gateway 2638 that can be communicatively coupled to public Internet 2654 (e.g., public Internet 2454 of FIG. 24).

The Internet gateway 2634 contained in the control plane VCN 2616 and contained in the data plane VCN 2618 can be communicatively coupled to a metadata management service 2652 (e.g., the metadata management system 2452 of FIG. 24) that can be communicatively coupled to public Internet 2654. Public Internet 2654 can be communicatively coupled to the NAT gateway 2638 contained in the control plane VCN 2616 and contained in the data plane VCN 2618. The service gateway 2636 contained in the control plane VCN 2616 and contained in the data plane VCN 2618 can be communicatively couple to cloud services 2656.

In some embodiments, the data plane VCN 2618 can be integrated with customer tenancies 2670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 2646. Code to run the function may be executed in the VMs 2666(1)-(N), and the code may not be configured to run anywhere else on the data plane VCN 2618. Each VM 2666(1)-(N) may be connected to one customer tenancy 2670. Respective containers 2671(1)-(N) contained in the VMs 2666(1)-(N) may be configured to run the code. In this case, there can be a dual isolation (e.g., the containers 2671(1)-(N) running code, where the containers 2671(1)-(N) may be contained in at least the VM 2666(1)-(N) that are contained in the untrusted app subnet(s) 2662), which may help prevent incorrect or otherwise undesirable code from damaging the network of the IaaS provider or from damaging a network of a different customer. The containers 2671(1)-(N) may be communicatively coupled to the customer tenancy 2670 and may be configured to transmit or receive data from the customer tenancy 2670. The containers 2671(1)-(N) may not be configured to transmit or receive data from any other entity in the data plane VCN 2618. Upon completion of running the code, the IaaS provider may kill or otherwise dispose of the containers 2671(1)-(N).

In some embodiments, the trusted app subnet(s) 2660 may run code that may be owned or operated by the IaaS provider. In this embodiment, the trusted app subnet(s) 2660 may be communicatively coupled to the DB subnet(s) 2630 and be configured to execute CRUD operations in the DB subnet(s) 2630. The untrusted app subnet(s) 2662 may be communicatively coupled to the DB subnet(s) 2630, but in this embodiment, the untrusted app subnet(s) may be configured to execute read operations in the DB subnet(s) 2630. The containers 2671(1)-(N) that can be contained in the VM 2666(1)-(N) of each customer and that may run code from the customer may not be communicatively coupled with the DB subnet(s) 2630.

In other embodiments, the control plane VCN 2616 and the data plane VCN 2618 may not be directly communicatively coupled. In this embodiment, there may be no direct communication between the control plane VCN 2616 and the data plane VCN 2618. However, communication can occur indirectly through at least one method. An LPG 2610 may be established by the IaaS provider that can facilitate communication between the control plane VCN 2616 and the data plane VCN 2618. In another example, the control plane VCN 2616 or the data plane VCN 2618 can make a call to cloud services 2656 via the service gateway 2636. For example, a call to cloud services 2656 from the control plane VCN 2616 can include a request for a service that can communicate with the data plane VCN 2618.

Figure 27:
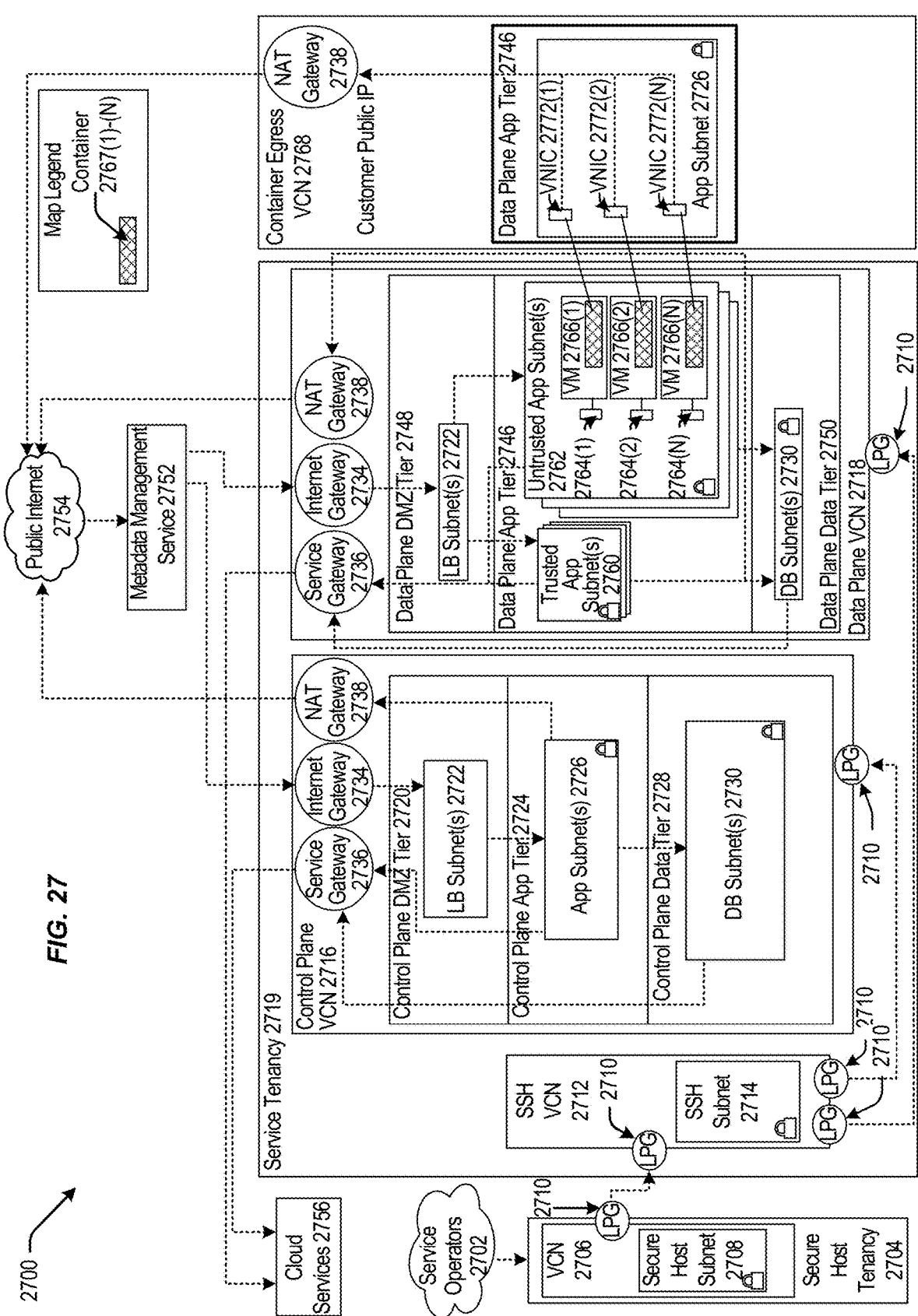
FIG. 27 is a block diagram illustrating another pattern for implementing a cloud infrastructure as a service system, according to at least one embodiment.

FIG. 27 is a block diagram 2700 illustrating another example pattern of an IaaS architecture, according to at least one embodiment. Service operators 2702 (e.g., service operators 2402 of FIG. 24) can be communicatively coupled to a secure host tenancy 2704 (e.g., the secure host tenancy 2404 of FIG. 24) that can include a virtual cloud network (VCN) 2706 (e.g., the VCN 2406 of FIG. 24) and a secure host subnet 2708 (e.g., the secure host subnet 2408 of FIG. 24). The VCN 2706 can include an LPG 2710 (e.g., the LPG 2410 of FIG. 24) that can be communicatively coupled to an SSH VCN 2712 (e.g., the SSH VCN 2412 of FIG. 24) via an LPG 2710 contained in the SSH VCN 2712. The SSH VCN 2712 can include an SSH subnet 2714 (e.g., the SSH subnet 2414 of FIG. 24), and the SSH VCN 2712 can be communicatively coupled to a control plane VCN 2716 (e.g., the control plane VCN 2416 of FIG. 24) via an LPG 2710 contained in the control plane VCN 2716 and to a data plane VCN 2718 (e.g., the data plane 2418 of FIG. 24) via an LPG 2710 contained in the data plane VCN 2718. The control plane VCN 2716 and the data plane VCN 2718 can be contained in a service tenancy 2719 (e.g., the service tenancy 2419 of FIG. 24).

The control plane VCN 2716 can include a control plane DMZ tier 2720 (e.g., the control plane DMZ tier 2420 of FIG. 24) that can include LB subnet(s) 2722 (e.g., LB subnet(s) 2422 of FIG. 24), a control plane app tier 2724 (e.g., the control plane app tier 2424 of FIG. 24) that can include app subnet(s) 2726 (e.g., app subnet(s) 2426 of FIG. 24), a control plane data tier 2728 (e.g., the control plane data tier 2428 of FIG. 24) that can include DB subnet(s) 2730 (e.g., DB subnet(s) 2630 of FIG. 26). The LB subnet(s) 2722 contained in the control plane DMZ tier 2720 can be communicatively coupled to the app subnet(s) 2726 contained in the control plane app tier 2724 and to an Internet gateway 2734 (e.g., the Internet gateway 2434 of FIG. 24) that can be contained in the control plane VCN 2716, and the app subnet(s) 2726 can be communicatively coupled to the DB subnet(s) 2730 contained in the control plane data tier 2728 and to a service gateway 2736 (e.g., the service gateway of FIG. 24) and a network address translation (NAT) gateway 2738 (e.g., the NAT gateway 2438 of FIG. 24). The control plane VCN 2716 can include the service gateway 2736 and the NAT gateway 2738.

The data plane VCN 2718 can include a data plane app tier 2746 (e.g., the data plane app tier 2446 of FIG. 24), a data plane DMZ tier 2748 (e.g., the data plane DMZ tier 2448 of FIG. 24), and a data plane data tier 2750 (e.g., the data plane data tier 2450 of FIG. 24). The data plane DMZ tier 2748 can include LB subnet(s) 2722 that can be communicatively coupled to trusted app subnet(s) 2760 (e.g., trusted app subnet(s) 2660 of FIG. 26) and untrusted app subnet(s) 2762 (e.g., untrusted app subnet(s) 2662 of FIG. 26) of the data plane app tier 2746 and the Internet gateway 2734 contained in the data plane VCN 2718. The trusted app subnet(s) 2760 can be communicatively coupled to the service gateway 2736 contained in the data plane VCN 2718, the NAT gateway 2738 contained in the data plane VCN 2718, and DB subnet(s) 2730 contained in the data plane data tier 2750. The untrusted app subnet(s) 2762 can be communicatively coupled to the service gateway 2736 contained in the data plane VCN 2718 and DB subnet(s) 2730 contained in the data plane data tier 2750. The data plane data tier 2750 can include DB subnet(s) 2730 that can be communicatively coupled to the service gateway 2736 contained in the data plane VCN 2718.

The untrusted app subnet(s) 2762 can include primary VNICs 2764(1)-(N) that can be communicatively coupled to tenant virtual machines (VMs) 2766(1)-(N) residing within the untrusted app subnet(s) 2762. Each tenant VM 2766(1)-(N) can run code in a respective container 2767(1)-(N) and be communicatively coupled to an app subnet 2726 that can be contained in a data plane app tier 2746 that can be contained in a container egress VCN 2768. Respective secondary VNICs 2772(1)-(N) can facilitate communication between the untrusted app subnet(s) 2762 contained in the data plane VCN 2718 and the app subnet contained in the container egress VCN 2768. The container egress VCN can include a NAT gateway 2738 that can be communicatively coupled to public Internet 2754 (e.g., public Internet 2454 of FIG. 24).

The Internet gateway 2734 contained in the control plane VCN 2716 and contained in the data plane VCN 2718 can be communicatively coupled to a metadata management service 2752 (e.g., the metadata management system 2452 of FIG. 24) that can be communicatively coupled to public Internet 2754. Public Internet 2754 can be communicatively coupled to the NAT gateway 2738 contained in the control plane VCN 2716 and contained in the data plane VCN 2718. The service gateway 2736 contained in the control plane VCN 2716 and contained in the data plane VCN 2718 can be communicatively couple to cloud services 2756.

In some examples, the pattern illustrated by the architecture of block diagram 2700 of FIG. 27 may be considered an exception to the pattern illustrated by the architecture of block diagram 2600 of FIG. 26 and may be desirable for a customer of the IaaS provider if the IaaS provider cannot directly communicate with the customer (e.g., a disconnected region). The respective containers 2767(1)-(N) that are contained in the VMs 2766(1)-(N) for each customer can be accessed in real-time by the customer. The containers 2767(1)-(N) may be configured to make calls to respective secondary VNICs 2772(1)-(N) contained in app subnet(s) 2726 of the data plane app tier 2746 that can be contained in the container egress VCN 2768. The secondary VNICs 2772(1)-(N) can transmit the calls to the NAT gateway 2738 that may transmit the calls to public Internet 2754. In this example, the containers 2767(1)-(N) that can be accessed in real-time by the customer can be isolated from the control plane VCN 2716 and can be isolated from other entities contained in the data plane VCN 2718. The containers 2767(1)-(N) may also be isolated from resources from other customers.

In other examples, the customer can use the containers 2767(1)-(N) to call cloud services 2756. In this example, the customer may run code in the containers 2767(1)-(N) that requests a service from cloud services 2756. The containers 2767(1)-(N) can transmit this request to the secondary VNICs 2772(1)-(N) that can transmit the request to the NAT gateway that can transmit the request to public Internet 2754. Public Internet 2754 can transmit the request to LB subnet(s) 2722 contained in the control plane VCN 2716 via the Internet gateway 2734. In response to determining the request is valid, the LB subnet(s) can transmit the request to app subnet(s) 2726 that can transmit the request to cloud services 2756 via the service gateway 2736.

It should be appreciated that IaaS architectures 2400, 2500, 2600, 2700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 28:
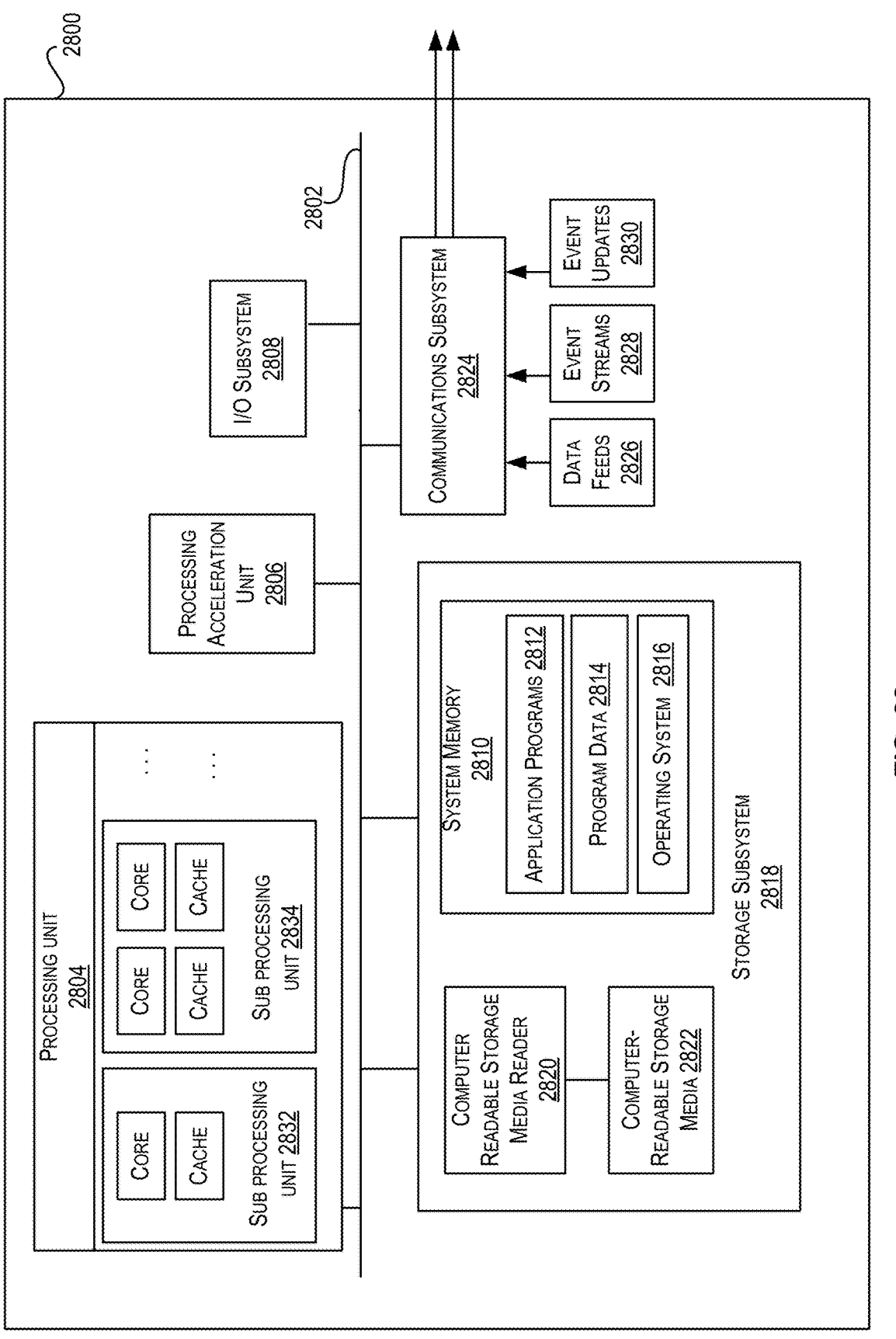
FIG. 28 is a block diagram illustrating an example computer system, according to at least one embodiment.

FIG. 28 illustrates an example computer system 2800, in which various embodiments may be implemented. The system 2800 may be used to implement any of the computer systems described above. As shown in the figure, computer system 2800 includes a processing unit 2804 that communicates with a number of peripheral subsystems via a bus subsystem 2802. These peripheral subsystems may include a processing acceleration unit 2806, an I/O subsystem 2808, a storage subsystem 2818 and a communications subsystem 2824. Storage subsystem 2818 includes tangible computer-readable storage media 2822 and a system memory 2810.

Bus subsystem 2802 provides a mechanism for letting the various components and subsystems of computer system 2800 communicate with each other as intended. Although bus subsystem 2802 is shown schematically as a single bus, alternative embodiments of the bus subsystem may utilize multiple buses. Bus subsystem 2802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2804, which can be implemented as one or more integrated circuits (e.g., a conventional microprocessor or microcontroller), controls the operation of computer system 2800. One or more processors may be included in processing unit 2804. These processors may include single core or multicore processors. In certain embodiments, processing unit 2804 may be implemented as one or more independent processing units 2832 and/or 2834 with single or multicore processors included in each processing unit. In other embodiments, processing unit 2804 may also be implemented as a quad-core processing unit formed by integrating two dual-core processors into a single chip.

In various embodiments, processing unit 2804 can execute a variety of programs in response to program code and can maintain multiple concurrently executing programs or processes. At any given time, some or all of the program code to be executed can be resident in processor(s) 2804 and/or in storage subsystem 2818. Through suitable programming, processor(s) 2804 can provide various functionalities described above. Computer system 2800 may additionally include a processing acceleration unit 2806, which can include a digital signal processor (DSP), a special-purpose processor, and/or the like.

I/O subsystem 2808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2800 may comprise a storage subsystem 2818 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2804 provide the functionality described above. Storage subsystem 2818 may also provide a repository for storing data used in accordance with the present disclosure.

As depicted in the example in FIG. 28, storage subsystem 2818 can include various components including a system memory 2810, computer-readable storage media 2822, and a computer readable storage media reader 2820. System memory 2810 may store program instructions that are loadable and executable by processing unit 2804. System memory 2810 may also store data that is used during the execution of the instructions and/or data that is generated during the execution of the program instructions. Various different kinds of programs may be loaded into system memory 2810 including but not limited to client applications, Web browsers, mid-tier applications, relational database management systems (RDBMS), virtual machines, containers, etc.

System memory 2810 may also store an operating system 2816. Examples of operating system 2816 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2800 executes one or more virtual machines, the virtual machines along with their guest operating systems (GOSs) may be loaded into system memory 2810 and executed by one or more processors or cores of processing unit 2804.

System memory 2810 can come in different configurations depending upon the type of computer system 2800. For example, system memory 2810 may be volatile memory (such as random-access memory (RAM)) and/or non-volatile memory (such as read-only memory (ROM), flash memory, etc.) Different types of RAM configurations may be provided including a static random-access memory (SRAM), a dynamic random-access memory (DRAM), and others. In some implementations, system memory 2810 may include a basic input/output system (BIOS) containing basic routines that help to transfer information between elements within computer system 2800, such as during start-up.

Computer-readable storage media 2822 may represent remote, local, fixed, and/or removable storage devices plus storage media for temporarily and/or more permanently containing, storing, computer-readable information for use by computer system 2800 including instructions executable by processing unit 2804 of computer system 2800.

Computer-readable storage media 2822 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2822 may include, but is not limited to, Zip® drives, flash memory cards, universal serial bus (USB) flash drives, secure digital (SD) cards, DVD disks, digital video tape, and the like. Computer-readable storage media 2822 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magnetoresistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for computer system 2800.

Machine-readable instructions executable by one or more processors or cores of processing unit 2804 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2824 provides an interface to other computer systems and networks. Communications subsystem 2824 serves as an interface for receiving data from and transmitting data to other systems from computer system 2800. For example, communications subsystem 2824 may enable computer system 2800 to connect to one or more devices via the Internet. In some embodiments communications subsystem 2824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2824 can provide wired network connectivity (e.g., Ethernet) in addition to or instead of a wireless interface.

In some embodiments, communications subsystem 2824 may also receive input communication in the form of structured and/or unstructured data feeds 2826, event streams 2828, event updates 2830, and the like on behalf of one or more users who may use computer system 2800.

By way of example, communications subsystem 2824 may be configured to receive data feeds 2826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2824 may also be configured to receive data in the form of continuous data streams, which may include event streams 2828 of real-time events and/or event updates 2830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2824 may also be configured to output the structured and/or unstructured data feeds 2826, event streams 2828, event updates 2830, and the like to one or more databases that may be in communication with one or more streaming data source computers coupled to computer system 2800.

Computer system 2800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    tracking, by a lifecycle management application via a plurality of user interfaces, region data corresponding to a dedicated cloud environment, the dedicated cloud environment being associated with a plurality of cloud infrastructure components providing corresponding cloud services associated with a cloud service provider, and the plurality of cloud infrastructure components to be hosted by computing devices located at a site that is associated with an entity that is different from the cloud service provider;
    transitioning, by the lifecycle management application and based at least in part on the tracking, a region state associated with provisioning hardware of the dedicated cloud environment at the site, the region state being transitioned from a first state to a second state, the first state and second state individually being one of a plurality of states that are associated with a process for provisioning the hardware of the dedicated cloud environment at the site; and
    presenting, by the lifecycle management application at one or more user interfaces of the plurality of user interfaces, information indicating a transition of the region state from the first state to the second state.

2. The method of claim 1, further comprising presenting, by the lifecycle management application, respective region data corresponding to a plurality of dedicated cloud environments.

3. The method of claim 1, further comprising presenting, by the lifecycle management application at a user interface of the plurality of user interfaces, one or more capacity forecasts associated with the dedicated cloud environment.

4. The method of claim 1, further comprising:
    generating, by the lifecycle management application and based at least in part on user input received at a user interface of the plurality of user interfaces, a configuration and margin analysis corresponding to the dedicated cloud environment; and
    presenting, by the lifecycle management application, the configuration and margin analysis at the user interface of the plurality of user interfaces.

5. The method of claim 1, wherein a user interface of the plurality of user interfaces presents one or more hardware configurations corresponding to one or more hardware components to be utilized in the dedicated cloud environment.

6. The method of claim 1, further comprising:

generating, by the lifecycle management application, one or more visual representations based at least in part on the tracking of the region data corresponding to the dedicated cloud environment; and presenting the one or more visual representations within at least one user interface of the plurality of user interfaces.

7. The method of claim 1, wherein a user interface of the plurality of user interfaces presents 1) a deployment tracker that is associated with one or more user-defined updates or events corresponding to hardware deployment, or 2) a visual representation depicting a number of hardware deployments associated with one or more deployment states.

8. A system, comprising:

one or more processors; and one or more memories storing computer-executable instructions that, when executed by the one or more processors, cause the one or more processors to:

track, via a plurality of user interfaces, region data corresponding to a dedicated cloud environment, the dedicated cloud environment being associated with a plurality of cloud infrastructure components providing corresponding cloud services associated with a cloud service provider, and the plurality of cloud infrastructure components to be hosted by computing devices located at a site that is associated with an entity that is different from the cloud service provider;

transition, based at least in part on the tracking, a region state associated with provisioning hardware of the dedicated cloud environment at the site, the region state being transitioned from a first state to a second state, the first state and second state individually being one of a plurality of states that are associated with a process for provisioning the hardware of the dedicated cloud environment at the site; and present, at one or more user interfaces of the plurality of user interfaces, information indicating a transition of the region state from the first state to the second state.

9. The system of claim 8, wherein executing the computer-executable instructions further causes the one or more processors to present respective region data corresponding to a plurality of dedicated cloud environments.

10. The system of claim 8, wherein executing the computer-executable instructions further causes the one or more processors to present, at a user interface of the plurality of user interfaces, one or more capacity forecasts associated with the dedicated cloud environment.

11. The system of claim 8, wherein executing the computer-executable instructions further causes the one or more processors to:

generate, based at least in part on user input received at a user interface of the plurality of user interfaces, a configuration and margin analysis corresponding to the dedicated cloud environment; and present the configuration and margin analysis at the user interface of the plurality of user interfaces.

12. The system of claim 8, wherein a user interface of the plurality of user interfaces presents one or more hardware configurations corresponding to one or more hardware components to be utilized in the dedicated cloud environment.

13. The system of claim 8, wherein executing the computer-executable instructions further causes the one or more processors to:

generate one or more visual representations based at least in part on the tracking of the region data corresponding to the dedicated cloud environment; and present the one or more visual representations within at least one user interface of the plurality of user interfaces.

14. The system of claim 8, wherein a user interface of the plurality of user interfaces presents 1) a deployment tracker that is associated with one or more user-defined updates or events corresponding to hardware deployment, or 2) a visual representation depicting a number of hardware deployments associated with one or more deployment states.

15. A non-transitory computer-readable medium comprising computer-executable instructions that, when executed by one or more processors, causes the one or more processors to:

track, via a plurality of user interfaces, region data corresponding to a dedicated cloud environment, the dedicated cloud environment being associated with a plurality of cloud infrastructure components providing corresponding cloud services associated with a cloud service provider, and the plurality of cloud infrastructure components to be hosted by computing devices located at a site that is associated with an entity that is different from the cloud service provider;

transition, based at least in part on the tracking, a region state associated with provisioning hardware of the dedicated cloud environment at the site, the region state being transitioned from a first state to a second state, the first state and second state individually being one of a plurality of states that are associated with a process for provisioning the hardware of the dedicated cloud environment at the site; and present, at one or more user interfaces of the plurality of user interfaces, information indicating a transition of the region state from the first state to the second state.

16. The non-transitory computer-readable medium of claim 15, wherein executing the computer-executable instructions further causes the one or more processors to present respective region data corresponding to a plurality of dedicated cloud environments.

17. The non-transitory computer-readable medium of claim 15, wherein executing the computer-executable instructions further causes the one or more processors to present, at a user interface of the plurality of user interfaces, one or more capacity forecasts associated with the dedicated cloud environment.

18. The non-transitory computer-readable medium of claim 15, wherein a user interface of the plurality of user interfaces presents one or more hardware configurations corresponding to one or more hardware components to be utilized in the dedicated cloud environment.

19. The non-transitory computer-readable medium of claim 15, wherein executing the computer-executable instructions further causes the one or more processors to:

generate one or more visual representations based at least in part on the tracking of the region data corresponding to the dedicated cloud environment; and present the one or more visual representations within at least one user interface of the plurality of user interfaces.

20. The non-transitory computer-readable medium of claim 15, wherein a user interface of the plurality of user interfaces presents 1) a deployment tracker that is associated with one or more user-defined updates or events corresponding to hardware deployment, or 2) a visual representation depicting a number of hardware deployments associated with one or more deployment states.

* * * * *